US006292473B1

(12) United States Patent
Duske, Jr. et al.

(10) Patent No.: US 6,292,473 B1
(45) Date of Patent: Sep. 18, 2001

(54) MOBILE COMMUNICATIONS TERMINAL FOR SATELLITE COMMUNICATIONS SYSTEM

(75) Inventors: Frederick J. Duske, Jr., Sterling; Joseph A. Gruessing, Jr., Ashburn, both of VA (US); Thomas A. Barber, Bethesda, MD (US); Dean A. Self, Centerville, VA (US)

(73) Assignee: Motient Services Inc., Reston, VA (US)

( * ) Notice: Subject to any disclaimer, the term of this patent is extended or adjusted under 35 U.S.C. 154(b) by 0 days.

(21) Appl. No.: 09/093,095

(22) Filed: Jun. 8, 1998

Related U.S. Application Data

(63) Continuation of application No. PCT/US96/19905, filed on Dec. 6, 1996.

(60) Provisional application No. 60/011,158, filed on Dec. 8, 1995.

(51) Int. Cl.[7] .................................. H04H 1/00; H04J 3/24

(52) U.S. Cl. .......................... 370/316; 370/328; 370/339; 370/349; 455/412

(58) Field of Search .................................... 370/315, 316, 370/327, 328, 339, 349; 455/406, 405, 345, 227, 228, 410, 412, 413

(56) References Cited

U.S. PATENT DOCUMENTS

| | | | | |
|---|---|---|---|---|
| 4,979,170 | | 12/1990 | Gilhousen et al. | 370/324 |
| 5,490,284 | | 2/1996 | Itoh et al. . | |
| 5,521,963 | | 5/1996 | Shrader et al. . | |
| 5,535,430 | | 7/1996 | Aoki et al. | 455/12.1 |
| 5,594,740 | | 1/1997 | LaDue | 340/870.02 |
| 5,636,122 | * | 6/1997 | Shah et al. | 701/207 |
| 5,884,140 | * | 3/1999 | Ishizaki et al. | 455/2 |
| 6,026,292 | * | 2/2000 | Coppinger et al. | 455/406 |
| 6,084,870 | * | 7/2000 | Wooten et al. | 370/349 |
| 6,097,935 | * | 8/2000 | Takahashi et al. | 455/186.1 |
| 6,112,083 | * | 8/2000 | Sweet et al. | 455/426 |
| 6,128,510 | * | 10/2000 | Beukema et al. | 455/557 |

* cited by examiner

*Primary Examiner*—Wellington Chin
*Assistant Examiner*—Brenda Pham
(74) *Attorney, Agent, or Firm*—Irah H. Donner; Hale and Dorr LLP

(57) ABSTRACT

A mobile communications system transporting messages between mobile terminals and a central control center using a satellite communications system. The central control center and the mobile terminals each store a plurality of message display forms each having a form identifier and a predetermined display format. The message display forms are selected as templates for generating user messages including message data supplied at the originating station. The satellite messages transmit the user message by transmitting the message data and the form identifier of the corresponding selected message display form. The receiving station, upon receiving the satellite message, accesses the message display form from memory in response to the supplied form identifier, and combines the accessed message display form with the message data to recreate the user message. The mobile terminals are designed as low-cost data terminals requiring a minimum amount of memory. The mobile terminals include a satellite transceiver, a graphic user interface providing a display and accepting key inputs from the user, and a software system including an application layer providing all messaging functions for the user and a middleware layer controlling transport of message between the application layer and the satellite transceiver. The application layer operates as an event-based state machine, and includes an event handler that controls the application layers operations in accordance with the processing capacity of the middleware layer.

15 Claims, 26 Drawing Sheets

AMERICAN MOBILE SATELLITE CORPORATION (AMSC)
MOBILE MESSAGING SERVICE (MMS)

USERNAME: _____
PASSWORD: _____

LOGON SCREEN

| Q)UICK SEND | M)ESSAGE | MESSAGE L)OGS | A)DDRESS | T)RANSCEIVER | T(E)RMINAL |

AMERICAN MOBILE SATELLITE CORPORATION (AMSC)
MOBILE MESSAGING SERVICE (MMS)

MAIN MENU

UNREAD: 3; SENDING: 2            04/08/95 - 12:24PM EST
STATUS MESSAGES ARE DISPLAYED HERE

MAIN MENU SCREEN

MAIN MENU SCREEN - TERMINAL - CONFIGURE

ENTER MESSAGE SCREEN

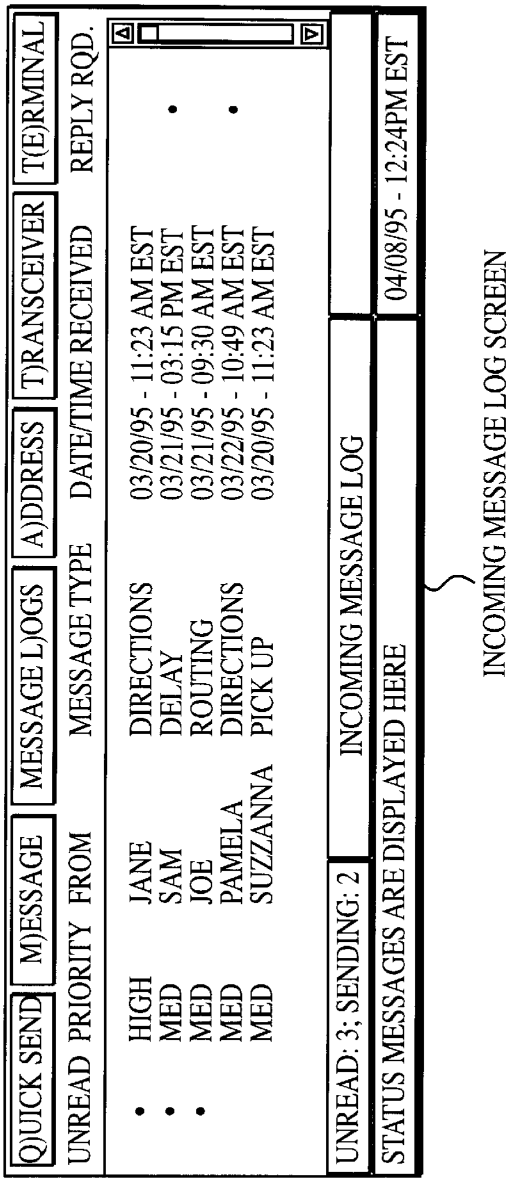

INCOMING MESSAGE LOG SCREEN

FIG. 8-11

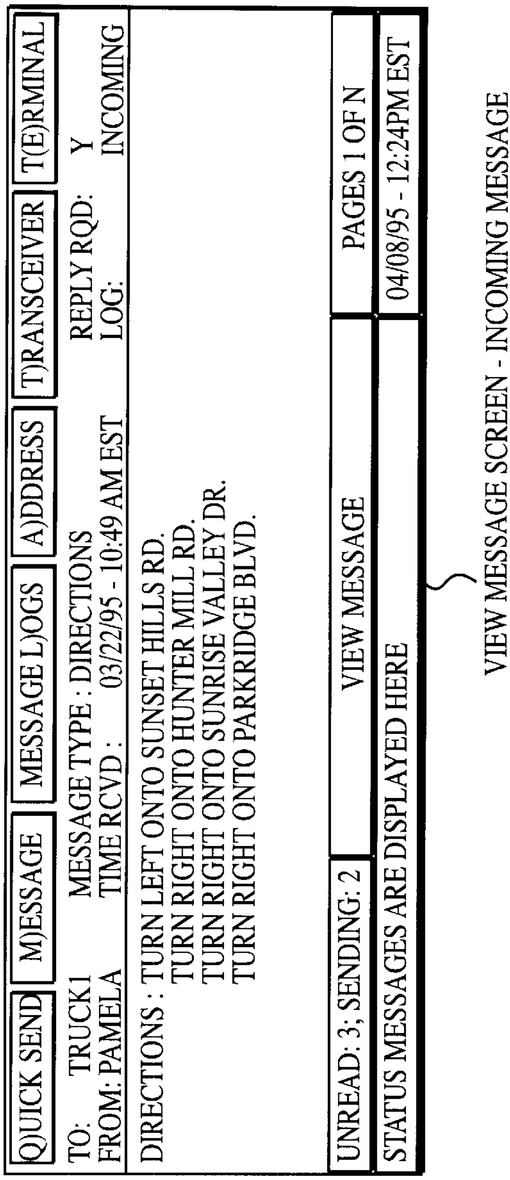

VIEW MESSAGE SCREEN - INCOMING MESSAGE

FIG. 8-12

| QUICK SEND | M)ESSAGE | MESSAGE L)OGS | A)DDRESS | T)RANSCEIVER | T(E)RMINAL |
|---|---|---|---|---|---|
| UNREAD | PRIORITY | FROM | MESSAGE TYPE | DATE/TIME RECEIVED | REPLY RQD. |
| • | HIGH | JANE | DIRECTIONS | 03/20/95 - 11:23 AM EST | |
| | MED | SAM | DELAY | 03/21/95 - 03:15 PM EST | |
| | MED | JOE | ROUTING | 03/21/95 - 09:30 AM EST | • |
| • | MED | PAMELA | DIRECTIONS | 03/22/95 - 10:49 AM EST | • |
| | MED | SUZZANNA | PICK UP | 03/20/95 - 11:23 AM EST | |

UNREAD: 3; SENDING: 2    INCOMING MESSAGE LOG    04/08/95 - 12:24PM EST
STATUS MESSAGES ARE DISPLAYED HERE

FIG. 8-11    INCOMING MESSAGE LOG SCREEN

| QUICK SEND | M)ESSAGE | MESSAGE L)OGS | A)DDRESS | T)RANSCEIVER | T(E)RMINAL |
|---|---|---|---|---|---|
| TO: TRUCK1 | MESSAGE TYPE: DIRECTIONS | | | REPLY RQD: Y | |
| FROM: PAMELA | TIME RCVD: 03/22/95 - 10:49 AM EST | | | LOG: INCOMING | |

DIRECTIONS: TURN LEFT ONTO SUNSET HILLS RD.
TURN RIGHT ONTO HUNTER MILL RD.
TURN RIGHT ONTO SUNRISE VALLEY DR.
TURN RIGHT ONTO PARKRIDGE BLVD.

UNREAD: 3; SENDING: 2    VIEW MESSAGE    PAGES 1 OF N
STATUS MESSAGES ARE DISPLAYED HERE    04/08/95 - 12:24PM EST

FIG. 8-12    VIEW MESSAGE SCREEN - INCOMING MESSAGE

VIEW MESSAGE SCREEN - OUTGOING MESSAGE

VIEW MRNs SCREEN

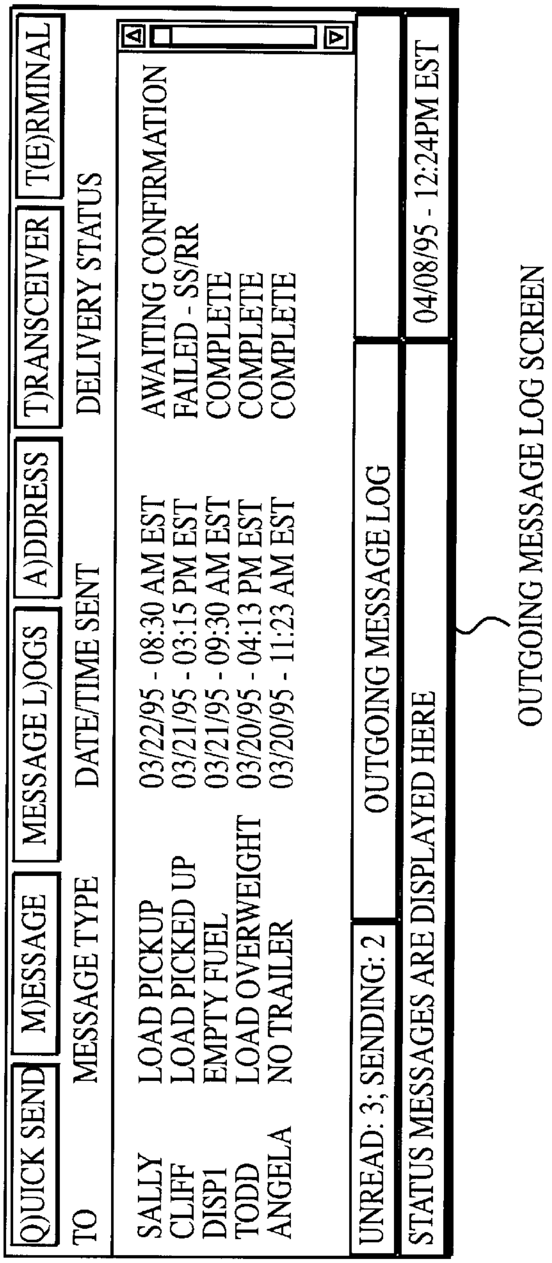

FIG. 8-15

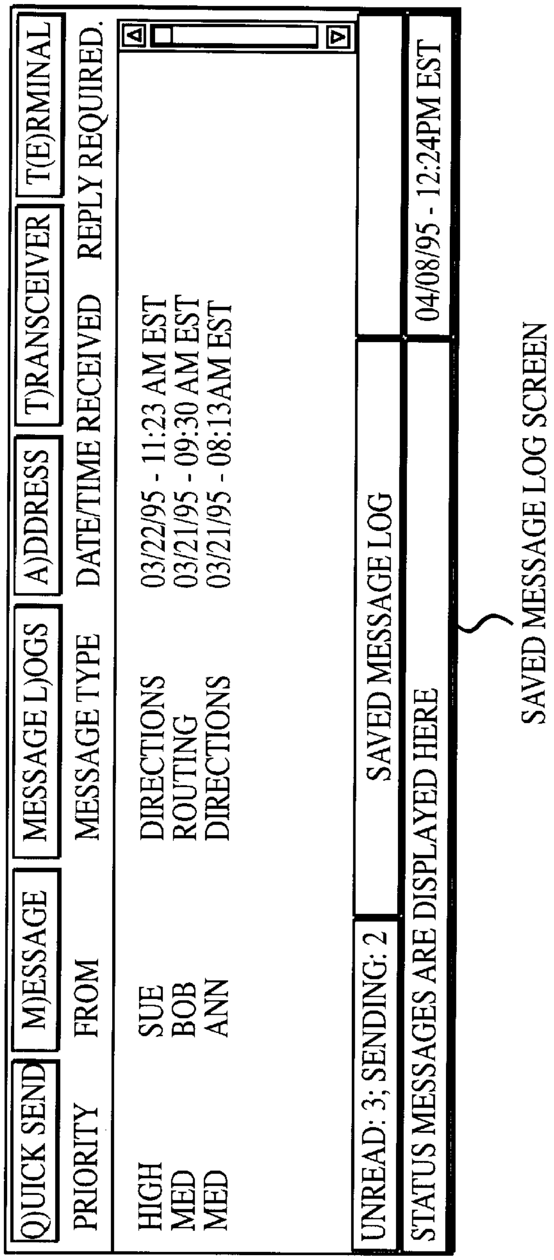

FIG. 8-16

| (Q)UICK SEND | (M)ESSAGE | MESSAGE L)OGS | A)DDRESS | T)RANSCEIVER | T(E)RMINAL |
|---|---|---|---|---|---|
| TO | MESSAGE TYPE | DATE/TIME SENT | | | DELIVERY STATUS |
| SALLY | LOAD PICKUP | 03/22/95 - 08:30 AM EST | | | AWAITING CONFIRMATION |
| CLIFF | LOAD PICKED UP | 03/21/95 - 03:15 PM EST | | | FAILED - SS/RR |
| DISP1 | EMPTY FUEL | 03/21/95 - 09:30 AM EST | | | COMPLETE |
| TODD | LOAD OVERWEIGHT | 03/20/95 - 04:13 PM EST | | | COMPLETE |
| ANGELA | NO TRAILER | 03/20/95 - 11:23 AM EST | | | COMPLETE |
| UNREAD: 3; SENDING: 2 | | OUTGOING MESSAGE LOG | | | 04/08/95 - 12:24PM EST |
| STATUS MESSAGES ARE DISPLAYED HERE | | | | | |

OUTGOING MESSAGE LOG SCREEN

| (Q)UICK SEND | (M)ESSAGE | MESSAGE L)OGS | A)DDRESS | T)RANSCEIVER | T(E)RMINAL |
|---|---|---|---|---|---|
| PRIORITY | FROM | MESSAGE TYPE | | DATE/TIME RECEIVED | REPLY REQUIRED |
| HIGH | SUE | DIRECTIONS | | 03/22/95 - 11:23 AM EST | |
| MED | BOB | ROUTING | | 03/21/95 - 09:30 AM EST | |
| MED | ANN | DIRECTIONS | | 03/21/95 - 08:13 AM EST | |
| UNREAD: 3; SENDING: 2 | | SAVED MESSAGE LOG | | | 04/08/95 - 12:24PM EST |
| STATUS MESSAGES ARE DISPLAYED HERE | | | | | |

SAVED MESSAGE LOG SCREEN

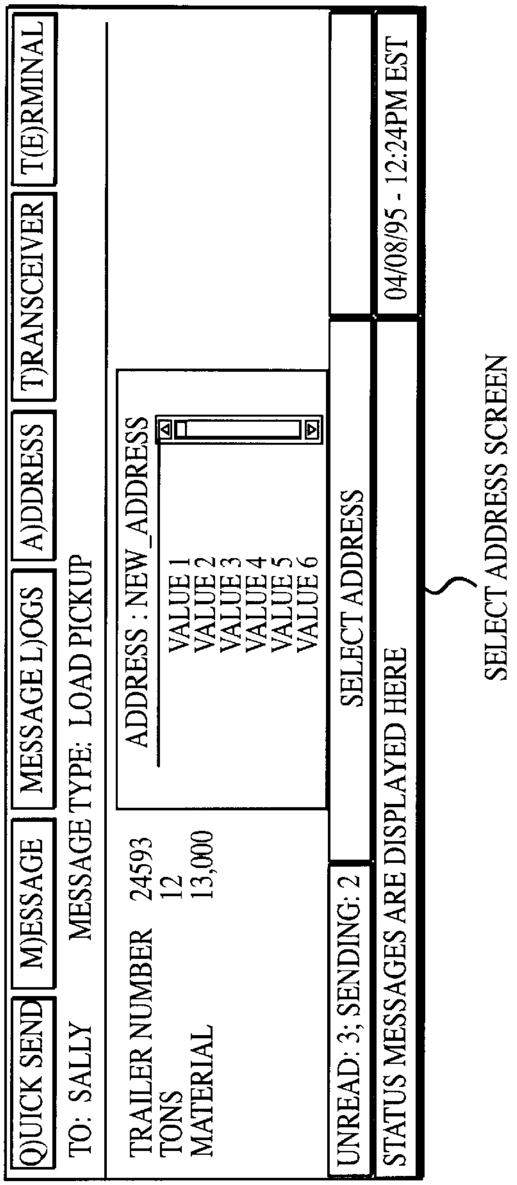

FIG. 8-19

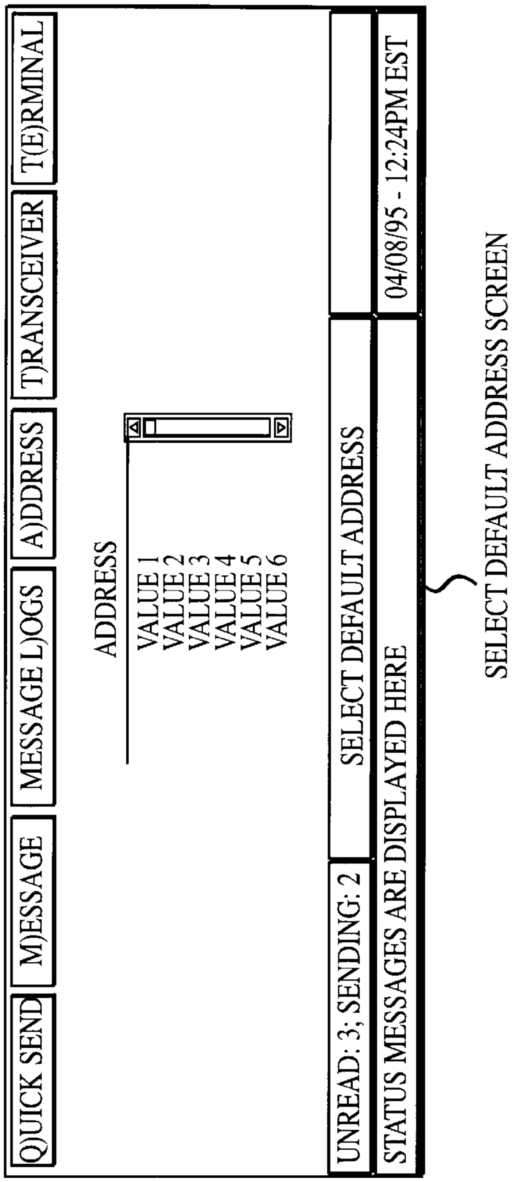

FIG. 8-20

| QUICK SEND | M)ESSAGE | MESSAGE L)OGS | A)DDRESS | T)RANSCEIVER | T(E)RMINAL |

TO: SALLY    MESSAGE TYPE: LOAD PICKUP

ADDRESS : NEW_ADDRESS
- VALUE 1
- VALUE 2
- VALUE 3
- VALUE 4
- VALUE 5
- VALUE 6

TRAILER NUMBER   24593
TONS             12
MATERIAL         13,000

SELECT ADDRESS

UNREAD: 3; SENDING: 2

STATUS MESSAGES ARE DISPLAYED HERE        04/08/95 - 12:24PM EST

SELECT ADDRESS SCREEN

| QUICK SEND | M)ESSAGE | MESSAGE L)OGS | A)DDRESS | T)RANSCEIVER | T(E)RMINAL |

ADDRESS
- VALUE 1
- VALUE 2
- VALUE 3
- VALUE 4
- VALUE 5
- VALUE 6

SELECT DEFAULT ADDRESS

UNREAD: 3; SENDING: 2

STATUS MESSAGES ARE DISPLAYED HERE        04/08/95 - 12:24PM EST

SELECT DEFAULT ADDRESS SCREEN

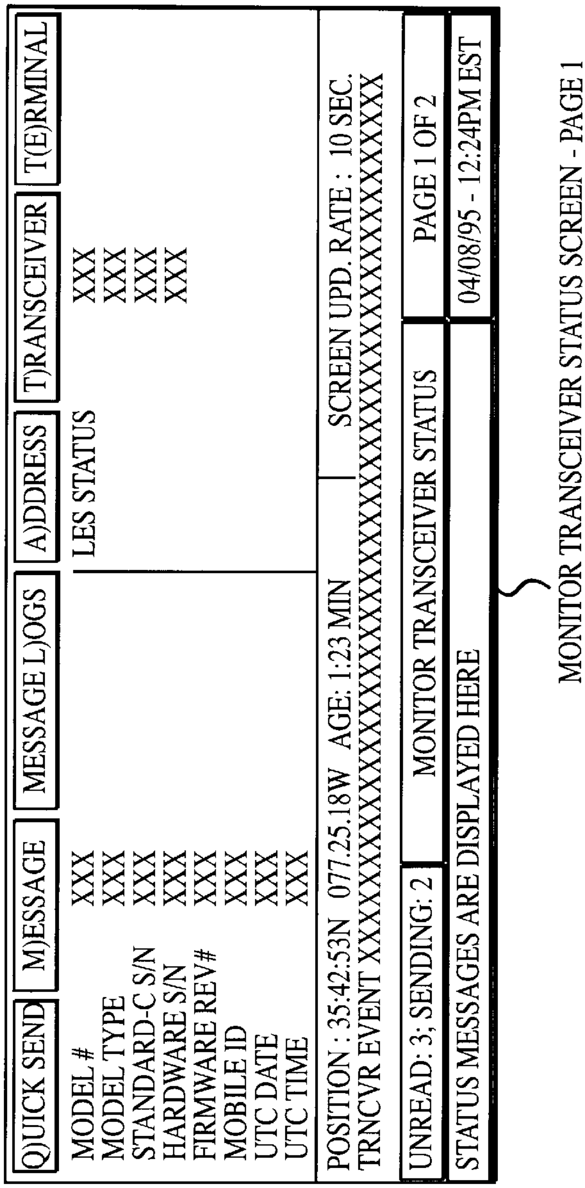

FIG. 8-21

| (Q)UICK SEND | (M)ESSAGE | MESSAGE L)OGS | A)DDRESS | T)RANSCEIVER | T(E)RMINAL |
|---|---|---|---|---|---|
| MODEL # | XXX | | LES STATUS | XXX | |
| MODEL TYPE | XXX | | | XXX | |
| STANDARD-C S/N | XXX | | | XXX | |
| HARDWARE S/N | XXX | | | | |
| FIRMWARE REV # | XXX | | | | |
| MOBILE ID | XXX | | | | |
| UTC DATE | XXX | | | | |
| UTC TIME | XXX | | | | |

POSITION : 35:42:53N  077.25.18W  AGE: 1:23 MIN   SCREEN UPD. RATE : 10 SEC.
TRNCVR EVENT XXXXXXXXXXXXXXXXXXXXXXXXXXXXXXXXXXXXXXX

| UNREAD: 3; SENDING: 2 | MONITOR TRANSCEIVER STATUS | PAGE 1 OF 2 |
|---|---|---|
| STATUS MESSAGES ARE DISPLAYED HERE | | 04/08/95 - 12:24PM EST |

MONITOR TRANSCEIVER STATUS SCREEN - PAGE 1

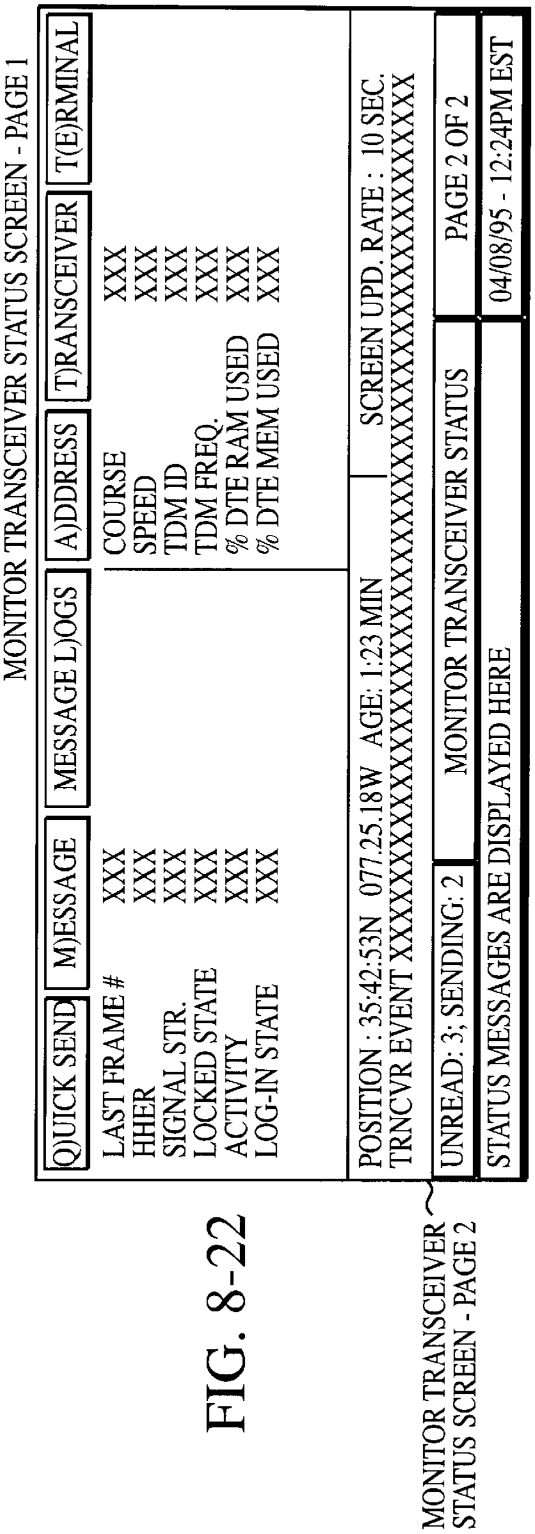

FIG. 8-22

| (Q)UICK SEND | (M)ESSAGE | MESSAGE L)OGS | A)DDRESS | T)RANSCEIVER | T(E)RMINAL |
|---|---|---|---|---|---|
| LAST FRAME # | XXX | | COURSE | XXX | |
| HHER | XXX | | SPEED | XXX | |
| SIGNAL STR. | XXX | | TDM ID | XXX | |
| LOCKED STATE | XXX | | TDM FREQ. | XXX | |
| ACTIVITY | XXX | | % DTE RAM USED | | |
| LOG-IN STATE | | | % DTE MEM USED | | |

POSITION : 35:42:53N  077.25.18W  AGE: 1:23 MIN   SCREEN UPD. RATE : 10 SEC.
TRNCVR EVENT XXXXXXXXXXXXXXXXXXXXXXXXXXXXXXXXXXXXXXX

| UNREAD: 3; SENDING: 2 | MONITOR TRANSCEIVER STATUS | PAGE 2 OF 2 |
|---|---|---|
| STATUS MESSAGES ARE DISPLAYED HERE | | 04/08/95 - 12:24PM EST |

MONITOR TRANSCEIVER STATUS SCREEN - PAGE 2

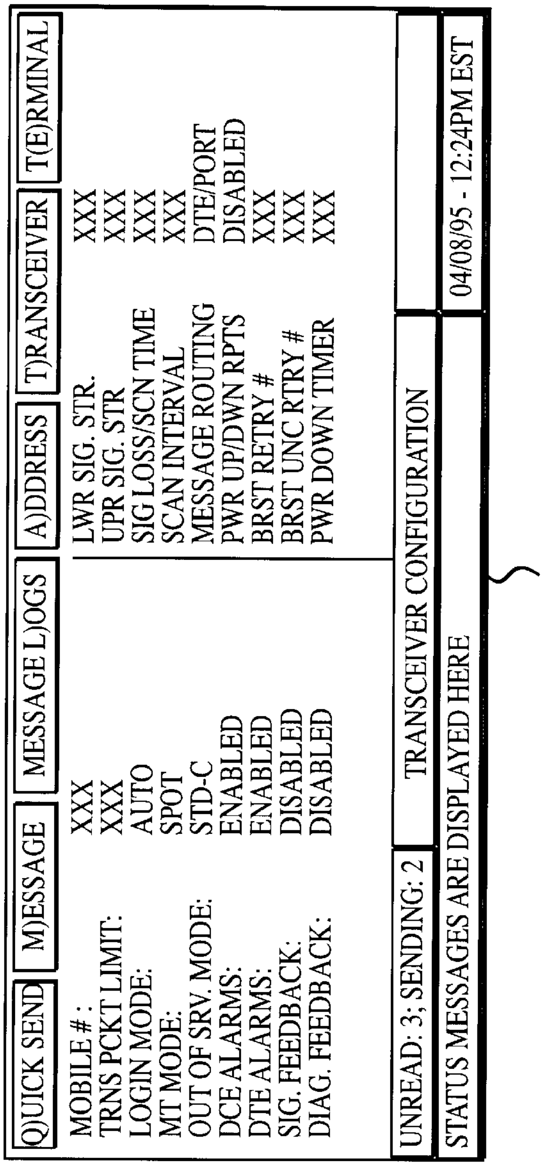

FIG. 8-23

| Q)UICK SEND | M)ESSAGE | MESSAGE L)OGS | A)DDRESS | T)RANSCEIVER | T(E)RMINAL |
|---|---|---|---|---|---|
| MOBILE #: | XXX | | LWR SIG. STR. | XXX | |
| TRNS PCKT LIMIT: | XXX | | UPR SIG. STR | XXX | |
| LOGIN MODE: | AUTO | | SIG LOSS/SCN TIME | XXX | |
| MT MODE: | SPOT | | SCAN INTERVAL | XXX | |
| OUT OF SRV. MODE: | STD-C | | MESSAGE ROUTING | DTE/PORT | |
| DCE ALARMS: | ENABLED | | PWR UP/DWN RPTS | DISABLED | |
| DTE ALARMS: | ENABLED | | BRST RETRY # | XXX | |
| SIG. FEEDBACK: | DISABLED | | BRST UNC RTRY # | XXX | |
| DIAG. FEEDBACK: | DISABLED | | PWR DOWN TIMER | XXX | |

UNREAD: 3; SENDING: 2    TRANSCEIVER CONFIGURATION    04/08/95 - 12:24PM EST

STATUS MESSAGES ARE DISPLAYED HERE

TRANSCEIVER CONFIGURATION SCREEN

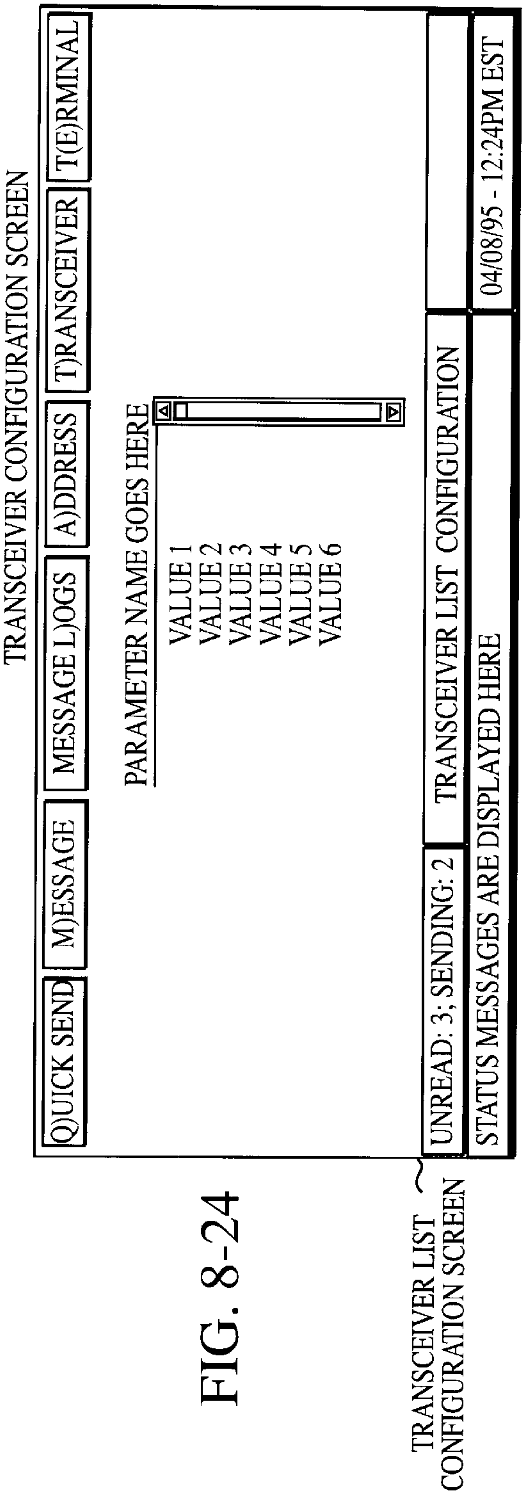

FIG. 8-24

| Q)UICK SEND | M)ESSAGE | MESSAGE L)OGS | A)DDRESS | T)RANSCEIVER | T(E)RMINAL |
|---|---|---|---|---|---|

PARAMETER NAME GOES HERE

VALUE 1
VALUE 2
VALUE 3
VALUE 4
VALUE 5
VALUE 6

UNREAD: 3; SENDING: 2    TRANSCEIVER LIST CONFIGURATION    04/08/95 - 12:24PM EST

STATUS MESSAGES ARE DISPLAYED HERE

TRANSCEIVER LIST CONFIGURATION SCREEN

MOBILE COMMUNICATIONS TERMINAL FOR SATELLITE COMMUNICATIONS SYSTEM

RELATED APPLICATIONS

This application is a continuation of International Application number PCT/US96/19905, filed Dec. 6, 1996, which claims priority from U.S. Provisional Application No. 60/011,158, filed Dec. 8, 1995 , both of which are incorporated herein by reference.

FIELD OF THE INVENTION

The present invention relates to mobile communications terminal in wireless communications system. More specifically, the present invention relates to mobile communications terminals sending and receiving pre-formatted text and binary messages to a central facility using a satellite communications system.

DESCRIPTION OF THE RELATED ART

Wireless communications terminals have been used in service vehicles to receive communications messages from centralized dispatcher offices. For example, taxicab companies have installed data terminals in taxicabs that receive messages from a dispatcher via RF transmissions. Such systems, however, are limited in their communication abilities in that the mobile terminals can only receive and acknowledge messages.

One example of a currently successful and operational satellite based data service is INMARSAT's Standard-C Communications System. The major elements of the Standard-C system architecture include land or coast earth stations (LESs or CESs), and a network coordination station (NCS) in each ocean region and ship or mobile earth stations (SESs or MESs). Each CES serves as a gateway between the terrestrial network and the INMARSAT Standard-C communications system. The types of interface provided at the CES are decided by the coast earth station operator, however, Telex, EGC message processing and distress message handling are mandatory to comply with INMARSAT's Standard Definition Manual Version 1.3.1.

A SES or MES is the mobile earth station used by mobile subscribers. The system allows the use of very low G/T transceivers at the ship or mobile earth station (SES or MES). Standard-C uses all digital transmission techniques for both signalling and message data specifically based on a standard slotted ALLOHA TDMA protocol. SES equipment may therefore take advantage of the low cost trend of digital technology. Standard-C SESs do not require the use of a dedicated receiver for receiving signalling information.

The SES consists of a DCE (data circuit terminating equipment) providing the interface to the satellite network, and a DTE (data terminal equipment, for example a personal computer) which provides the user interface. For ship-to-shore message transfer, a message is formatted in the DTE and then transferred to the DCE for transmission. In the shore-to-ship direction, the DCE receives the complete message from the radio channel before passing it to the DTE for the attenuation of the user. The SES may be equipped for reception of Enhanced Group Calls (EGC) or a separate Receiver Only Terminal for EGC reception may be used. When idle, every SES tunes to and receives a TDC channel transmitted by the NCS; the NCS Common Channel. The channel is used to transmit announcements to SESs that shore-to-ship calls are ready at a CES for transmission to the SES. Enhanced Group Calls are also transmitted on this channel.

Additional optional services are available within the system and may be offered by CESs. These services include access to electronic mail and message handling services (X.400 for example), individual, group and area directed polling, and a data reporting service. The polling and data reporting services are primarily aimed at providing a service to remotely operated and land mobile terminals. More detailed information regarding the Standard-C protocol is disclosed in "INMARSAT Standard-C communications System" by Kevin Phillips, IEEE International Conference on Communications '88: Digital Technology—Spanning the Universe, Jun. 12–15, 1988, pp. 1117–1122 (Available from IEEE Service Cent (cat. #CH2538-7/88)) ©1988 IEEE, the disclosure of which is incorporated in its entirety by reference.

Standard-C protocol was not designed to be used in connection with land mobile data terminals but was designed only for maritime use. Thus, there is a need for a satellite communications system that provides effective communications for land mobile data terminals.

Conventional electronic mail and message handling services are not designed for extensive message transmissions in a satellite communication system. Service vehicles such as taxicabs, trucks, etc., need an efficient, low-cost, and reliable arrangement for receiving messages from a central dispatcher. Moreover, there is a need for providing advanced messaging capabilities where a variety of messages can be initiated mobile terminals without providing excessive loading on the satellite.

DISCLOSURE OF THE INVENTION

In view of the foregoing, there is a need for a low cost mobile communication system that provides efficient transport of user messages via a satellite network.

There is a also a need for an electronic mail messaging system for transporting messages between a dispatcher and mobile communication terminals that uses predetermined message forms to minimize user efforts in generating and displaying mail messages.

According to at least one aspect of the present invention, in a mobile satellite system including a satellite communication switching office having a satellite antenna for providing communication of a satellite message with a mobile communication system via a satellite, a central controller communicating with the mobile communication system via the satellite communication switching office, a communication method comprising storing a plurality of message display forms in the mobile communication system, each message display form having a predetermined display format and a form identifier, generating at the central controller a user message comprising message data, outputting from the central controller a satellite message carrying the message data and the form identifier of a selected one of the message display forms to the satellite communication switching office, transmitting the satellite message to the mobile communication system via the satellite, and displaying the satellite message received by the mobile communication system using a selected one of the stored message display forms corresponding to the form identifier in the transmitted satellite message. The communication method enables a central controller to send and receiver user messages in a compressed format, minimizing the amount of data to be transmitted to the mobile communications systems.

In another aspect of the present invention, in a mobile satellite system including a satellite communication switching office having a satellite antenna for providing communication of satellite messages with a mobile communication system via a satellite, a central controller communicating with the mobile communication system via the satellite communication switching office, the mobile communication system comprising a satellite transceiver communicating data packets carrying a first satellite message to the satellite in response to transceiver control signals a graphic user interface providing a display and accepting key inputs from a user, a software system comprising a middleware layer sending the transceiver control signals and packets carrying the satellite message to the transceiver, a network form controller storing a plurality of message forms each having a form identifier and a form definition specifying a predetermined format, an address list storing a list of station addresses identifiable by the satellite communication switching office for respective satellite stations having communication capabilities with the satellite communication switching office, a user interface controller retrieving a selected one of the form definitions and at least one station address in response to the key inputs, the user interface controller outputting a user message including the at least one station address, user inputs from the graphic user interface and the form identifier corresponding to the selected form definition, a network controller subsystem outputting the satellite message carrying the user message to the middleware layer, and an event handler controlling operations of the network controller and the user interface controller in response to network event and user event signals from the network controller and the user interface controller, respectively.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 8-1 to 8-34 are diagrams illustrating graphic displays of the mobile communication terminal of FIGS. 3A and 3B during different operations.

BEST MODE FOR CARRYING OUT THE INVENTION

The present invention provides a mobile communication system that sends and receives electronic mail messages to an from other stations in a satellite communication system. The mobile communication system is designed to provide flexibility to users, while maintaining efficient terminal operations. The techniques described herein enable the mobile communication system to be implemented as a low-cost terminal requiring a minimal amount of memory. An overview of the overall satellite communication system and mobile communication system will be provided, followed by a more detailed description of the software interfaces and software functions of the mobile communication system.

Overview

Figure 1:
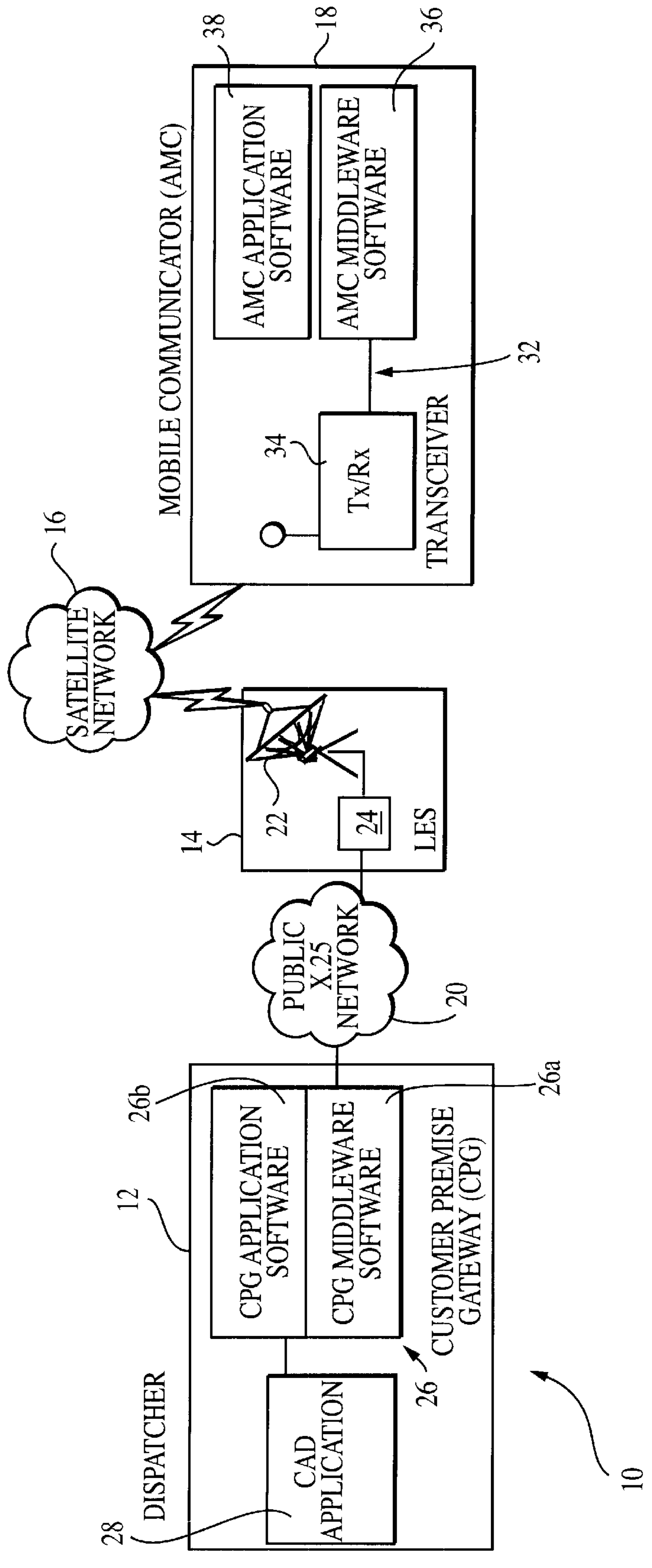
FIG. 1 is a diagram illustrating an architecture of a satellite communication system for a mobile communication system of the present invention.

FIG. 1 is a diagram of a satellite communication system architecture in communication with the mobile communication system to provide the mobile messaging service (MMS) of the present invention. The satellite communication system 10 includes a dispatcher station 12, a satellite communication switching office 14, and a satellite network 16 for transporting satellite messages between the satellite communication switching office 14 and an adaptive mobile communication (AMC) system 18. The AMC is implemented, for example, as a communications device on vehicle, for example a truck. The dispatcher 12 is located at a custom premises, for example at a management office of a trucking company having a fleet of trucks. The dispatcher 12 sends and receives signals to and from the satellite communication switching office 14 via a leased communication line of a public packet switched network 20, for example a X.25 network.

The satellite communication switching office 14 includes a satellite antenna 22, and a land earth station (LES) 24 that interfaces between the satellite antenna 22 and the public X.25 network 20. Data packets carrying satellite messages received from the dispatcher 12 via the X.25 network 20 are reassembled by the LES 24, and transmitted to the satellite network 16, preferably using an enhanced satellite communications protocol that provides packet communications between the LES 24 and the AMC 32 without the necessity of additional earth stations to transmit signaling and control messages to the satellite network 16. The communications requirements for the enhanced satellite communications protocol of the preferred embodiment is described in more detail in commonly assigned, copending application Ser. No. 08/654,453, filed May 28, 1996, entitled IMPROVED COMMUNICATION PROTOCOL FOR SATELLITE DATA MESSAGING, the disclosure of which is incorporated in its entirety herein by reference.

Satellite messages received from the mobile user via satellite network 16 by the LES have addresses identifying the recipient of the satellite message, described below. If the intended recipient is the dispatcher 12, the LES 24 transparently forwards the received message byte stream plus a header from the satellite network 16 to a customer premise gateway (CPG) 26 at the dispatcher 12 via the public X.25 network 20. The CPG 26 includes middleware software 26*a* that communicates with the LES 24 via the X.25 network 20. The CPG middleware 26*a* receives the byte stream from the X.25 network 20, reassembles the satellite message from the received byte stream, and presents the reassembled message to the CPG application software 26*b*. The CPG application software 26*b* converts the reassembled message into a format usable by a computer-aided-dispatcher (CAD) 28 resident at the dispatcher 12, and outputs the converted message to the CAD application 28.

The dispatcher 12 and AMC stations 18 communicate using proformas—template forms to be used by the sender and having data fields. The AMC stations 18 have the proformas stored in memory, described below. Exemplary proformas include stop-over form used to inform the dispatcher 12 of an overnight stay, including date, time, and address fields. The dispatcher 12 would receive record of the address where trucker will be staying that evening. Other proformas include free form (text message), dispatch request, service request, etc. Each proformas may also include an acknowledgement field.

The proformas minimize the amount of data that needs to be transmitted over the satellite network 16 by transmitting a form identifier, and the binary data to fill in the form. Hence, there is no need for labels, screen positions, format commands, etc. to be sent, since each station can access the appropriate screen forms on the basis of the form identifier, and rebuild the original form display locally.

The computer-aided-dispatcher (CAD) application 28 provides the dispatching and e-mail messaging functions in a graphic user interface to enable a dispatcher to manage the fleet of mobile units. Proforma messages form the CAD application 28, described below, are converted and compressed by the CPG application software **26*b* from text data into a message carrying binary data. The message carrying binary data is then sent to the CPG middleware 26*a* software which converts the message to a byte stream for transmission to the LES 24 via the X.25 network 20**.

Figure 3A:
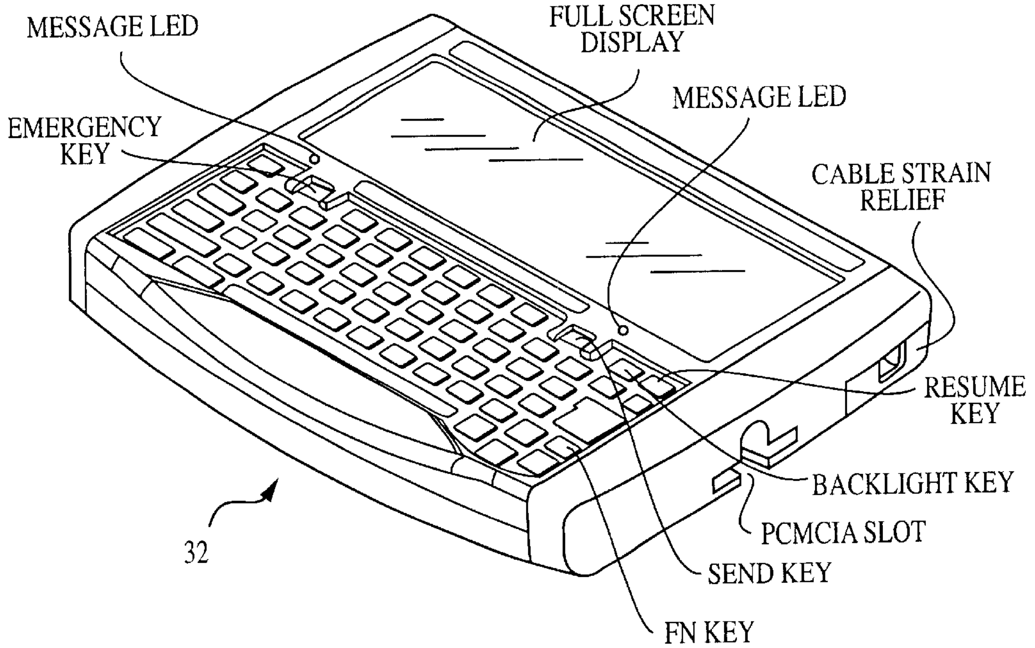
FIGS. 3A and 3B are views of a mobile communication terminal according to an embodiment of the present invention.
Figure 3B:
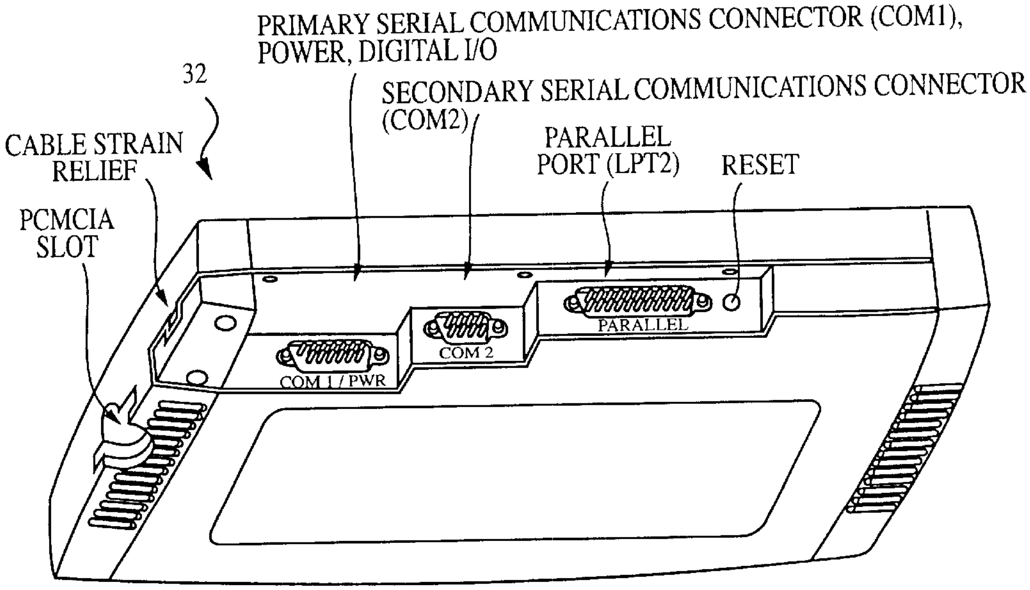

The AMC 18 is the mobile component of the Mobile Messaging Service (MMS) and preferably includes an OMNIDATA RDT-3000 Data Terminal Equipment (DTE) 32 connected to a Data Communications Equipment (DCE) 34 comparable with the above-described enhanced satellite communications protocol. An exemplary layout of the DTE 32 is shown in FIGS. 3A and 3B. The DTE 32 includes middleware software 36 and application software 38 controlled by a 25 MHz Intel 386 or better microprocessor. According to the preferred embodiment, the application software 38 will execute on the DTE under DataLight's ROM-DOS Version 6.2 operating system, and will integrate with the Trimble Galaxy Inmarsat-C/GPS (for spot beam roaming) DCE 34. The middleware software 36 provides a communications protocol enabling communication between the transceiver and the CPG. An exemplary middleware software is the Enterprise Messaging Services (EMS), Ver. 3, by Complex Architectures, Inc., a Sybase Company, Wakefield, Mass.

The AMC 18 has a proforma definition file in non-volatile memory. Hence, the Dispatcher 12 can create new proformas and download them via satellite to the mobiles 18, where the mobiles would accept the new form definitions and store them in the proforma definition file.

As described below, a user of the AMC 18 sends a message by selecting a proforma, filling out the form with the appropriate information and pressing the send button. In response to the send button, the application software 38 converts and compresses the text data into a message carrying binary data. The message carrying binary data is then sent to the middleware software 36 which executes the communication functions, including controlling the transceiver 34. The middleware software supplies a byte stream of the mobile message to the transceiver, which transmits the byte stream to the LES via the satellite network.

Figure 2A:
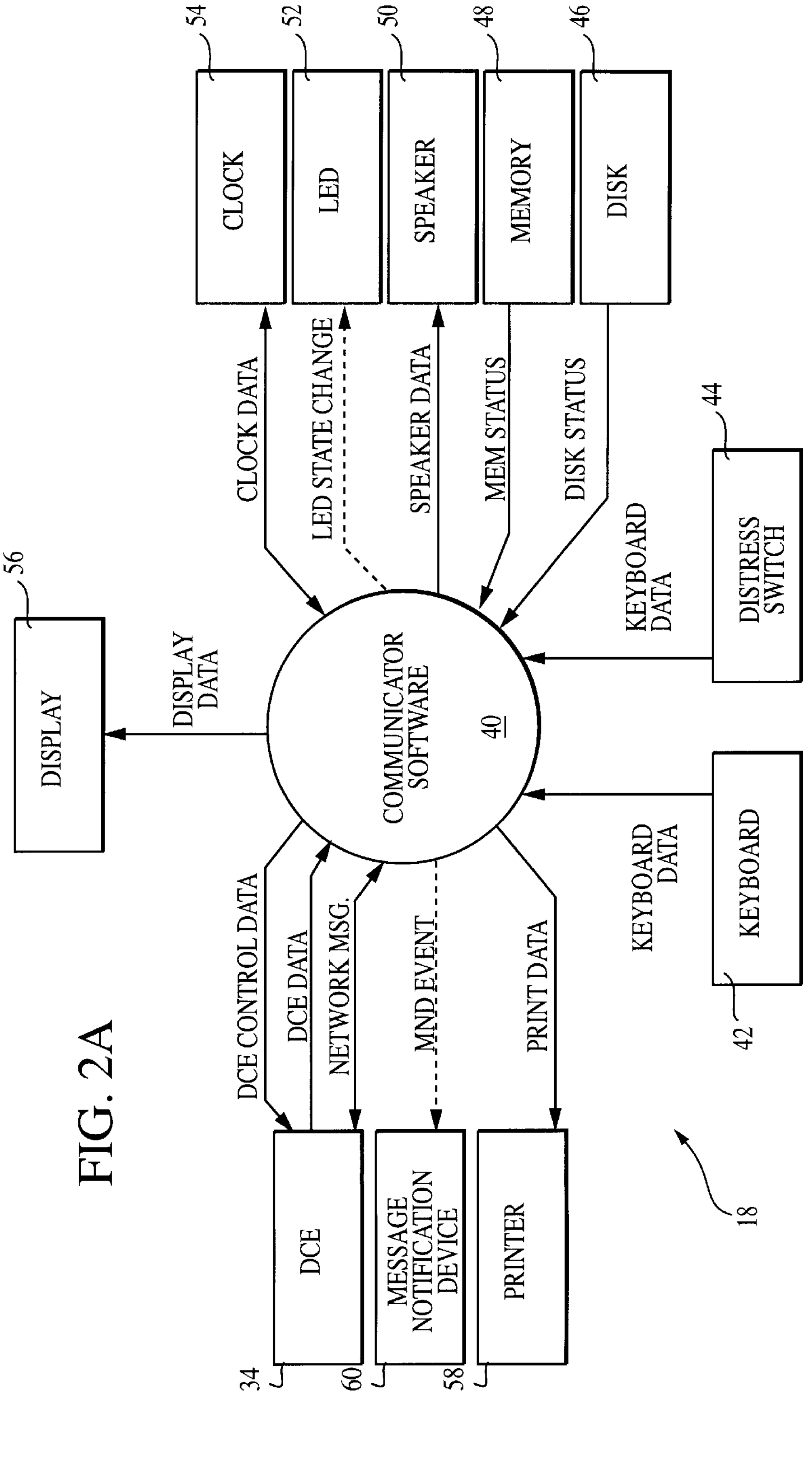
FIG. 2A is a block diagram illustrating the mobile communication system of the present invention.

FIG. 2A is a block diagram of the internal hardware and software structure of the AMC 18. The AMC 18 includes the communicator software 40 including the middleware software 36 and the application software 38. The DTE 32 includes hardware components interacting with the software 40, for example a keyboard 42 and a distress switch 44 on the keyboard and/or dashboard 42 that outputs an emergency message to the dispatcher 12 when depressed. The DTE 32 also includes a RAM Disk 46, for example in NVRAM, a read only memory (ROM) 48 storing the operating system, the software code, and selected configuration data. According to the preferred embodiment, the disk 46 has 2 Megabytes of random access memory that includes the standard 640 k/384 k used by the processor for the operating system, and the memory 48 includes one megabyte of protected NVRAM (flash) plurs 256 k for boot ROM. The DTE 32 also includes a piezo speaker 50, a message LED 52, a “READY” LED indicating the system is operational, and an internal clock 54. Display data is output to a display 56, described in detail below.

Additional peripheral devices may be connected to the DTE 32, including a printer 58 and a message notification device 60. The notification device 60 is preferably a localized RF paging device having a range of 100 meters for use when a driver is not within the vehicle. In such instances, the paging device 60 is activated when a satellite message having a predetermined priority level is received by the AMC 18.

Figure 2B:
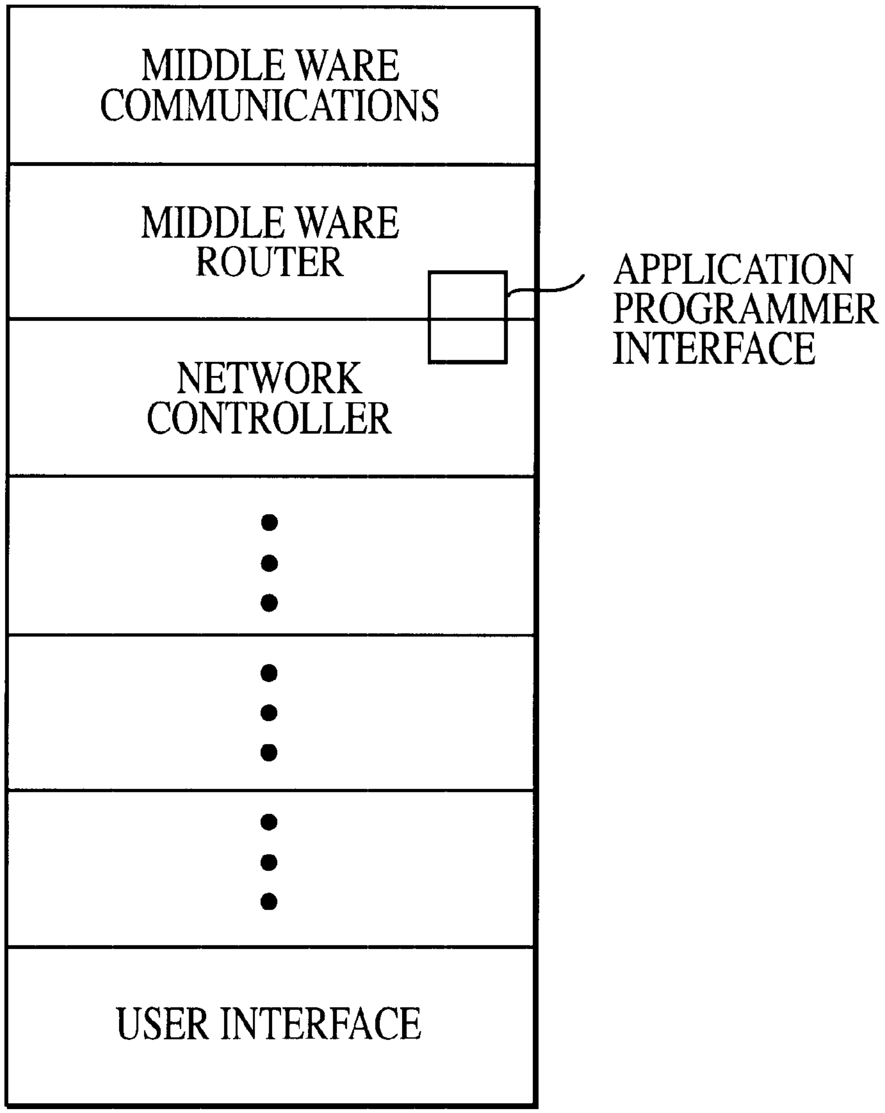
FIG. 2B is a diagram illustrating the layered structure of the software used by the mobile communication terminal of the present invention.

FIG. 2B is a diagram illustrating the layered structure of the software used by the mobile communication terminal of the present invention. In FIG. 2B, the mobile communications software features a layered software structure in accordance with the standards of the general ESO seven layer model. The layered structure permits individual layers to be easily replaced or modified. For example, by including a separate middleware communications layer, different low level communications code can be easily inserted or modified to support different radio transceivers. The middleware router layer supports different customer protocols or communications, and allows/facilitates the insertion or modification of same. The network controller layer allows or facilitates the insertion or modification of different network functionality. Finally, the user interface layer allows or facilitates the insertion or modification of new screen designs and/or information that is displayed to the user without requiring the recompilation of the software.

Figure 4:
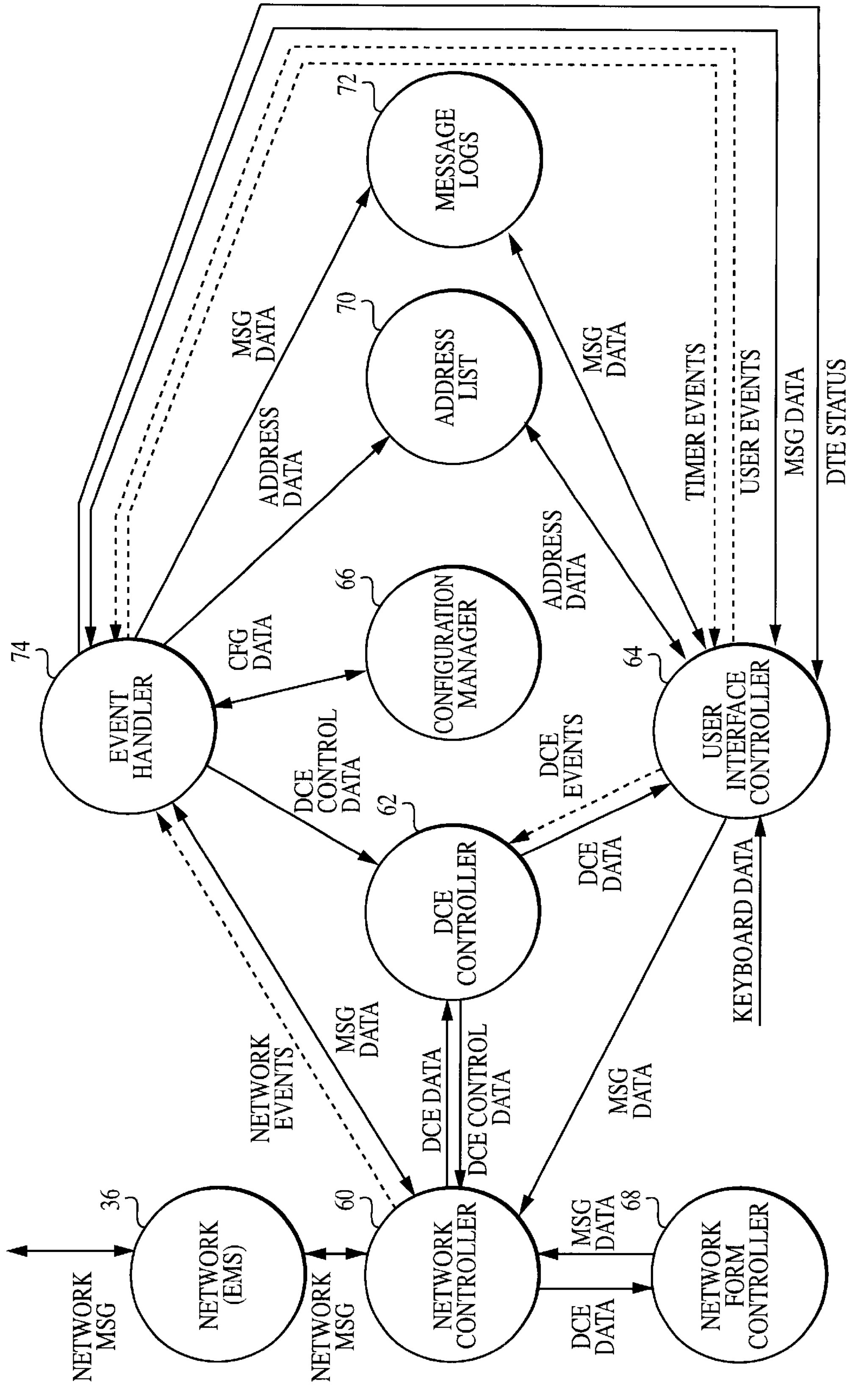
FIG. 4 is a diagram illustrating the software structure of the mobile communication terminal of the present invention.

FIG. 4 is a diagram of the software structure of the communicator software 40 according to an embodiment of the present invention. The Network portion 36 represents the middleware that controls the transceiver. As described below, the application layer 38 includes a network controller 60 that interfaces with the middleware 36 and an event handler 74 that manages the overall operations of the application layer 38. The network controller 60 handles all communications with the satellite network and interfaces with the middleware 36. The network controller 60 receives two types of messages from the middleware, namely user messages and device messages. A device message is a data packet including DCE data generated by the transceiver 34, for example configuration data or device status data. The communications middleware 36 recognizes DCE data from the transceiver 34 and forwards the DCE data to the network controller 60 as a device message. The network controller 60 passes the device message carrying the DCE data to the DCE controller 62.

The DCE controller 62, associated with the network controller 60, provides all control functions for the DCE 34. The DCE controller 62 allows a user to configure the transceiver as necessary for operations. In addition, the DCE controller 62 passes selected DCE data to the user interface controller 64 to enable the user of the AMC to view the state of the transceiver. The DCE controller configures the DCE or request actions at a high level. It does not participate in low-level protocol control.

The network controller 60 receives user messages from the satellite network 16, referred to as network event, and forwards the user message in accordance with the user message type. The network controller 60 can receive three different types of user messages from the satellite network, namely network messages, data messages, or user proforma messages. The network messages include messages from a network monitoring station related to performance of the satellite network. The data messages include configuration data or new proforma forms for use by the AMC user. The user proforma messages are the proforma messages that include messages for display to the user according to a selected proforma display format.

The network controller 60 forwards the data messages carrying configuration data to the configuration manager 4. The configuration manager 66 stores all configuration files for the AMC, including user-specific configuration files. Configuration files may be loaded into the configuration manager either by an external source, such as a PCMCIA card, or via the satellite network. Certain configuration files may be altered by the user as necessary, for example, user ID.

Proforma forms are handled by the network proforma controller 68. Data messages received by the network controller 60 that include new proforma forms are loaded into the network proforma controller 68.

The address list 70 manages the address book of the user. If the user attempts to send a message having an address not known to the system, the address of the message is automatically added to the address list 70. For example, if the AMC 18 receives a message from the satellite network and the user attempts to reply to the message, the address of the reply message is automatically loaded into the address list 70 if not already present. The address list 70 may include both single addresses for individual stations, or group addresses for a group of stations.

The address list 70 provides addresses based on the destination LES 24. Once a message is received by the LES, the LES determines how to route the message. Thus, if the message is intended for the dispatcher, the LES routes the message via the X.25 network. If the message is intended for another mobile, the LES retransmits the message to be intended mobile via the satellite network.

The message logs portion 72 includes an incoming message log, and outgoing message log, a network message log, a data message log, and a saved messages log. The incoming message log includes unread messages received from the satellite network. The outgoing message log includes messages to be sent to the satellite network, and includes messages to be retransmitted due to unsuccessful transmission. The network message log and data message log include the respective messages received from the satellite network related to network and AMC operations, and will also include a field specifying whether an acknowledgement of the message is transmitted by the AMC. Since the network message log and data message log are more directed to operations of the satellite network and the AMC, these logs will generally not be used by the typical user.

Figure 6:
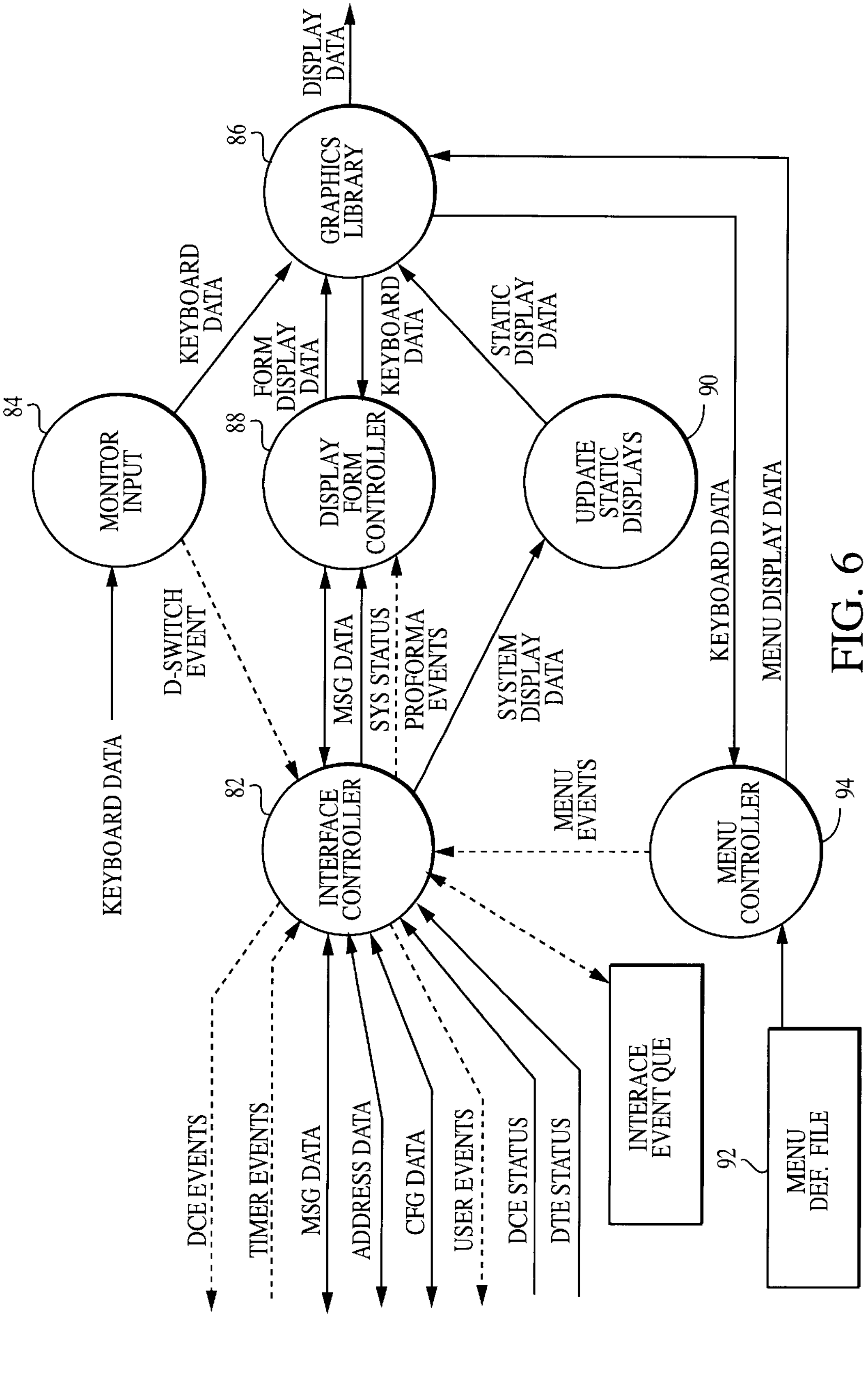
FIG. 6 is a diagram illustrating the software structure of the user interface controller of FIG. 4.

The user interface controller 64 handles all user interface events, including interaction with the display and keyboard inputs. FIG. 6 is a more detailed diagram of the software structure of the user interface controller 64. The user interface controller 64 includes a monitor input 84 that detects and processes all keyboard inputs from the user by outputting keyboard data to a graphics library 86 and a data switch event message to an interface controller 82. The graphics library 86 generates graphics display data for display by the LCD display. Thus, the keyboard data from the monitor input 84 is converted to a display character to provide the user with feedback of the keyed input. An example of the graphics library 86 is the commercially available QuickWindows Advanced for the C Programming Language, Rev. 2.50, from Software Interphase, Inc., Foster, R.I.

The interface controller 82 performs event handling for the user interface controller 64 in response to events detected from different portions of the software modules shown in FIG. 4. The interface controller manages the detected events by an interface event queue, that stores pending events to be processed. For example, in response to receiving message data representing a user proforma message, the interface controller 82 forwards the message data to the a display form controller 88, along with system status and proforma events that identifies a selected proforma form. The display form controller 88 in response access the configuration data for the selected proforma form from the network proforma controller 68 shown in FIG. 4, and generates the form display data including the display format for the selected proforma form, and selected system status displays, for example, "READY" and "SYNC'D" on the main transceiver screen indicating the transceiver is linked to the satellite network, etc.

The graphics library 86 also receives display data from a update static displays portion 90. The update static displays portion 90 receives system display data from the interface controller 82 (system status, date, time, etc), and periodically outputs updated static display, for example, every ten seconds. The user interface controller 64 also includes a menu controller 94 that allows a user to configure the display pull down menus, described below. Specifically, the user interface controller 64 includes a menu definition file 92 that includes default menu and at least one user-defined menu. The user can move, reorganize, and/or rename the default pull down menus and store the modified pull down menus in the menu definition file. The menu controller responds to keyboard data inputs from the user by outputting the corresponding display data to the graphics library 86. The menu controller 94 also outputs a menu event to the interface controller 82 in response to a selection by the user of a specific pull down menu function, at which point the interface controller responds to the selected pull down menu function.

The event handler 74 shown in FIG. 4 is responsible for overall operations of the AMC application software. The event handler minimizes complexity of the AMC application software, enabling AMC operations to be performed using a minimal amount of software. For example, if a data message is received by the communications middleware 36 from the satellite network, the communications middleware 36 passes the message to the network controller 60. The network controller 60 notifies the event handler 74 of the occurrence of a network event. If the data message includes configuration data, the event handler 74 passes the data message to the data message log in the message logs portion 72 and the configuration manager 66. Similarly, if the communications middleware 36 receives a user message from the satellite network, the user message is passed to the network controller 60, which notifies the event handler 74 of the network event. The event handler 74 in response transfer the user message data to the incoming message log of the message logs portion 72 and the user interface controller 64, which informs the user of the new message via the update static display portion 90.

The user accesses the received message by activating the incoming log, whereby the user interface controller responds to the keyboard data by passing an event through the event handler 74 to the message log 72. The message log 72 in response sends the data representing the contents of the incoming log to the user interface controller 64 for display to the user.

After the display of the incoming log, the event of selecting a desired message by the user causes the display form controller 88 to access the proforma form data for the proforma form corresponding to the selected message. The user interface controller 64 also access the data corresponding to the selected message from the message log 72 under the control of the event handler 74. After the data for the selected message and the proforma form are accessed, the graphics library 86 combines the data for the message with the proforma form and displays the desired message.

Figure 5:
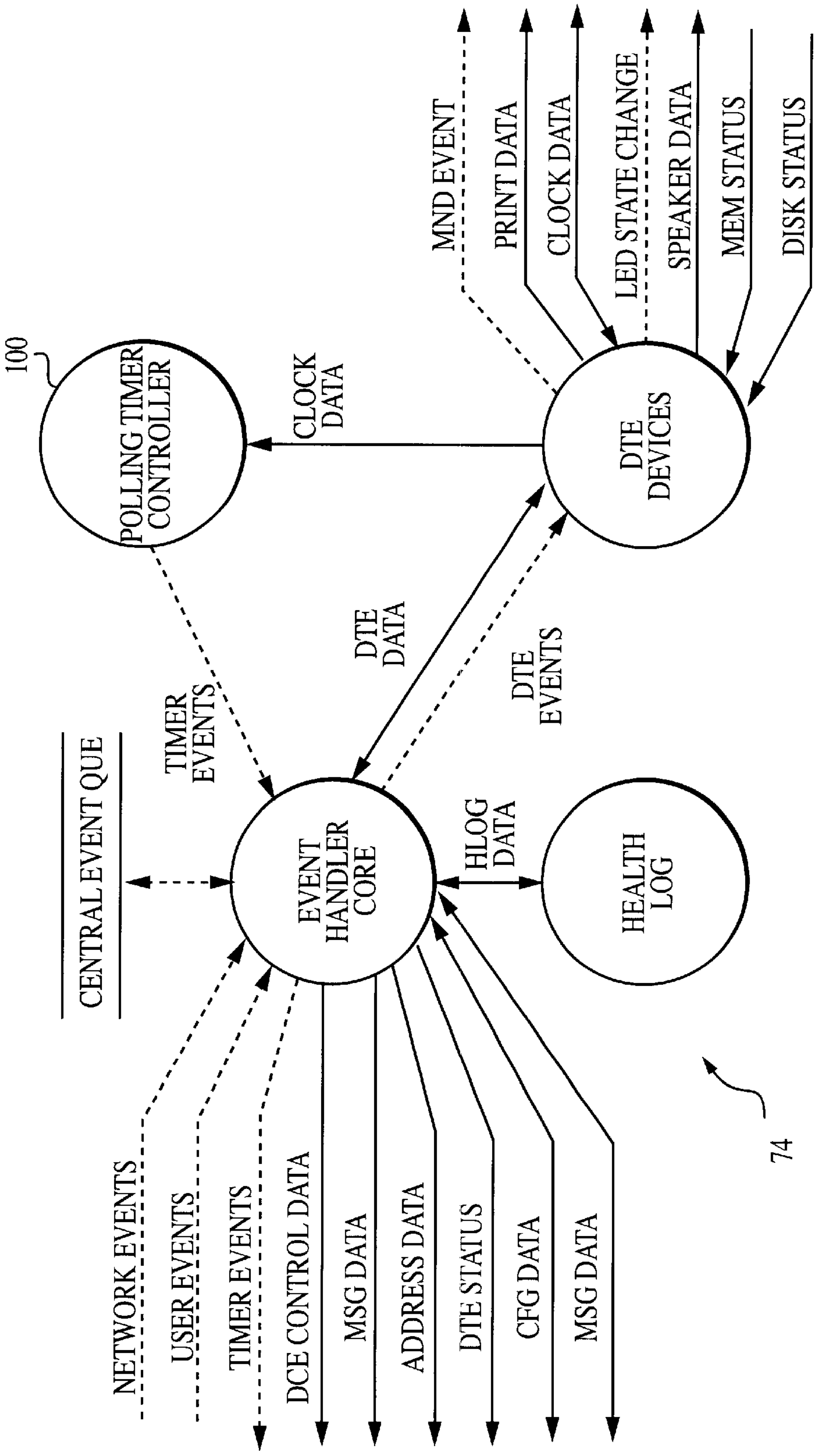
FIG. 5 is a diagram illustrating the software structure of the event handler of FIG. 4.

FIG. 5 is a diagram of the event handler 74. The even handler 74 is divided between handling events at timed intervals and handling events at random intervals. The event handler 74 includes a polling timer controller 100 having internal timers to generated specified events at predetermined intervals. For example, one timer controls the frequency at which messages are sent and received, whereby the communications middleware is checked once a second for incoming messages, and messages are sent at a rate no greater than once a second. Hence, the controlled execution of events at specified intervals ensures that the middleware is not overloaded with service requests.

Hence, the software arrangement within the AMC can be optimized for minimal hardware memory requirements by limiting the execution of events to a sufficiently slow rate to enable the middleware to serially complete execution of tasks.

Moreover, the software arrangement within the AMC provides cooperative multitasking, whereby system operations are performed in the background and transparent to the user. Hence, a user may be typing a message while an incoming message is received from the transceiver.

Figure 7A:
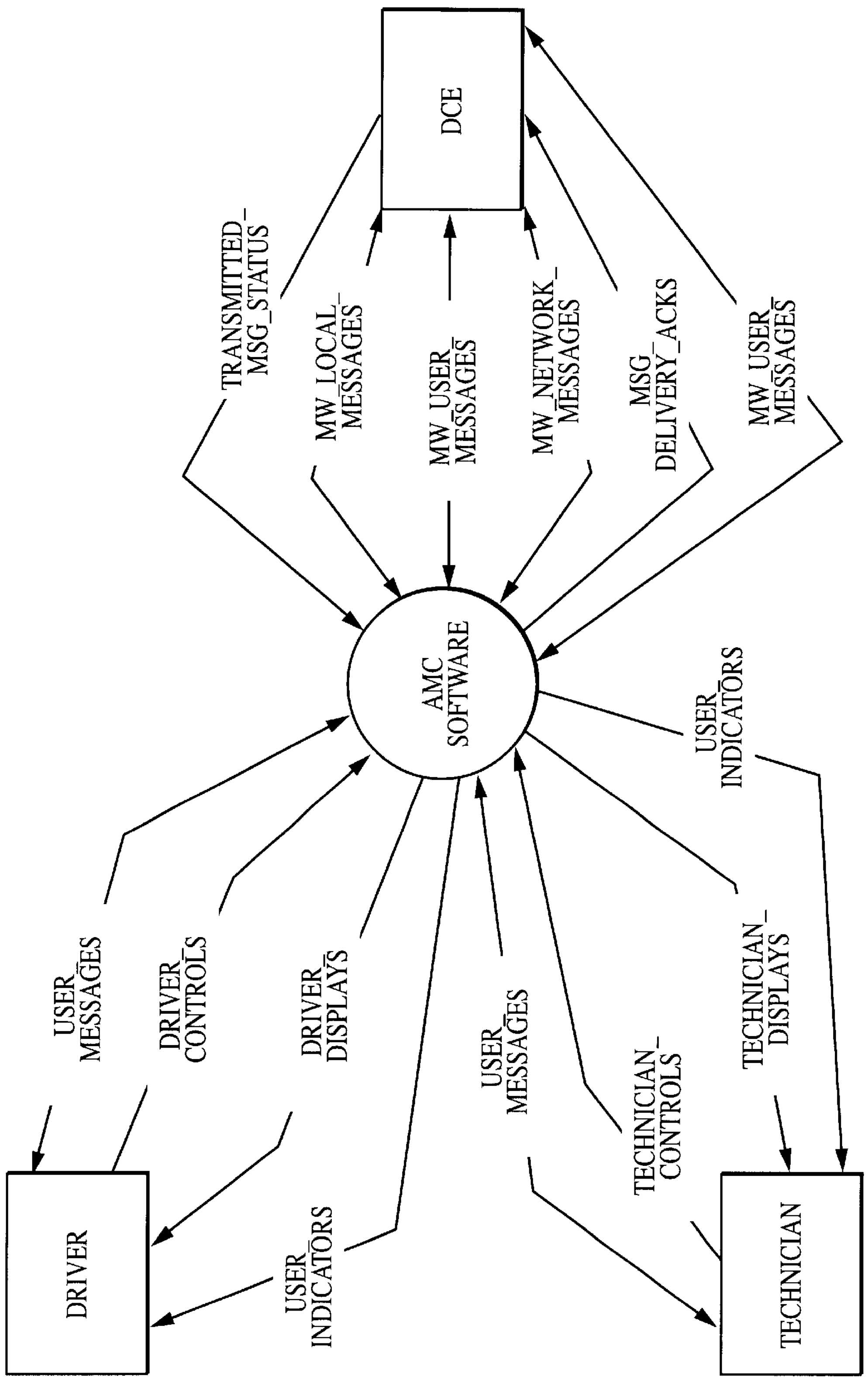
FIGS. 7A and 7B are diagrams illustrating the software contexts of the interfaces to the software of the mobile communication system of the present invention.
Figure 7B:
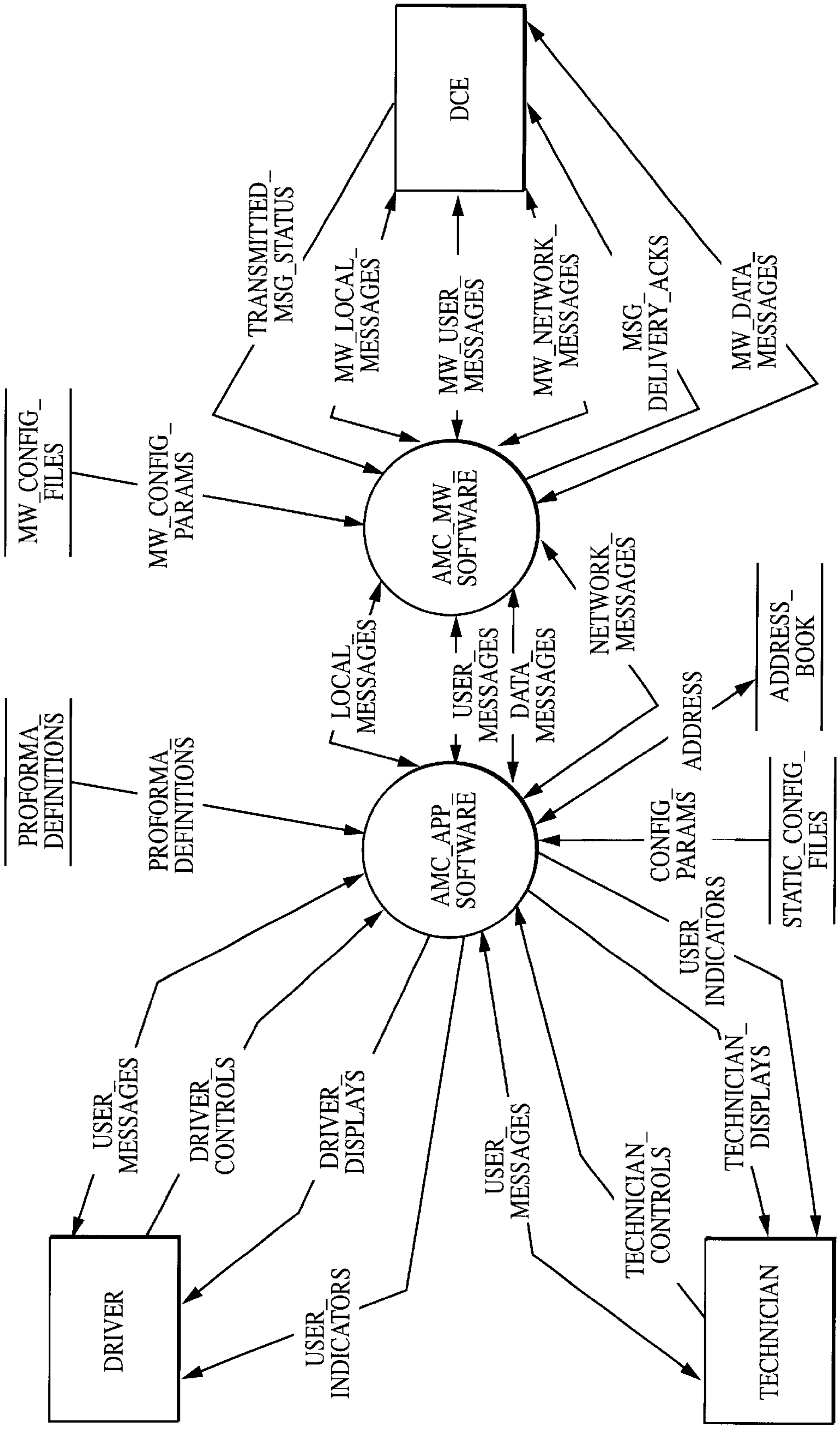

FIG. 7A is the AMC_Software Context Diagram, and shows the context within which the AMC software will execute. This software will interface with a driver (or 'end-user'), a technician (or administrator) and the DCE. FIG. 7B, AMC_Software, shows the decomposition of the AMC software into its application and middleware components. The application software described herein preferably integrates with the chosen Enterprise Messaging Services middleware software, as well as other communications middleware. Each of the interfaces shown in FIGS. 7A and 7B are defined in Section 2, External Software Interfaces. The term 'software' refers to the 'application software' component whose requirements are being specified. In those instances where the middleware software component is specifically discussed, it is referred to as the 'middleware software'.

The AMC application software will support two AMC system modes: 'end-user' and 'admin'. These two modes are based on the two types of users who can operate the application software: end-users (i.e. drivers) and administrators (i.e., service technicians). The software will allow the user to perform different sets of operations based on whether the AMC system is operating in end-user or admin mode. Note that the software will provide all of the features available in end-user mode in admin mode as well. When the AMC's DTE is powered up, it will present a timed menu allowing service technicians to enter "admin" mode by entering the appropriate password. If no input is made or the password is entered incorrectly, the software will automatically boot into end-user mode. If the input is made and the password is entered correctly, then the software will present the admin user with a DOS prompt. The admin user will then be allowed to perform several functions:

Use the built-in DTE editor to edit the various configuration files used by the operating system, application and middleware software, Place the system/software into admin mode by executing the admin application software with a command line parameter indicating 'admin' mode and entering the 'admin' password as indicated in Section User Interface; this will allow the admin user to access all software features provided in end-user mode as well as additional features only provided in admin mode (e.g. system configuration), Automatically configure the DCE using a predefined DCE Configuration File contained on the SRAM card by executing the admin application software with a command line parameter indicating the name of the DCE configuration file.

The requirements of the application software when functioning in either end-user or admin mode will now be described. All features that will only be provided to the admin user when the software is functioning in admin mode will be identified by 'Admin'.

External Software Interfaces

The following section describes each of the application software's external interfaces shown in FIGS. 7A and 7B. The requirements for the contents of the data stores shown in FIG. 7B (e.g., Proforma_Definitions) are described below.

Address (data flow)=

*an address object, containing an alias and optionally an address type and address value*.

Config_Params (data flow)=

*all configuration parameters read from configuration files by the AMC application software; these include DTE configuration parameters, DCE configuration parameters that the software will send to the DCE, menu and function key definitions, etc.*.

Data_Messages (data flow)=

*messages transmitted between the AMC and computer equipment at an MMS dispatcher's premise containing binary data such as proforma definitions, engine monitoring data and bar code reader data*.

Driver_Controls (data flow)=

*includes all commands entered by driver via user interface, as well as activation of the dash switch*.

Driver_Displays (data flow)=

*includes all displays presented to the driver via the AMC screen*.

Local_Messages (data flow)=

*DCE Configuration, Command, Command Response and Event messages: i.e., messages exchanged between the application software and the DCE that are not transmitted over the satellite network. This also includes MW_Control_Messages and MW_Status_Messages.*.

Msg_Delivery_Acks (data flow)=

*delivery acknowledgements sent by middleware as a result of incoming messages from LES and Dispatcher Site*.

MW_Config_Params (data flow)=

*configuration parameters used by the middleware to control its operation*.

MW_Control_Messages (data flow)=

*messages sent to the middleware commanding it to perform some action; e.g., initialize, terminate, send message, receive message, query message delivery status, acknowledge message receipt; note that this flow is not shown since it is part of the Local_Messages flow*.

MW_Data_Messages (data flow)=

*a Data_Message that also contains the middleware's control information*.

MW_Local_Messages (data flow)=

*DCE Configuration, Command, Command Response and Event messages in the format the middleware uses to communicate with the DCE*.

MW_Network_Messages (data flow)=

*a Network_Message that also contains the middleware's control information*.

MW_Status_Messages (data flow)=

*a status message returned from the middleware to indicate its status or the delivery status of a message; note that this flow is not shown since it is part of the Local_Messages flow*.

MW_User_Messages (data flow)=

*a User_Message that also contains the middleware's control information*.

Network_Messages (data flow)=

*messages transmitted between the AMC and a Network Management Station containing network management commands and information; these include AMC Control, Configuration, Information and Periodic Health Messages*.

Proforma_Definition (data flow)=

*a definition of a message proforma or a field list proforma*.

Technician_Controls (data flow)=

*includes all commands entered by technician via user interface, as well as activation of the dash switch*.

Technician_Displays (data flow)=

*includes all displays presented to the technician via the AMC screen*.

Transmitted_MSG_Status (data flow)=

*delivery status from DCE (originating at LES) of a User_Message or Network_Message that application software has requested to be transmitted*.

User_Indicators (data flow)=

*all indicators to the driver or technician other than via the AMC screen; includes LED activations and audio activations*.

User_Messages (data flow)=

*all messages entered by driver or sent by dispatcher to communication information between the two*.

Functional Software Requirements

The following subsections detail the functional requirements of the AMC software. These requirements are organized around the system objects to which they apply.

Address

The software requirements in this section relate to the Address object. An address in this context is a destination to which (or from which) a user or network message can be sent. The software will support two address modes: single primary destination mode and multiple primary destination mode. The software will determine which mode the AMC is to function in based on the Addr_Mode configuration parameter. The distinction between the two modes is as follows. In 'single' mode, the software will always send messages over the network to the same physical address with varying logical addresses (i.e. address aliases). In 'multiple' mode, the software may send messages over the network to different physical addresses with varying logical addresses. In single mode, there is no need for the software to maintain a physical address along with each address object since it always sends to the same physical address; in multiple mode, the software will maintain a physical address for each address object since each address alias could potentially be associated with a different physical address.

The software will maintain address objects. An address object will consist of an address alias and, depending on whether the AMC is configured for single or multiple primary destination mode, an address type and an address value. The software will maintain the address alias as an alphanumeric string containing between 1 and 8 ASCII characters. The software will support optional address types of 'DNID', 'Network', 'SAC' (Special Access Code) and Mobile Id. The software will maintain the optional address value as an alphanumeric string containing between 1 and 14 characters. Note that if the address value is present, it will contain a number in the range of 1–65535 for 'DNID' address types, a 14 character address (e.g. an X.121 address) for 'Network' address types, a six-character alphanumeric string for 'SAC' address type and a number in the range of 1–999999999 for 'Mobile Id' address types.

The software will automatically create and delete address objects based on specific user interface actions and specific messages received at the AMC. The requirements specifying how these objects are created and deleted are specified in Section Address Book.

Address Book

The software requirements in this section relate to the Address Book object. An address book in this context is one or more lists of address objects. The software will maintain one address book, which will be a combination of two address lists; each address list will contain address objects whose contents are based on the AMC's currently configured address mode as described in Section Address. The software will maintain one address list on the Flash-ROM disk and one on the RAM disk. The maximum number of address objects that will be maintained by the software in the RAM address list will be indicated by the Max_RAM_Addresses configuration parameter.

The user interface for creating, modifying and clearing the Flash-ROM address list, as well as the software required to place the address list on the Flash-ROM disk, is external to the application software. Maintenance of the Flash-ROM address list will be performed by the admin user using external software tools. The software will provide error messages to the user in the status are described in Section User Interface when it encounters errors reading the Flash-ROM address list.

The software will automatically add address objects to the RAM address list when the AMC user sends a user message to an address alias that does not currently exist in either address list. Note that the software will not update the RAM address list when network messages are sent to address alias that do not exist in the address list. If the RAM address list is full, the software will prompt the user for whether or not they want to delete an existing address object from the RAM address list. If they do, then the software will present a list of all address aliases in the RAM address list to the user and allow them to select the one to delete. Once the user selects the desired address alias, the software will automatically delete that address object from the RAM address list and will add the address object associated with the message being sent to that address list. The specific user interface requirements for this process are described in the User Interface.

The software will automatically update the physical address of address objects in the RAM address list when the user sends a user message to an address alias that does exist in the RAM address list but has a different physical address this could only happen if the user is replying to a message and the incoming message contained a reply address and the AMC is functioning in 'multiple' address mode; see Section Network.

The software will allow the user to designate any address object within the address book as the 'destination address', and to designate one address object within the address book as the 'Default Address'. If an entry exists in both the Flash-ROM and RAM address lists with the same address alias, the software will use the address value associated with the address object in the RAM address list. If more than one entry exists in the FLASH-ROM address list with the same address alias, then the software will use the first alias in the list and ignore the others. If more than one entry exists in the RTAM address list with the same address alias, then the software will use the first alias in the list and ignore the others. The requirements specifying how the user interfaces with the address book/lists are described in Section User Interface.

DCE

The software requirements in this section relate to the DCE object. A DCE in this context is a physical transceiver connected to the DTE that provides the underlying message transmit and receive capabilities required to communicate over the network. The application software will communicate with the DCE in order to configure and control is functionality. Note that the middleware software will also communicate with the DCE in order to perform the message send and receive functions, to monitor its health to determine if messages can be sent and received, to establish communications with the DCE upon DTE or DCE power-up, etc. The application software will use the middleware software to send the configuration and control commands described in this section.

The software will send the DCE command messages and DCE configuration messages, specified below, to the DCE as requested. The software will send these messages in order to perform the following functions:

Direct the DCE to perform an immediate action.

Query the DCE for its internal parameters.

Query the DCE for internal values that indicate its current health.

Configure the DCE's internal parameters [Admin].

The software will receive the DCE command response messages returned by the DCE when any of the DCE command and configuration messages are sent. Upon receiving a DCE command response message that indicates an error, the software will report that error to the user as described in Section User Interface, and will log that error in the AMC health log as described in Section Health Log. The software will use the data returned in the DCE command respond messages as needed for the following purposes:

To display it on the DTE's Monitor Transceiver Status screen as described in Section User Interface.

To evaluate automatic data variables contained in proforma messages to be transmitted over the network as described in Section Message Proforma.

To include it in the health log as described in Section Health Log.

To include it in a periodic health report as described in Section Network.

Each of the four purposes listed above has a corresponding configuration parameter or value that indicates the interval at which data should be retrieved for that purpose; these are the Display_Update_Interval configuration parameter, the Max_Auto_Data_Age configuration parameter, the Health_Log_Update_Interval configuration parameter and the value specified by the ENABLE-HLTH-RPT command, respectively. The software will send the necessary DCE command messages to query the DCE for the data needed for each of these purposes at an interval specified by the minimum of the four parameters and values that currently apply (e.g., if the Monitor Transceiver Status screen is not displayed, the software will not consider the Display_Update_Interval configuration parameter when determining the query interval; if periodic health reports are not currently enabled, the software will not consider the associated value when determining the query interval).

The specific format of each DCE command, configuration and response message is described in the published specifications for the Trimble transceiver, described above. The admin software will be able to read a DCE Configuration File containing aliases for the various DCE configuration parameters and the values to which they will be configured. The software will send the appropriate DCE configuration messages to the DCE in order to set each of the parameters to the values contained in the file. The software will report errors encountered during this process to the user as described in Section User Interface. The software will allow the [Admin] user to select this function and enter the name of the DCE configuration file as described below. The software will also allow the name of the file to be provided on the command line of the admin application software as described in Section 1.6, System Modes. The requirements for the contents of this file are described below. The DCE's configuration parameters can be modified via polls sent from the LES without the application software being informed. For this reason, the application software cannot assume that the DCE's configuration parameters are always set to the values last set or queried by the software.

The admin software will place an indication that the DCE's configuration has changed on the DTE's RAM disk each time it sends a DCE configuration message to the DCE. Upon initialization, the end-user software will check to see if this 'DCE configuration change' indication exists; if it does exist, the software will automatically send a 'DCE Config Changed' fixed-format message to the network management station whose address type is provided by the Default_Nms_Addr_Type configuration parameter and whose address is provided by the Default_Nms_Addr_Value configuration parameter; the end-user software will remove the 'DCE configuration change' indication from the DTE's RAM disk after successfully sending the message.

The software will receive DCE Event Messages generated by the DCE. These messages, whose contents are strings of ASCII characters, provide information about activities occurring within the DCE and the network. The software will display all DCE event messages on the user interface is requested by the user as described in Section User Interface. The software will recognize certain DCE event messages and will place those events in the health log described in Section Health Log. The software will also recognize the 'distress alert acknowledgement' event message and will indicate to the user that the acknowledgement has been received as specified in Section User Interface. The specific DCE event messages that the software will recognize are listed below.

DTE

The software requirements in this section relate to the DTE object. A DTE in this context is a device that provides the user interface of the AMC, contains and executes the software necessary to provide all system features to the AMC user and provides the overall control of the DCE. The DTE used as part of the AMC is an OMNIDATA RDT-3000, which contains a CGA monitor, a 'Ready' LED, a 'Message' LED, a keyboard, a speaker, a Boot-ROM disk, a Type-II PC-MCIA slot, a Flash-ROM disk, a RAM disk and RAM. In addition, the DTE optionally includes an distress switch and various alarm devices such as a pager, an audible alarm or a strobe light; the switch and alarm devices are physically connected to the DTE via its communication ports.

As further described below, the software will:

Maintain the state and configuration of the AMC system.

Process network messages sent to the AMC directing it to change its configuration or report on its state or configuration.

Send network messages from the AMC reporting the current AMC state and configuration.

Control the DTE's hardware devices.

Providing information pertaining to the state of the DTE hardware and software for inclusion in the AMC's health log and periodic health reports.

The software will maintain the date and time within the AMC using the DTE's date and time functions. The software will maintain these values using the UTC time system. The software will update the DTE's date and time with the date and time obtained from the DCE's GPS module every six hours to compensate for any inherent drift in the DTE's time clock.

The software will maintain the configuration of the AMC via permanent, static and dynamic configuration parameters. Permanent configuration parameters are those parameters that are built into the application software; the software will maintain its version number and the admin user password as permanent configuration parameters. Static configuration parameters are those parameters that are preset by the admin user and can only be changed by the admin user or by network messages that are received at the DTE. Dynamic configuration parameters are those parameters that can be modified by any user as described in Section User Interface.

The software will be able to read static configuration files that contain the values of all static configuration parameters. These files, described below, will be stored on the Flash-ROM disk. The user interface for creating, modifying and deleting static configuration files, as well as the software required to place these files on the Flash-ROM disk, is external to the application software. Maintenance of the static configuration files will be performed by the admin user using external software tools. The software will provide error messages to the user as described in Section User Interface when it encounters errors reading these configuration files.

Upon initialization, the software will configure the AMC system as required based on the static configuration parameters described below, and the permanent and dynamic configuration parameters described in this section. The software will use the values of these configuration parameters to control the AMC's functionality.

The software will maintain dynamic configuration parameters that can be modified by the user as described in Section User Interface. The software will store these dynamic configuration parameters on the DTE's RAM disk so they will be persistent if the software is reinitialized. The software will use the values of these configuration parameters to control the AMC's functionality as described with each dynamic configuration parameter listed below:

Current time zone indicates the time zone that will be used when displaying all dates and times to the user; valid values are:

AST (Alaska)
ADT
EST (Eastern)
EDT
CST (Central)
CDT
GST (Greenland)
GDT
HST (Hawaii-Aleutian)
HDT
MST (Mountain)
MDT
PST (Pacific)
PDT Default address alias indicates the address alias within the AMC's address book to be initially selected as the destination address for all messages the user wants to send Function key definitions indicates the particular menu item that is to be selected when the user presses one of the OMNIDATA's 12 function keys.

The software will receive AMC Control Messages and AMC Configuration Messages (as described in Section Message) from the network. These messages will be sent to the software as proforma messages and may make use of the 'command field type' and 'automatic reply' message proforma features described below. The software will process each of these messages as required by the specific command that is sent. The commands that can be included in these messages, and the processing required for each, are listed below.

The software will automatically send AMC Information Messages (as described in Section Message) over the network in response to AMC Control Messages received from the network that request an 'automatic reply'. AMC information messages may be proforma messages whose message proforma uses the 'automatic data variables, or they may be fixed-format messages described and listed below.

The software will interface with and control each of the DTE's peripherals and hardware devices. The software will read and write files stored on the DTE's RAM disk and on SRAM cards inserted into the DTE's PC-MCIA slot. The software will read files stored on the DTE's Boot-ROM and Flash-ROM disks. The software will interface with the DTE's keyboard, CGA monitor, LEDs, speaker and distress switch as described in Section User Interface. The software will activate the DTE's alarm device each time a user message is received at the DTE. The software will determine the percentage of used memory within its RAM or any of its disks whenever requested by a user interface action, or by an automatic data variable within a message proforma. The software will activate the printer connected to the DTE as described in Section Printer.

The software will monitor the mobile's speed over ground reported by the DCE and will deactivate the DTE's display whenever that speed exceeds the value specified by the Max_Operating_Speed configuration parameter; if that parameter's value is a negative number, the software will not deactivate the DTE's display.

The software will evaluate the state of the DTE hardware and software as required to place information into the AMC's health log described in Section Health Log. In addition, the software will update the health log with any severe 'exception' or 'error' events it detects within the DTE hardware, operating system software, middleware software of application software.

Health Log

The software requirements in this section relate to the Health Log object. A health log in this context is an object that contains ongoing information about the health of the AMC. The software will maintain an AMC health log. The software will periodically place information about the current state of the DTE and DCE hardware into the health log. The software will update the health log based on the period indicated by the Health_Log_Update_Interval static configuration parameter. The information that will periodically be placed into the health log is described below.

In addition to this 'periodic' information, the software will log specific DCE events as reported by DCE Event Messages (and the event's UTC time). The DCE events that will be logged are specified below. The software will log DCE events in 'event_code:line 2—line n' format where 'event_code' is the number returned in the first line of every event message and 'line 2—line n' represents the exact contents of the event message beginning with the second line.

The software will log exception or error events that it detects via a DCE Command Response Message or within the DCE, DTE, network, middleware software, application software or operating system software. The software will place these events in the health log along with the UTC time they occurred. The software will monitor the size of the health log to ensure that it doesn't exceed the size specified by the Max_Health_Log_Size static configuration parameter. If data to be inserted into the health log would cause the log to exceed this size, the software will delete the oldest data from the log prior to inserting the new data ('old' is based on the time the data was placed into the log).

The software will maintain the AMC health log on the RAM disk. The user interface for viewing the health log is external to the application software; i.e., the admin user will use external software tools to view the health log.

Message

The software requirements in this section relate to the Message object. A message in this context is an object that is:

Presented to the user in the form of text,

Entered by the user in the form of text,

Transmitted to the application software by the middleware software, and/or

Transmitted to the middleware software by the application software.

Messages are classified into three categories: User Messages, Network Messages and Local Messages. User messages are those messages that the AMC user enters for transmission to another use of the messaging service and those messages entered by another user of the messaging service for delivery to this AMC user. All user messages will be defined and formatted according to the message performas described below, and all user messages to be transmitted from the AMC may use the message proforma automatic data variable features detailed below.

Network messages are those messages sent to the AMC from a remote network management station to control the DTE or DCE, configure the DTE or DCE, or query the DTE or DCE for configuration information or current DTE and DCE 'health' information that relates to network management; network messages also include the responses to these messages sent from the AMC to a remote network management station. Network messages are further classified into the following categories:

* AMC Control Messages
  Messages sent to the AMC via the network to direct the DTE to perform some action (this action may include directing the DCE to perform some action.)
* AMC Configuration Messages
  Messages sent to the AMC via the network commanding the DTE to change its configuration or commanding the DTE to change the configuration of the DCE.
* AMC Information Messages
  Messages sent from the AMC via the network to report current DTE or DCE health or configuration information.
* AMC Periodic Health Messages
  Messages sent from the AMC over the network at a given interval reporting current DTE and DCE health information.

Most network messages will be defined and formatted according to the message proformas described below, and may use the message proforma automatic data variable and command features detailed below. Note that message proformas containing commands may only be used for messages being transmitted to the AMC. Some network messages will be 'fixed-format' messages.

Local messages are those messages transmitted between the application software and the middleware software that are not transmitted over the network. These messages relate to DCE control and configuration, and status reporting, and are further classified as follows:

* DCE Command Messages
  Messages sent from the DTE to the DCE to direct the DCE to perform some action.
* DCE Configuration Messages
  Messages sent from the DTE to the DCE to direct the DCE to change its configuration.
* DCE Command Response Messages
  Messages sent from the DCE to the DTE in response to a DCE command or configuration message.
* DCE Event Messages
  Messages sent from the DCE to the DTE as a result of events detected by the DCE.
* Middleware Control Messages
  Messages sent from the application software to the middleware software commanding it to perform some action.
* Middleware Status Messages
  Messages sent from the middleware software to the application software indicating middleware status or the delivery status of messages.

All local messages will have fixed format, i.e., they will not use message proformas. The general content requirement for local messages are described below. DCE command, configuration and event messages are also described below. The software will process message objects. User and network message objects will have the following attributes:

* Type (proforma or fixed-format)
* Class (user or network)
* Identifier (proforma id or fixed-format message id)

* Alias (proforma alias for proforma messages; static alias (e.g. PVT Results) for fixed-format messages)
* Middleware identifier (unique identifier assigned by middleware for transmitted messages)
* Source address (alias, type, value)
* Destination address (alias, type, value)
* Delivery priority (distress alert, emergency, high, medium, low)
* Acknowledgment requested (device, service, router, application)
* Sent or received date/time (using UTC)
* MRN/PDN/NDN list (there may be a list of MRNs/PDNs/NDNs since the middleware software segments messages and transmits them as multiple messages compatible with the enhanced satellite communications protocol)
* Delivery status
* Failure code/reason for non-delivery
* Message-specific variable length data.

Local message objects will have the following attribute:

* Message-specific variable length data.

For user and network messages to be sent from the DTE, the software will remove unnecessary attributes prior to giving the message to the middleware software for transmission; the content requirement of each message type/identifier as it will be transmitted to and received from the middleware software is described below, and discusses sending messages over the network.

The software will be able to print any user message object; the software will use the message proforma associated with the message object to format the printed message; the software will include field labels defined in the message proforma in the formatted printout. Other processing required for message objects depends on whether the message is a user, network or local message, whether the message is being received or being sent by the application software, and the specific type/identifier of the message. The specific processing required for each category and subcategory of messages is described in the sections identified below:

* User Messages
  Sections Message Logs; Network, and User Interface
* Network—AMC Control Messages
  Sections DTE; Message Logs; and Network
* Network—AMC Information Messages
  Sections DTE; Message Logs; and Network
* Network—AMC Periodic Health Messages
  Section Network
* Local—DCE Command Messages
  Section DCE
* Local—DCE Configuration Messages
  Section DCE
* Local—DCE Command Response Messages
  Sections DCE; and Health Log
* Local—DCE Event Messages
  Sections DCE; Health Log; and User Interface
* Local—Middleware Control Messages
  Section Network
* Local—Middleware Status Messages
  Sections Network; and User Interface.

Note that while all requirements associated with the various categories and subcategories of messages are in the sections identified above, other sections include related information that may aid in the understand of these messages; these are:

* User Messages
  Sections Message Proforma and Field List Proforma
* Network—AMC Control Messages
  Section Message Proforma, and Message Proforma Automatic Data Variables and Commands
* Network—AMC Configuration Messages
  Section Message Proforma, and Message Proforma Automatic Data Variables and Commands
* Network—AMC Information Messages
  Periodic Health Log and Health Report Contents
* Local—DCE Command Messages
  DCE Command, Configuration and Event Messages
* Local—DCE Configuration Messages
  DCE Command, Configuration and Event Messages
* Local—DCE Event Messages
  DCE Command, Configuration and Event Messages.

Message Proforma

The software requirements in this section relate to the Message Proforma object. A message proforma in this context is a template that defines the contents of a message to be transmitted over the network, as well as the processing required for (or by) the message. The software will use message proformas to direct the content, format, display, editing, printing and processing all 'proforma' (vs 'fixed-format') messages sent to and from the AMC. Each message proforma object will have the following attributes:

* Identifier
  unique identifier for each message proforma object
* Version number
  the current version number (major and minor number) for the message proforma
* Alias
  the label to be used by the user interface object when referring to this message proforma
* Message class
  indicates whether messages using this message proforma are user or network messages
* Priority
  the priority at which messages using this message proforma should be sent (emergency [3],high[5 ], medium [7 ], low [9 ]
* Reply proforma identifier
  unique identifier for the message proforma object to be used when replying to messages using this message proforma
* Reply type (automatic vs manual)
  indicates whether the software should automatically reply to messages using this message proforma object or whether it should wait for the user to indicate that a message reply is desired
* Reply required
  indicates whether the software should inform the user that a reply is required when a message is received that uses this message proforma; this only applies when the 'reply type' is 'manual'
* List of message field proformas Each message field proforma will have some or all of the following attributes (depending on the 'Type' attribute):

* Type
  the type of this message field (see details below)
* Label (does not apply to automatic-data and command field types)
  the ASCII-principle label to be used by the user interface object when displaying this message field

* Length (does not apply to automatic-data and command field types)
  an integer indication the number of ASCII characters allowed in the field
* Value (does not apply to automatic-data and command field types)
  the ASCII characters to be initially inserted into the field on the screen; this is required for protected field types and is optional for other field types
* Location (does not apply to automatic-data and command field types)
  the location where the user interface object is to place this message field on the screen
* Required (does not apply to automatic-data and command field types)
  boolean indication of whether or not data will be included in messages that use this message proforma
* List Name (only applies to list field types)
  indicates the ASCII name of the field list proforma that contains valid values for this field
* Automatic data variable (only applies to automatic-data field types)
  indicates the name of the automatic data variable whose value the AMC software will insert into the message; see below for valid automatic data variables
* Command (only applies to command field types)
  indicates the command to be executed by the DTE associated with this field in the message; see below for valid commands
* Command data (only applies to command field types)
  provides the data to be used with the command contained in the 'command' attribute, i.e., the "parameter" to the command; see below for the command data associated with each command
* Command display status (only applies to command field types)
  provides the message to be displayed in the status area (described in Section User Interface) when this command is processed by the software.

The software will support the following message field proforma field types:

* Date
  a fixed-length field with 'MM/DD/YY' format; valid values are 01–12 for MM, 01–31 for DD, and 00–99 for YY
* Time
  a fixed-length field with 'HH:MI:SS' format; valid values are 00–23 for HH, 00–59 for MI, and 00–59 for SS
* Single-line Free-form
  a variable-length field that can contain any printable ASCII characters; its length can be 0 to the value indicated by the field's 'length' attribute; it can only span one line on the screen
* Multi-line Free-form
  a variable-length field that can contain any printable ASCII characters; its length can be 0 to the value indicated by the field's 'length' attribute; it can span multiple lines on the screen
* Integer
  a variable length field that can contain a valid whole number with a sign; its length can be 0 to the value indicated by the field's 'lenght' attribute
* Float
  a variable length field that can contain a valid decimal number with a sign and one decimal point; its length can be 0 to the value indicated by the fields's 'length' attribute
* Protected
  a fixed-length field whose contents are included in the proforma field definition; it can contain any printable ASCII characters; the data is not included in the message; the data is shown on the screen by the user interface object, but the user is not allowed to modify it
* Label
  a fixed-length field that only has a label, i.e., no field contents; this field is for display purposes only by the user interface object; it is not included in the transmitted message
* Yes-no
  a fixed-length field whose only valid values are 'Y' and 'N'
* List
  a fixed-length field whose only valid values are those defined in the field list proforma named in the field's 'list' attribute; the value that is included in the message is defined by the position of the value within the field list proforma
* Automatic-data
  a fixed-length, fixed-format field whose values are automatically included in the message by the AMC software; fields of this type are only processed for messages that be being transmitted FROM the AMC; fields of this type that exist in messages transmitted to the AMC are ignored; the data values for field of this type are never displayed on the screen by the user interface object; immediately prior to transferring a message to the middleware software for transmission over the network that uses a message proforma containing this field type, the software will perform all necessary processing to evaluate the data variable and include the resulting value in the message to be sent; valid automatic data variables are specified below.
* Command
  a fixed-length field whose values indicate an action that eh DTE will perform; this field type is only valid in message proformas for messages that be being transmitted TO the AMC; the data values for fields of this type are not display on the screen by the user interface object; upon receiving a message that uses a proforma containing this field type, the software will perform the processing indicated by the common in the field' 'command' attribute using the data provided in the field' 'command data' attribute as the command "parameter"; when processing of the command begins, the software will display the string provided in the 'command display status' attribute in the status area of the DTE'screen described in Section User Interface.

The software will read the definitions of message proformas from disk and will process all automatic data variables and commands as messages that use message proformas are sent and received; the software will also use message proformas to direct the content and format of these messages. As described below, the software will use message proformas to control the display and editing of messages on the user interface.

Message proformas will be stored on the Flash-ROM disk. The user interface for creating, modifying and deleting message proformas, as well as the software required to place message proformas on the Flash-ROM disk, is external to the application software. Maintenance of message proformas will be performed by the admin user using external software tools. The software will provide error messages to the user as described below when it encounters errors reading message proformas. The software will also accept new message proformas via network messages and stores those message proformas on the RAM disk. In addition to User and Network, the software supports the Data message class within the proforma definition files.

Message Proforma Rules. The richness of the capabilities provided by the message proformas described in Section Message Proforma, allows many proforma definitions that are invalid or only valid in certain situation. This section states the rules and limitations associated with message proforma features and definitions. The software will assume that all message proformas adhere to the rules and limitations stated in this section; it is the responsibility of the admin user creating the message proformas to follow these rules.

The proforma features that are valid within a message proforma definition depend on whether the message proforma is a 'user' message proforma or a 'network' message proforma (as determined by the message proform's 'Message Class' attribute). For this reason, the following rules are divided into those that apply to user message proformas and those that apply to network message proformas. The following rules refer to 'display ' fields within a message proforma definition. 'Display' fields in this context refer to any type of field within a message proforma that can be displayed on the user interface (e.g. date, time, integer, float); display fields include all fields except automatic data variable and command fields.

User Message Proformas

* The 'reply type' attribute can only be 'manual'; it cannot be 'automatic'.
* The 'reply proforma identifier' attribute will designate another user message proforma; it cannot designate a network message proforma for the reply; all user message proformas will include a 'reply proforma identifier' attribute.
* The message proforma definition can include display fields and automatic data variable; it cannot include command fields. Automatic data variables in user message proformas for messages sent from the AMC will be automatically evaluated by the software; automatic data variables in user message proformas for messages received at the AMC will be ignored. If a message proforma definition includes automatic data variables, then all of the automatic data variables will follow any display fields included within the definition Network Message Proformas

* The 'reply type' attribute can only be 'automatic'; it cannot be 'manual'.
* The 'reply proforma identifier' attribute will designate another network message proforma (if it designates any reply proforma); it cannot designate a user message proforma for the reply; network message proformas do not have to include a 'reply proforma identifier ' attribute (no automatic reply will be sent in this case).
* The message proforma definition can include automatic data variables or commands, but not both; the definition cannot include display fields. Automatic data variables in network message proformas for messages sent from the AMC will be automatically evaluated by the software; automatic data variables in network message proformas for messages received at the AMC will be ignored. Commands in network message proformas for messages sent to the AMC will be processed (their associated 'status' message will be displayed in the status area of the user interface when processing of the command begins); commands cannot be included in network message proformas that will be used for messages sent from the AMC.

Proforma Download

The software will split the menu definition file into three files: the main menu definition file, the quick menu definition file, and the enter message menu definition file. The main menu definition file (MMDF) will remain as it is in the Version 1.0 AMC except that the definition of the 'Quick' pull-down menu and the 'Message-Enter' pop-up menu is removed. The software will support these definitions being placed in the quick menu definition file (QMDF) and the enter message menu definition file (EMMDF), respectively. The software will build its menu structure upon initialization based upon these three menu definition files. The software will accept the following fixed-format data messages and process them as indicate:

* Download Proforma
  - Message identifier: 7
  - Message contents:
    - User/admin indicator
    - The exact binary contents of a proforma definition file (PDF)
  - Processing
    - The software will store this PDF on the RAM disk using the appropriate path and filename based on the user/admin indicator and the proforma id contained with the PDF. If a proforma with this path and filename already exists on the RAM disk, the software will replace it.
* Download List Proforma
  - Message identifier: 8
  - Message contents:
    - User/admin indicator
    - The exact binary contents of a list proforma definition file (LPDF)
  - Processing
    - The software will store this LPDF on the RAM disk using the appropriate path and filename based on the user/admin indicator and the name of the list, as specified in the LPDF. If a list proforma with this path and filename already exists on the RAM disk, the software will replace it.
* Download Main MDF
  - Message identifier: 9
  - Message contents:
    - User/admin indicator
    - The exact binary contents of a main menu definition file (MMDF)
  - Processing:
    - The software will store this MMDF on the RAM disk using the appropriate path and filename based on the user/admin indicator. If an MMDF already exists on the RAM disk, the software will replace it.
* Download Quick MDF
  - Message identifier: 10
  - Message content:
    - User/admin indicator
    - The exact binary contents of a quick menu definition file (QMDF)
  - Processing:
    - The software will store this QMDF on the RAM disk using the appropriate path and filename based on the user/admin indicator. If a QMDF already exists on the RAM disk, the software will replace it.

* Download Enter Message MDF

Message identifier: 11

Message contents:

User/admin indicator

The exact binary contents of a enter message menu definition file (EMMDF)

Processing

The software will store this EMMDF on the RAM disk using the appropriate path and filename based on the user/admin indicator. If and EMMDF already exists on the RAM disk, the software will replace it.

The locations where the software must look for the PDFs, and the attention it must pay to the proforma version number, depends on whether the software is executing in end-user or admin mode, and whether the software is using the PDF to allow the user to send a new message or whether it is using the PDF to allow the user to view a message in one of the message logs. Note that all of the following requirements pertaining to PDFs also pertain to the LPDFs that are referenced within PDFs.

When executing in end-user mode, and when the user selects a proforma from a menu in order to send a new message, the software will use the first PDF it finds with the appropriate proforma id by searching the various PDF storage areas in the following order:

* the ‘admin area’ on the RAM disk

* the ‘admin area’ on the ROM disk

* the ‘user area’ on the RAM disk

* the ‘user area’ on the ROM disk.

When the user selects a proforma from a menu in order to send a new message and the software is unable to locate a PDF for that proforma, the software will display an “Unable to locate form xxxxx, id nnnn” error alert, where ‘xxxxx’ is the name of the proforma as displayed in the menu and ‘nnnn’ is the proforma id for that proforma.

When the user selects a proforma from a menu in order to send a new message and the software is unable to locate and LPDF referenced by that proforma, the software will display an “Unable to locate list xxxxx” error alert, where ‘xxxxx’ is the name of the list as referenced in the PDF. When executing in end-user mode, and when the user selects a message from a message log for viewing, the software will use the first PDF it finds with the appropriate proforma id, and with the same version number that was contained in the PDF used to originally create the message, by searching the various PDF storage areas in the following order:

* the ‘user area’ on the RAM disk

* the ‘user area’ on the ROM disk.

When executing in admin mode, and when the user selects a message from a message log for viewing, the software will use the first PDF it finds with the appropriate proforma id, and with the same version number that was contained in the PDF used to originally create the message, by searching the various PDF storage areas in the following order:

* the ‘admin area’ on the RAM disk

* the ‘admin area’ on the ROM disk

* the ‘user area’ on the RAM disk

* the ‘user area’ on the ROM disk.

When the user selects a message from a message log for viewing and the software is unable to locate a PDF with the appropriate version number for that message, the software will display and “Unable to locate form xxxxx, id nnnn, vers z.z” error alert, where ‘xxxxx’ is the name of the proforma as stored in the message log, ‘nnnn’ is the proforma id for that proforma, and ‘z.z’ is the version number of the proforma used when the message was created.

When the user selects a message from a message log for viewing and the software is unable to locate and LPDF with the appropriate version number for that message, the software will display an “Unable to locate list xxxxx, vers z.z” error alert, where ‘xxxxx’ is the name of the list referenced within the PDF for that message, and ‘z.z’ is the version number of the LPDF used when the message was created.

The software will use any of the three MDFs that exist on the RAM disk, in either the end-user or admin area based on which mode the software is currently executing in, before using the corresponding ones on the Flash-ROM disk. The software will be able to utilize newly downloaded PDFs and LPDFs for incoming messages and newly created messages immediately after they are downloaded. The software will begin utilizing any newly downloaded MDF file the first time the user returns to the Main Menu screen after the file has been downloaded.

These additional requirements associated with PDFs and LPDFs require a change to the format of the ‘Proforma List’ fixed -format message (fixed-format message number 3). When requested by the TC__SEND__ALL__PROFORMA__VERS proforma command, the software will send the Proforma List fixed-format message (message number 3) with the following new data structure.

| | | |
|---|---|---|
| No. of proforma files | (Integer) | Block 1 contains information for files stored in the Admin area on the RAM disk |
| No. of list files | (Integer) | |
| List of | | |
| Proforma ID | (2 bytes) | |
| Version Number | (1 byte) | |
| List of | | |
| List ID | (8 bytes) | |
| Version Number | (1 byte) | |
| No. of proforma files | (Integer) | Block 2 contains information for files stored in the Admin area on the ROM disk |
| No. of list files | (Integer) | |
| List of | | |
| Proforma ID | (2 bytes) | |
| Version Number | (1 byte) | |
| List of | | |
| List ID | (8 bytes) | |
| Version Number | (1 byte) | |
| No. of proforma files | (Integer) | Block 3 contains information for files stored in the User area on the RAM disk |
| No. of list files | (Integer) | |
| List of | | |
| Proforma ID | (2 bytes) | |
| Version Number | (1 byte) | |
| List of | | |
| List ID | (8 bytes) | |
| Version Number | (1 byte) | |
| No. of proforma files | (Integer) | Block 4 contains information for files stored in the User area on the ROM disk |
| No. of list files | (Integer) | |
| List of | | |
| Proforma ID | (2 bytes) | |
| Version Number | (1 byte) | |

-continued

| List of | |
|---|---|
| List ID | (8 bytes) |
| Version Number | (1 byte) |

Field List Proforma

The software requirements in this section relate to the Field List Proforma object. A field list proforma in this context is a list of valid values for fields of type 'list' within message proformas. The software will read field list proformas from disk and will use them to control field validation when a message is being entered via the user interface. The software will also use field list proformas to encode the value entered by the user in a 'list' field when that value is being included in a message to be transmitted over the network. Each field list proforma object will contain the following attributes:

* Identifier
  unique identifier for each field list proforma object
* Version number
  the current version number for the field list proforma identified by the 'identifier' attribute
* List of terms.

Each item in the list of items will contain one valid value, which can be a variable length string of ASCII characters. When a message is sent that uses this field list proforma, the software will sent the position of the selected value within the list (the first item in the list is at position ).

Field list proformas will be stored on the Flash-ROM disk. The user interface for creating, modifying and deleting field list proformas, as well as the software required to place field list proformas on the Flash-ROM disk, is external to the application software. Maintenance of field list proformas will be performed by the admin user using external software tools. The software will provide error messages to the user as described below when it encounters errors reading field list proformas. (Note that future version of the software will be require to accept new field list proformas via network messages and to store field list proformas on the RAM disk.)

MESSAGE LOGS

The software requirements in this section relate to the Message Log object. A message log in this context is an object that contains a list of message objects. The software will maintain five message logs:

* Incoming Message Log(IML)
* Outgoing Message Log (OML)
* Network Message Log (NML)
* Saved Message Log (SML).
* Data Message Log (DML).

The software will place all user messages transmitted to the DTE into IML, all user messages that are transmitted from the DTE into the OMN, and all network messages (including AMC Control Messages, AMC Configuration Messages and AMC Information Messages) transmitted to or from the DTE into the NML. (Note that the software will also place a message in the OML when the user sends a distress alert.) The software will move all messages in the IML marked as 'saved' by the user into the SML. The software will place all incoming and outgoing data messages into the DML.

The software will ensure that the message logs do not exceed the numbers and sizes specified by the following configuration parameters:

* Max_Incoming_Msgs_In_Log
* Max_Outgoing_Msgs_In_Log
* Max_Network_Msgs_In_Log
* Max_Saved_Msgs_In_Log
* Max_Incoming_Msg_Log_Size
* Max_Outgoing_Msg_Log_Size
* Max_Network_Msg_Log_Size
* Max_Saved_Msg_Log_Size.
* Max_Data_Msg_Log_Size
* Max_Data_Msgs_In_Log.

When a message is about to be inserted into the IML, OML, DML or NML that would cause that message log to exceed its maximum number of messages or its maximum size, the software will automatically delete as many old message objects as necessary ('old' will be based on sent or received time) before inserting the new message. The software will always delete old 'read' messages from the IML prior to deleting old 'unread' messages. If the software will delete an 'unread' message from the IML to free space for inserting a new message, the software will first print the 'unread' message to the DTE' printer if the printer is connected (see Section Printer). When the user indicates that a message in the IML should be saved to the SML and when inserting that message would cause the SML to exceed its maximum number of messages or its maximum size, the software will inform the user that the save operation is not possible.

The application software will update messages in the OML and NUM as status information regarding the state of their transmission is received from the middleware software. As described in Section Network, this status information included the MRN(s) for the message as well as the message delivery status.

The software will maintain the message logs on the DTE' RAM disk to ensure persistence in case of software shutdown/reboot, software failure, etc. The requirements specifying how the user interacts with the message logs are described in Section User Interface.

NETWORK

The software requirements in this section relate to the Network object. A network in this context is an object over which messages can be sent and received. The software will use the Logon_Required configuration parameter to determine whether or nor the user will log on to and off of the network. (Note that this logon/logoff is a logical logon/logoff across the MMS network; it is not the Standard-C LES logon/logoff.) If logon/logoff is require, the software will allow the user to enter their alias (e.g. user name, truck id, load id) using the logon screen described in Section User Interface. ( Note that if the software is being executed in 'admin' mode, the admin user will also enter the 'admin' password.) The software will send the entered alias in a 'Logon' middleware message to the address specified by the Default_Dest_Addr_Value configuration parameter; note that the address' type is specified by the Default_Dest_Addr_Type configuration parameter. The software will also include this alias as the 'source address alias' in all messages sent from the AMC. If logon/logoff is required, the software will allow the user to log off as described in Section User Interface. When the user logs off, the software will sent the user' alias in a 'Logoff' middleware message to the address specified by the Default_Dest_Addr_Value configuration parameter. If logon/logoff is not required, the software will use the value of the Default_Mobile_Alias configuration parameter as the 'source address alias' in all messages sent from the AMC.

The application software will interface with the middleware software to send all user and network messages to the network, receive all user and network messages from the network and to receive status information about the network.

The destination address to which the software will send a user message is sometimes determined by the user and other times determined automatically by the software. If the user is initiating a new user message, the software will send the message to the address alias specified by the user when they enter the message. The software will determine the physical address based on the Default_Dest_Addr_Type and Default_Dest_Addr_Value configuration parameters if the AMC is functioning in single primary destination mode, and it will determine the physical address based on the value stored within the AMC's address book if the AMC is functioning in multiple primary destination mode. If the user is replying to an incoming user message and if the AMC is functioning in 'single' address mode, the software will automatically determine the reply address based on the following rules:

* The physical address will be the value of the Default_Dest_Addr_Value configuration parameter
* If a reply alias was provided in the incoming message, then that alias will be used for the destination address alias
* If the reply alias was not provided in the incoming message, then the source alias provided by the middleware's header information will be used for the destination address aliases If the user is replying to an incoming user message and if the AMC is functioning in 'multiple' address mode, the software will automatically determine the reply address based on the following rules:

* If a reply alias and physical address were provided in the incoming message, then that reply alias will be used for the destination address alias and that reply physical address will be used for the destination physical address
* If a reply alias and physical address were not provided in the incoming message, then the source alias provided by the middleware's header information will be used for the destination address alias. If that alias exists in the AMC's address book, then the physical address associated with that alias in the address book will be used for the destination physical address. If that alias does not exist in the AMC's address book, then the value of the Default_Dest_Addr_Value configuration parameter will be used for the destination physical address. If the user is replying to an incoming user message, the software will also the user to modify the destination address alias that was automatically determined based on the above rules; the user does this via user interface actions as described in Section User Interface. Note that if the destination address to which a user message reply is being sent does not exist in the AMC's address book, the software will update the address book with that address as described in Section Address Book.

The destination address to which the software will send a network message is always determined automatically by the software. If the AMC is initiating a new network message, the software will send the message to the address alias named 'NETWORK' and the physical address specified by the Default_Nms_Addr_Type and Default_Nms_Addr_Value configuration parameters. If the software is replying to an incoming network message and if the AMC is functioning in 'single ' address mode, the software will automatically determine the reply address based on the following rules:

* The physical address will be the value of the Default_Nms_Addr_Value configuration parameter
* If a reply alias was provided in the incoming message, then that alias will be used for the destination address alias
* If the reply alias was not provided in the incoming message, then the source alias provided by the middleware's header information will be used for the destination address alias:

If the software is replying to an incoming network message and if the AMC is functioning in 'multiple' address mode, the software will automatically determine the reply address based on the following rules:

* If a reply alias and physical address were provided in the incoming message, then that reply alias will be used for the destination address alias and that reply physical address will be used for the destination physical address
* If a reply alias and physical address were not provided in the incoming message, then the source alias provided by the middleware's header information will be used for the destination address alias. If that alias exists in the AMC's address book, then the physical address associated with that alias in the address book will be used for the destination physical address. If that alias does not exist in the AMC's address book, then the value of the Default_Nms_Addr_Value configuration parameter will be used for the destination physical address.

Note that if the destination address to which a network reply is being sent does not exist in the AMC's address book, the software will not update the address book with that address; only user messages initiate address book updates; see Section Address Book.

The software will send all user and network proforma messages at the priority indicated within the message proforma. The software will send all fixed-format messages at the priority indicated by the Fixed_Fmt_Msg_Priority configuration parameter. The application software will request middleware message acknowledgments at the level indicated by the Outgoing_Msg_Ack_Level configuration parameter, and will request the middleware software to continue trying to send the message for the amount of time indicated by the Outgoing_Msg_Time_To_Live configuration parameter. After a message is sent to the network, the application software will receive Middleware Status Messages from the middleware software indicating the MRN(s) of the sent message and the delivery status of the message. The software will update the sent message stored in the Outgoing or Network Message Log with this information. The application software will ensure that it does not attempt to send a message to the middleware software whose length is greater than that specified by the Max_Transmitted_Msg_Len configuration parameter.

The software will accept 'Invalid Alias' fixed-format messages from the network. Upon receiving a message indicating an invalid alias, the software will display a 'Message Sent to Invalid Address' message in the status area described in Section User Interface. If that alias exists in the RAM address book, the software will delete that address from the address book.

Upon receiving a message from the network, the software will perform the processing necessary to acknowledge receipt of the message based on the message acknowledgement level requested by the middleware; the software will send Middleware Control Messages to the middleware software as necessary to complete this processing. (Note that the only acknowledgment level that requires application software processing is 'application acknowledgement'.) The software will place the received message in the Incoming Message Log or the Network Message Log, depending on whether it is a user message or network message, as described in Section Message Logs.

The application software will place an indication of any severe middleware software or network errors it detects in the health log described in Section Health Log. The software will place an indication that it received an unknown message (e.g. Invalid message type or message identifier, invalid proforma identifier) into the health log any time it receives a message that it does not recognize; it will also display an 'Unrecognized Message Received' message in the status area of the user interface described in Section User Interface.

Upon receiving a proforma message containing the "ENABLE-HLTH-RPT" command described below, the software will send AMC Periodic Health Messages over the network indicating the current health of the DTE and DCE; the software will send these messages at the frequency indicated by the incoming proforma message and to the destination specified by the Health_Report_DNID and Health_Report_Mem_Num configuration parameters. The software will include the data listed below in these health messages, and will continue sending them until a proforma message is received that contains the "DISABLE-HLTH-RPT" command. The software will use the DCE's 'initiate user-defined data report' features to send these health messages.

The software will allow the user to monitor the current health of the network. The requirements specifying how the user interfaces with this function are described in Section User Interface.

PRINTER

The software requirements in this section relate to the printer object. A printer in this context is a device connected to the DTE's parallel port that can accept Epson FX-80 printer commands and ASCII-printable character; its function is to reproduce the given characters on whatever media it supports (e.g. paper, CRT).

The software will support the printer object. The software will allow the user to print messages and message log lists as described above. The software will begin each printed output at the top of a new page. The requirements specifying how the user activates the 'print message' and 'print message log list' functions are described in Section User Interface.

USER INTERFACE

The software requirements in this section relate to the User Interface object. A user interface in this content is an object that allows the user to communication with the AMC system; it allows the user to command the software to perform functions and it provides visual and audible information to the user. The user interface object in the AMC system comprises of the DTE's keyboard, display, LEDs, and speaker, as well as the optional distress switch attached to the DTE and the optional alarm device attached to the DTE.

The sections that follow describe the software requirements associated with each of the system components that comprise the user interface. It should be noted that these sections only describe the requirements associated with the user interface; the requirements associated with other system objects that are affected by specific user interface actions (e.g. address book, messages, message logs) are described in the sections that specify the requirements for those system objects. Each of the following sections that describe the user interface screens reference FIGS 8-1 to 8-34 that illustrate how the screen will look on the DTE's display. Main Menu Screen, describes how the user interacts with the DTE's menus; this interaction is the same regardless of which screen is displayed. The general layout of all of the DTE's screens (other than the Logon screen) is also described; this general layout is the same regardless of which screen is displayed. It should be noted that the user interface is the most visible part of the AMC to the user; therefore, the software should be designed in a way that minimizes user interface latency wherever possible.

Logon Screen

Figures 1, 8:
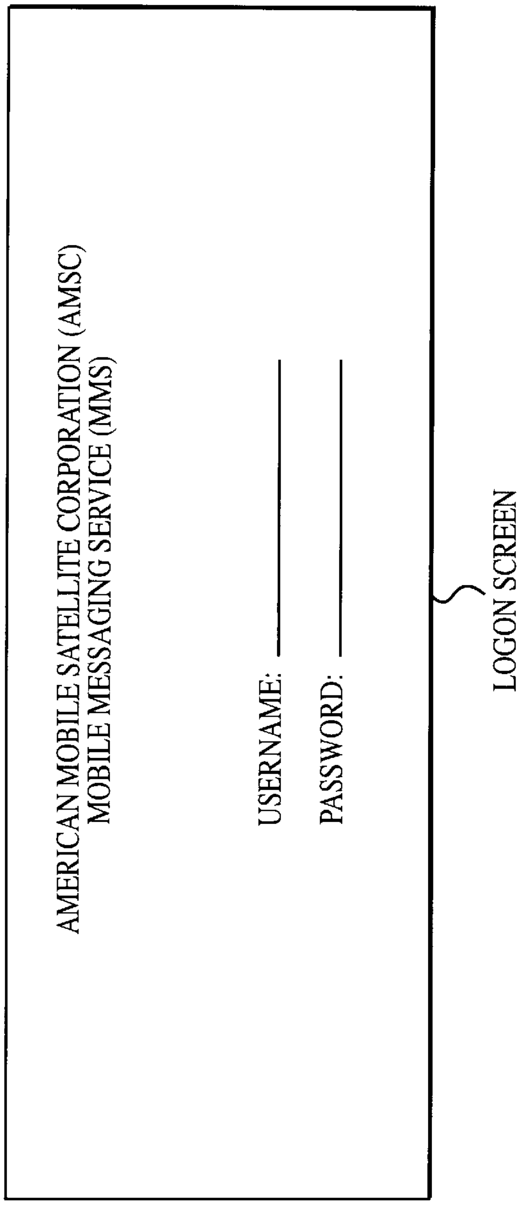

The software will support the Logon screen as shown in FIG. 8-1, Logon Screen. If the Logon_Required configuration parameter indicates that users will log on to and out of the AMC application software, then the software will display the logon screen upon software initialization.

If the AMC software is executing in 'Admin' mode, then the software will display the logon screen shown in FIG 8-1. The software will allow the user to enter their user name into the USERNAME field. When the user pressed <ENTER> in the USERNAME field, the software will allow the user to enter the 'admin' password into the PASSWORD field; the software will display "*" characters as the user enters the characters in the PASSWORD field. When the user presses <ENTER> in the PASSWORD field, the software will validate the entered password against the 'admin' password internally configured within the software. If the password passes validation, then the software will display the Main Menu screen Main Menu Screen. If the password does not pass validation, then the software will display an 'Incorrect Password* Please Re-enter.' message on the bottom line of the screen, beep the DTE's speaker, clear the information entered by the user in both fields and allow the user to are-enter their user name and password.

If the AMC software is executing in 'End-User' mode, then the software will display the logon screen shown in FIG 8-1 without the PASSWORD field. The software will allow the user to enter their user name into the USERNAME field. Once the user presses <ENTER> in the USERNAME field, the software will display the Main Menu screen.

Main Menu Screen

Figures 2, 8:

As shown in FIG. 8-2, Main Menu Screen, the Main Menu screen comprises of a menu bar across the top, a screen body in the middle and two information lines at the bottom. All screens displayed on the DTE's display, except for the Logon screen, follow the Main Menu screen's format. For this reason, this section describes the detailed requirements of the menu bar, screen body and information lines for all of the screens.

Menu Bar

The menu bar comprises of sic 'pull-down' menus. The software will determine the labels at the top of each of these menus, as well as the menu functions and the labels for those functions within each of the pull-down menus (and 'pop-up' menus as described below), by reading the DTE's Menu Definition File (MDF) described below. The labels and menu functions shown in the menu bar and menus in FIGS. 8-1 to 8-34, as well as all of the requirement specified above, assume a standard MDF. The software will allow the menu functions described herein to be rearranged within the menu structure based on the MDF. The software will also allow the menu labels for those functions to be changed within the MDF. The only restrictions on changes to the MDF are that there will always be six pull-down menus, the pop-up menus within the 'Message—Enter' menu function and the menu items within 'Quick Send ' pull-down menu will only designate 'user' message proformas, menus will be no more than three levels deep (i.e., one pull-down, a pop-up and another pop-up), and the functions specified within the MDF, i.e., menu functions may be eliminated from the MDF and duplicated within the MDF, but no new menu functions may be added. (Note that the MDF will include all user message proformas installed on the AMC if the user is to have access to them.)

Figures 3, 8:
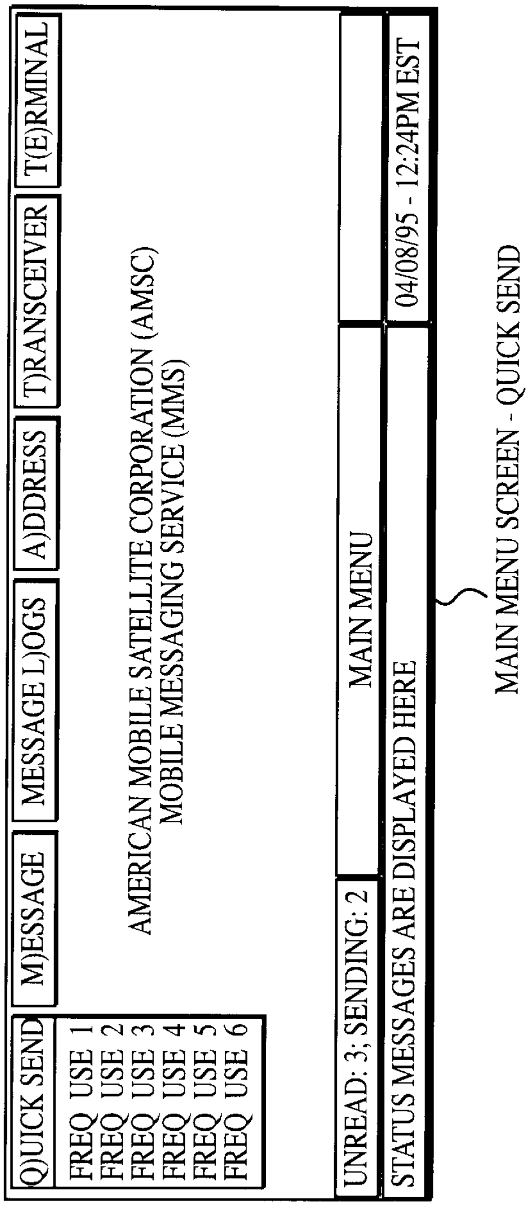
Figures 4, 8:
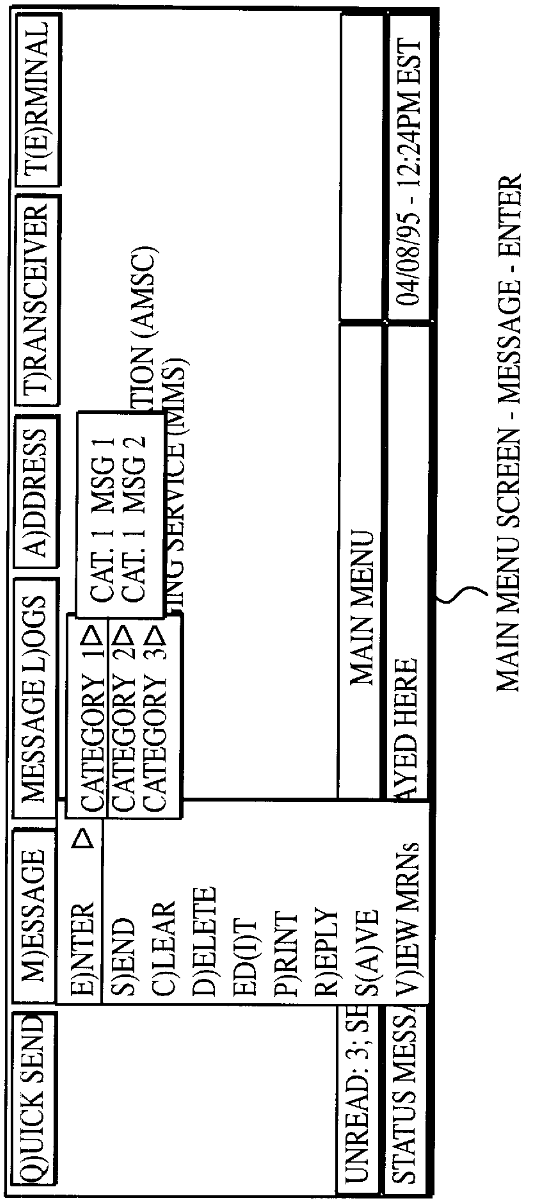
Figures 5, 8:
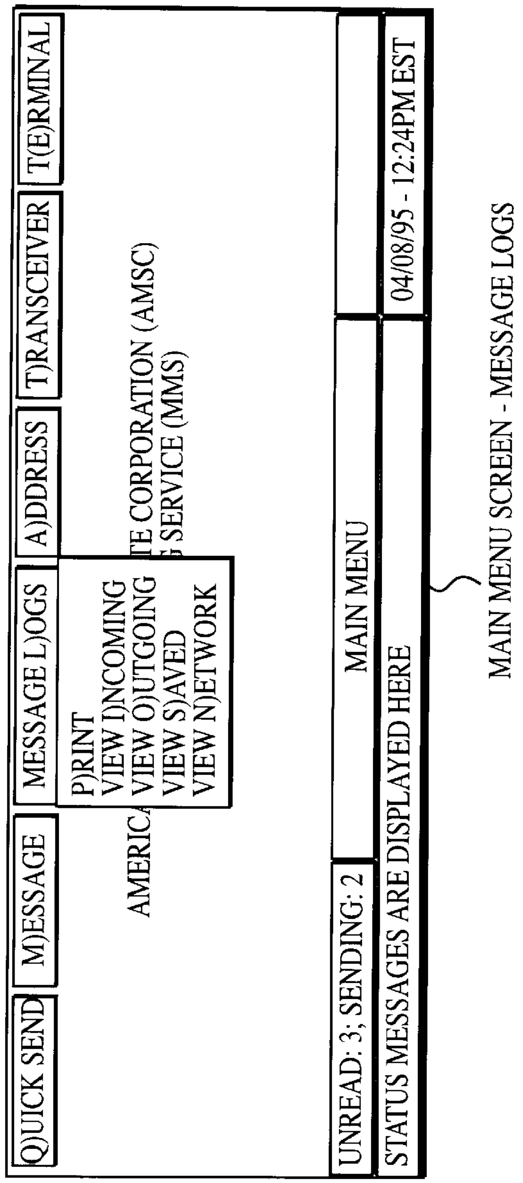
Figures 6, 8:
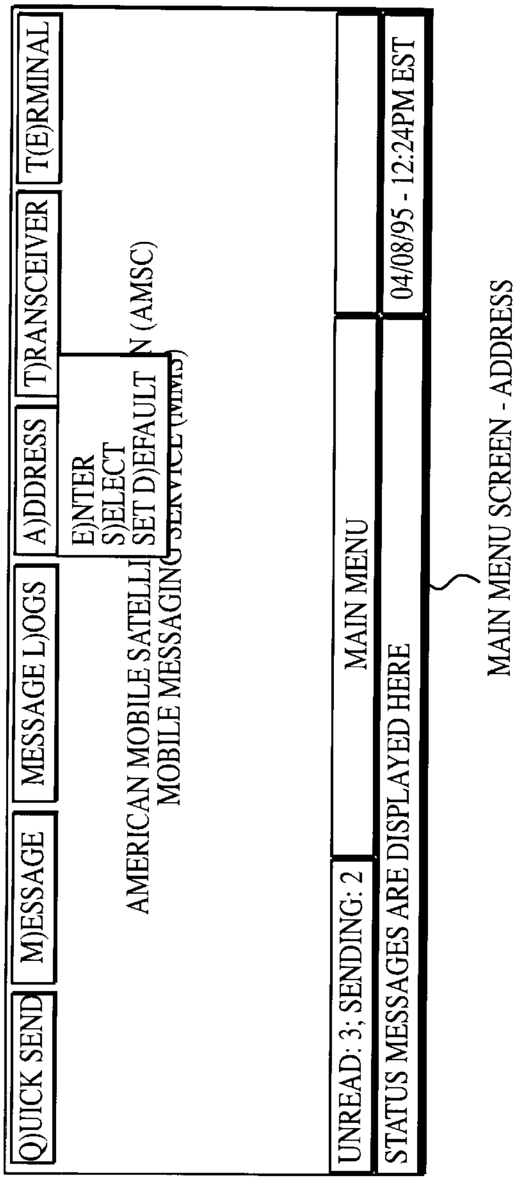
Figures 7, 8:
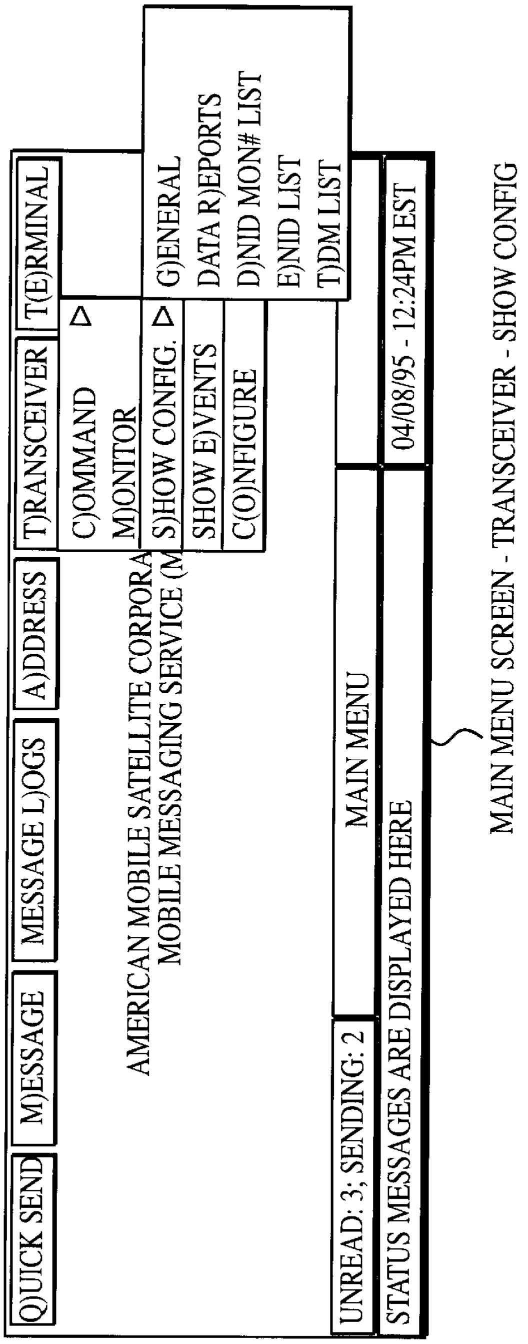
Figure 8:
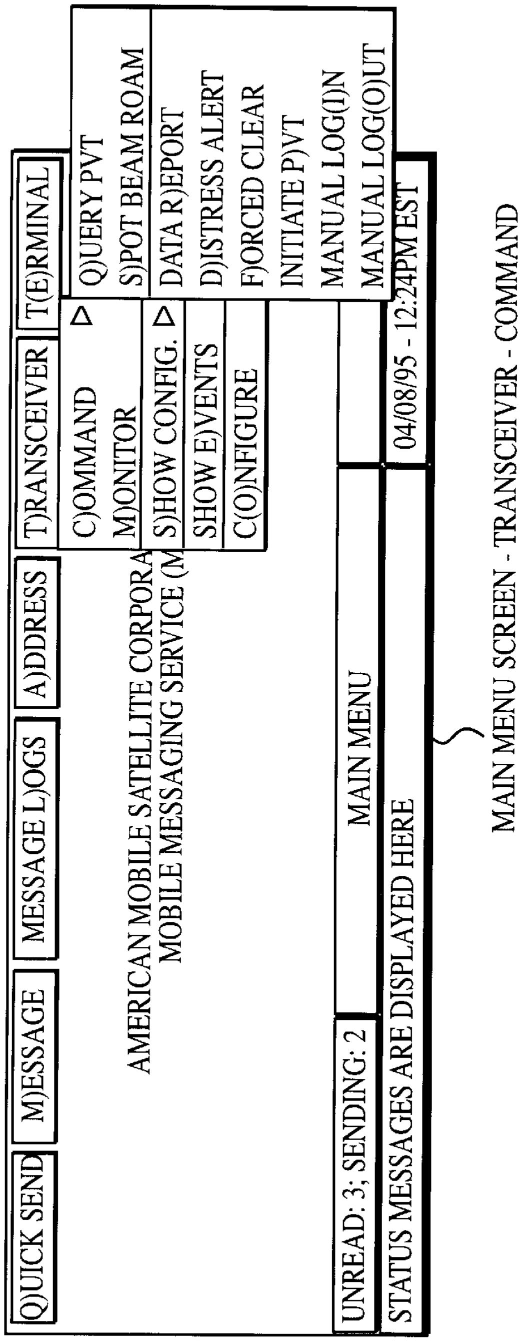

The software will activate the menu bar when the user pressed the <ALT> key and will position the cursor over the left-most pull-down menu. (Refer to FIGS. 8-3, Main Menu Screen -Quick Send, through 8-9, Main Menu Screen - Terminal, to see the menus as defined in the default MDF.) After pressing the <ALT> key, the software will allow the user to select the desired pull-down menu by either pressing the key shown in parenthesis (assuming that the creator of the current MDF placed parentheses in the menu pane labels) within the menu bar or by using the 'left' and 'right' arrow keys to move across the menu bar and then pressing the 'down' arrow key on the desired pull-down menu. The software will allows the user to deactivate the menu bar at any time by continuing to press the <ESC> key until all pull-down and pop-up menus are closes.

Once the user has selected the desired pull-down menu, the software will allow the user to move the cursor between the functions within that menu by pressing the 'up' and 'down' arrow keys. The software will also allow the user to move to another one of the pull-down menus by pressing the 'left' and 'right' arrow keys. The software will allow the user to select the desired function within a pull-down menu by pressing the <ENTER> key when the cursor is positioned over that function or by pressing the key shown in parenthesis (assuming that the creator of the current MDF placed parentheses in the menu function labels). The software will allow the user to close a pull-down menu and exit the menu bar without selecting a menu function by pressing the <ESC> key. If the user presses <ENTER> when the cursor is positioned over a menu function that has a right arrow displayed next to it, then the software will display the 'pop-up' menu associated with that menu function. Once the user has selected a pop-up menu, the software will allow the user to move the cursor between the functions within that menu by pressing the 'up' and 'down' arrow keys. The software will allow the user to select the desired function within a pop-up menu by pressing the <ENTER> key. The software will allow the user to close a pop-up menu without selecting a menu function by pressing the <ESC> key.

While the user interacts with the DTE's menus in the same manner regardless of which screen is displayed on the DTE's display, the functions performed by the software when the user selects a menu function are often dependent on the screen that is displayed. When the Main Menu screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |

-continued

| Menu Function | Software Action |
|---|---|
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Main Menu screen is displayed, the software will display and 'Invalid Selection' message in the status area of the second information line when the user selects any menu function not listed in the table.

Screen Body

The screen body comprises of the middle portion of the screen between the menu bar on the top and the two information lines on the bottom; this is the portion of the screen that is different among the various screens. While the contents of the screen body differs among screens, the mechanisms for displaying the screen body, exiting the screen body and for accessing the menu bar while in the screen body are the same for all screens.

The software will allow the user to display any screen by selecting the associated menu function from the DTE's menus (e.g. selecting the Message Logs - View Incoming menu function displays the Incoming Message Log screen). The software will allow the user to exit from any screen and return to the Main Menu screen by pressing the <ESC> key while displaying the screen (assuming that menus are not currently being displayed). The software will allow the user to access the DTE's menus while displaying a screen by pressing the <ALT> key.

When the Main Menu screen is displayed, the software will display the contents of the Main Menu screen body as shown in FIG. 8-2. The software will prevent the user from changing the contents of this screen.

Information Lines

The software will display two information lines on the bottom of the screen, as shown in FIG. 8-2. These two information lines are the same for every screen (other that the Logon screen), except for the screen name and the 'Page' numbering. The software will display the number of messages in the incoming message log that haven't been ready by the user, as well as the number of messages currently queued by the middleware software for delivery over the network, in the left-most area within the first information line. The software will display the name of the currently displayed screen in the middle area of the first information line. If the currently display screen could potentially have more than one page (e.g. the Main Menu screen will always be one page, the Enter Message screen may be one or more pages depending on the proforma being used), then the software will display the current page number and the total number of pages within that screen in the right-most area within the first information line (see FIGS. 8-10, Enter Message Screen, for an example).

The software will display status and non-critical error messages in the left-most area within the second information line (non-critical error messages are those that the user may want to be aware of, but do not require the user to take any action). The software will continue displaying a status message in this area until it displays the next status message. The software will display the current date and time, using the time zone specified by the Default__Time__Zone configuration parameter or the one selected by the user via the Terminal-Configure-Time Zone menu function, in the right-most area within the second information line. The software will update this date and time at an interval based on the Display__Update__Interval configuration parameter.

Enter Message Screen

Figures 8, 9:
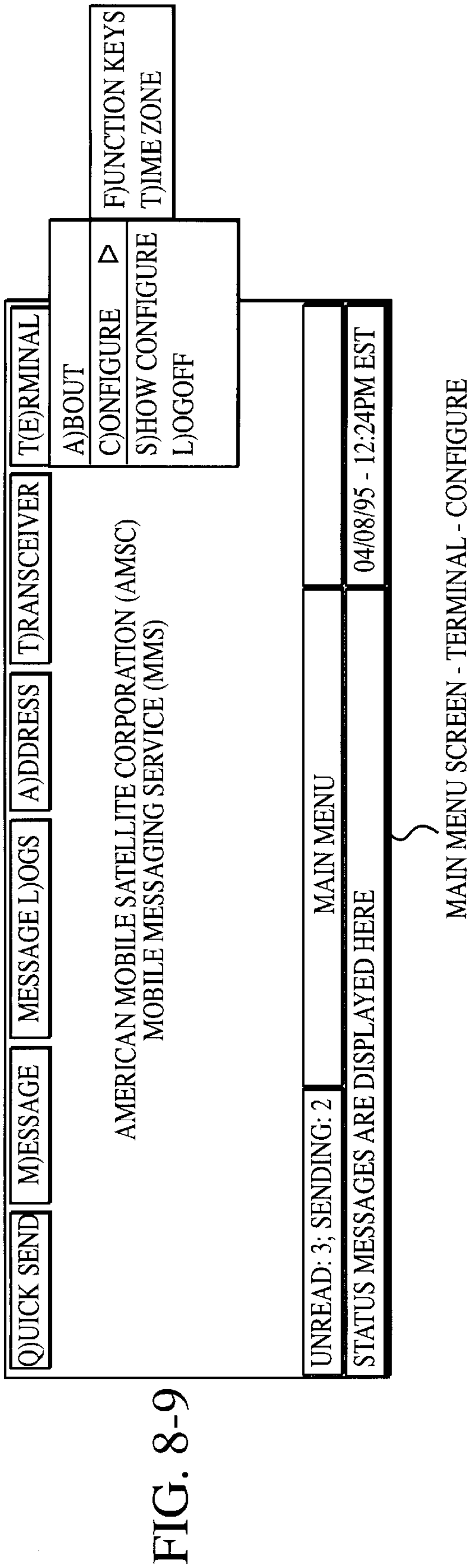
Figures 8, 9, 10:
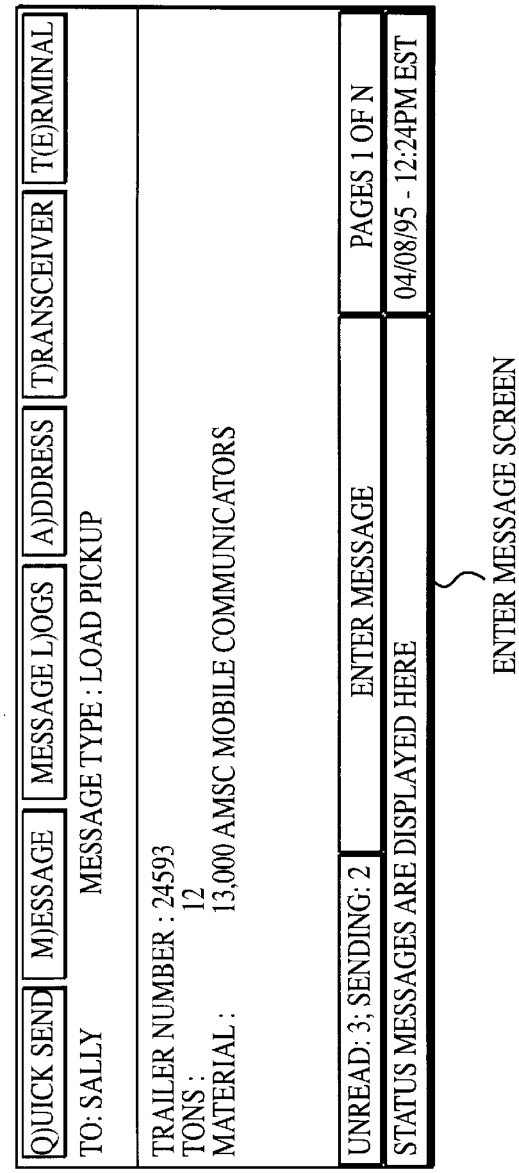
Figures 8, 9, 10, 11, 12, 13:
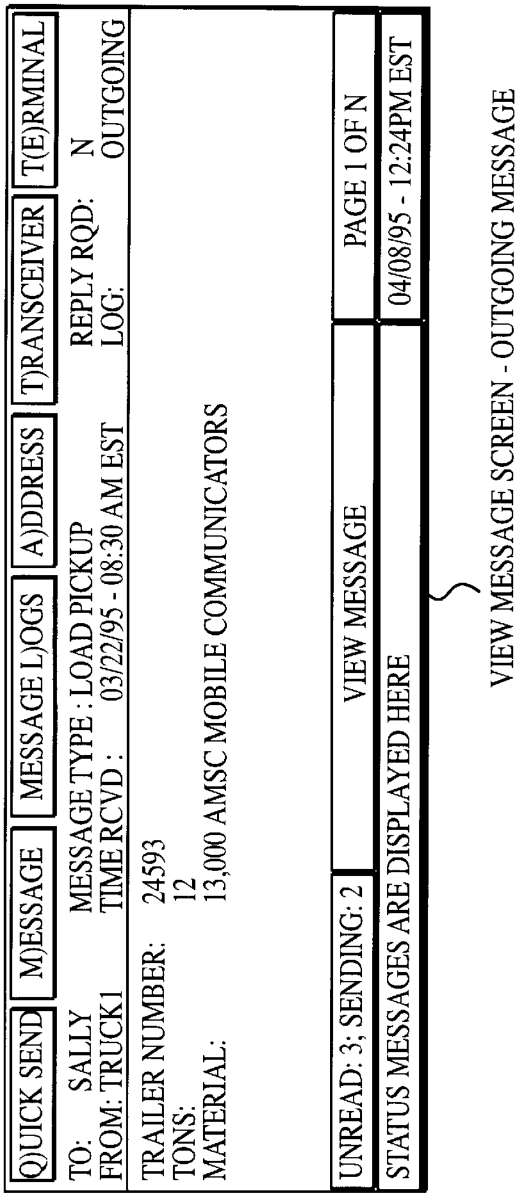
Figures 8, 9, 10, 11, 12, 13, 14:
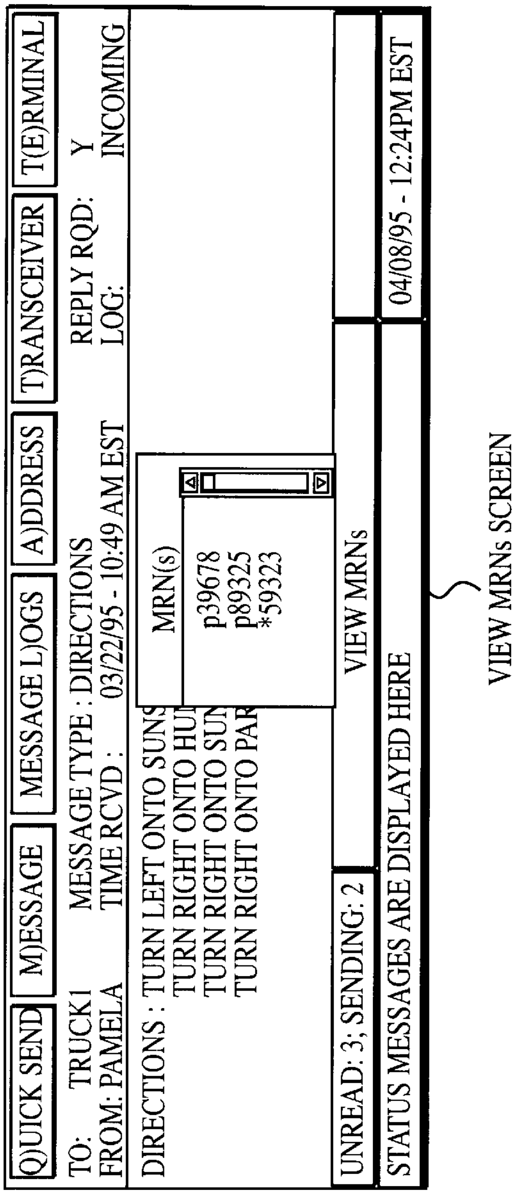
Figures 8, 9, 10, 11, 12, 13, 14, 15, 16, 17:
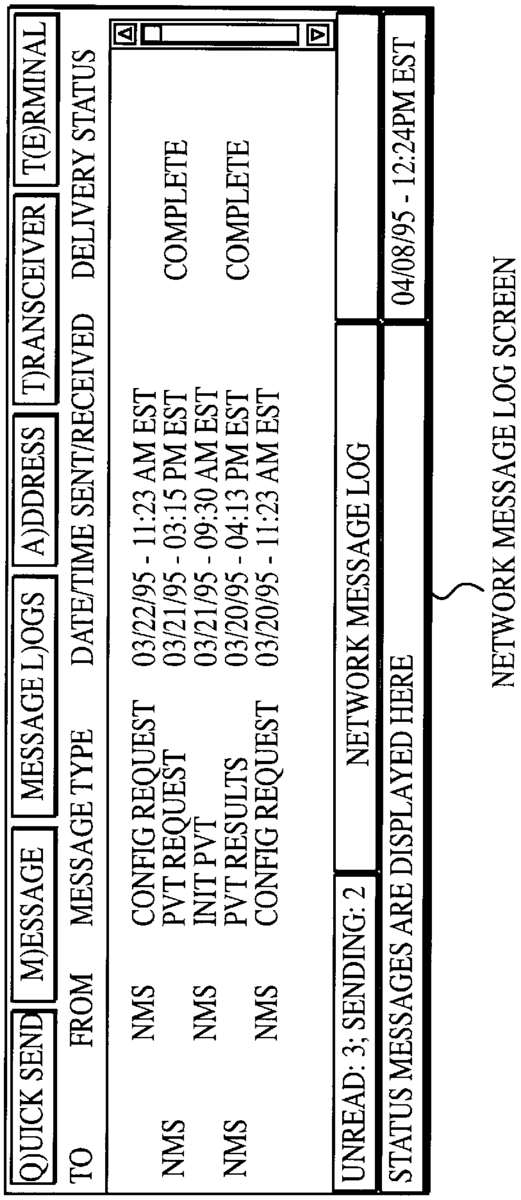
Figures 8, 9, 10, 11, 12, 13, 14, 15, 16, 17, 18:
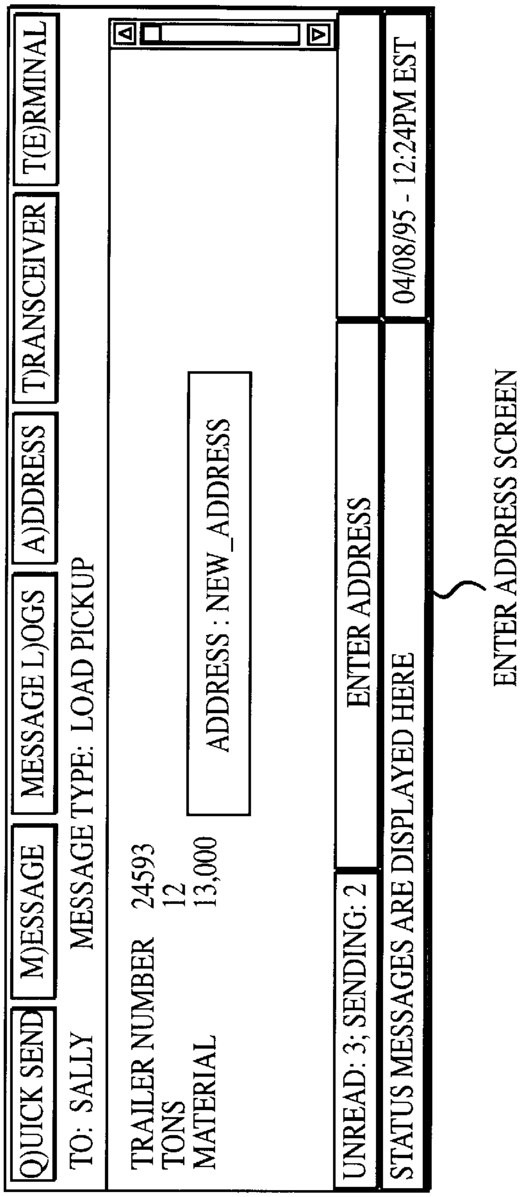
Figures 8, 9, 10, 11, 12, 13, 14, 15, 16, 17, 18, 19, 20, 21, 22, 23, 24, 25:
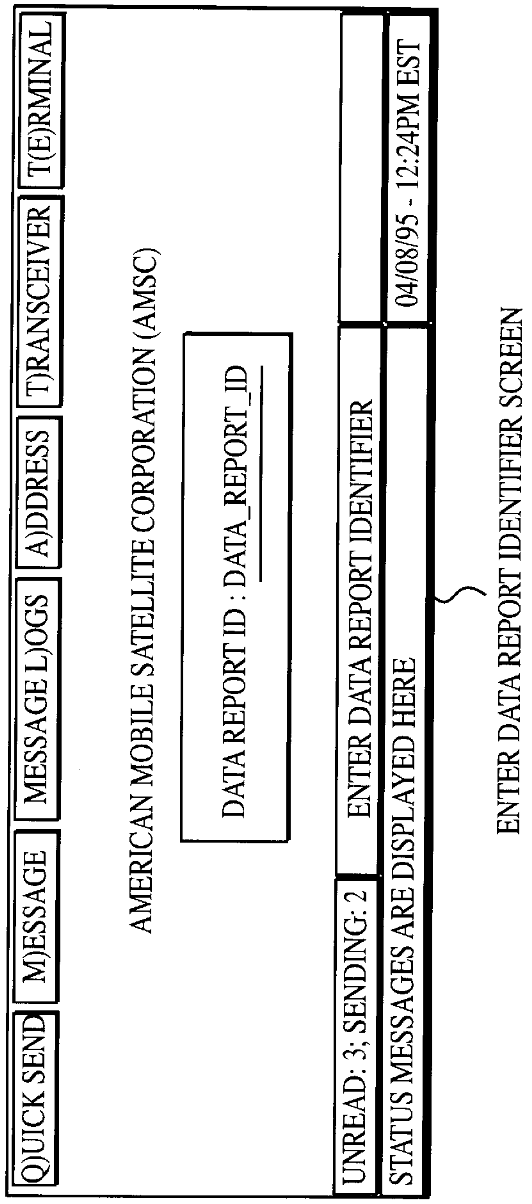
Figures 8, 9, 10, 11, 12, 13, 14, 15, 16, 17, 18, 19, 20, 21, 22, 23, 24, 25, 26:
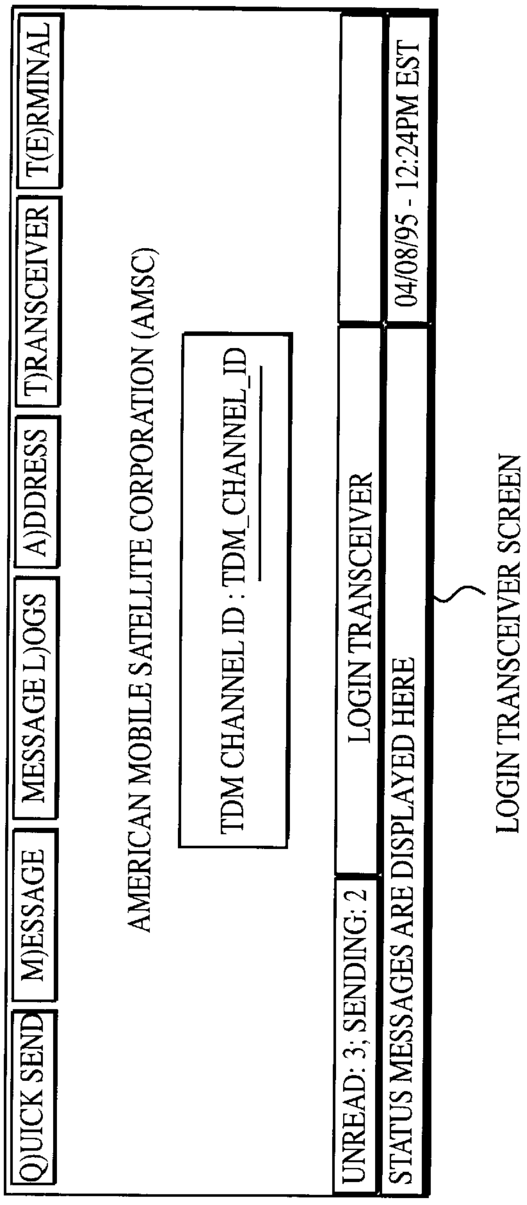
Figures 8, 9, 10, 11, 12, 13, 14, 15, 16, 17, 18, 19, 20, 21, 22, 23, 24, 25, 26, 27:
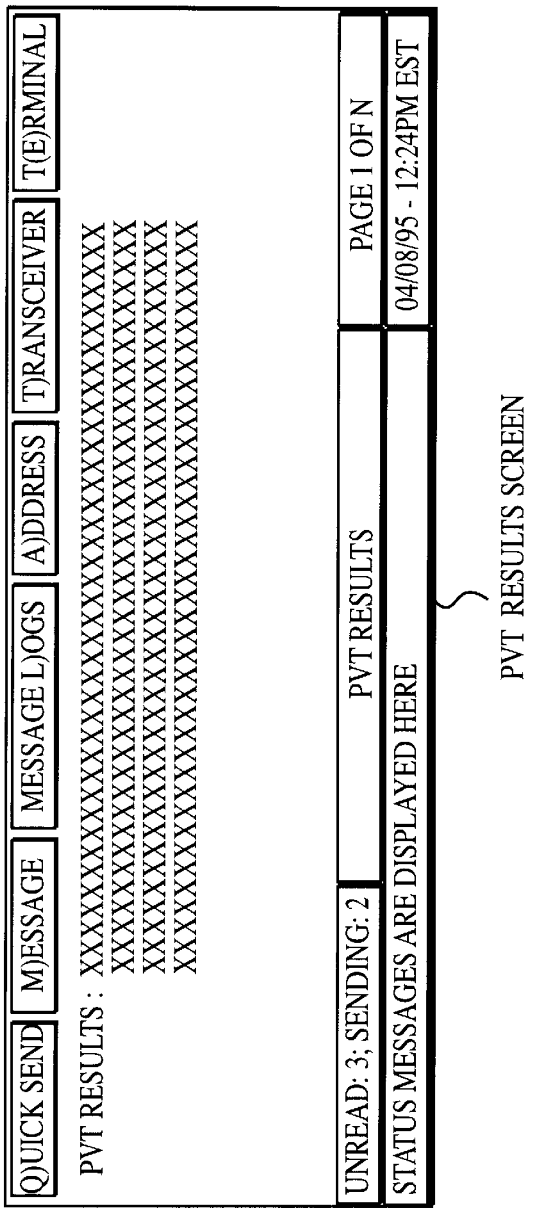
Figures 8, 9, 10, 11, 12, 13, 14, 15, 16, 17, 18, 19, 20, 21, 22, 23, 24, 25, 26, 27, 28:
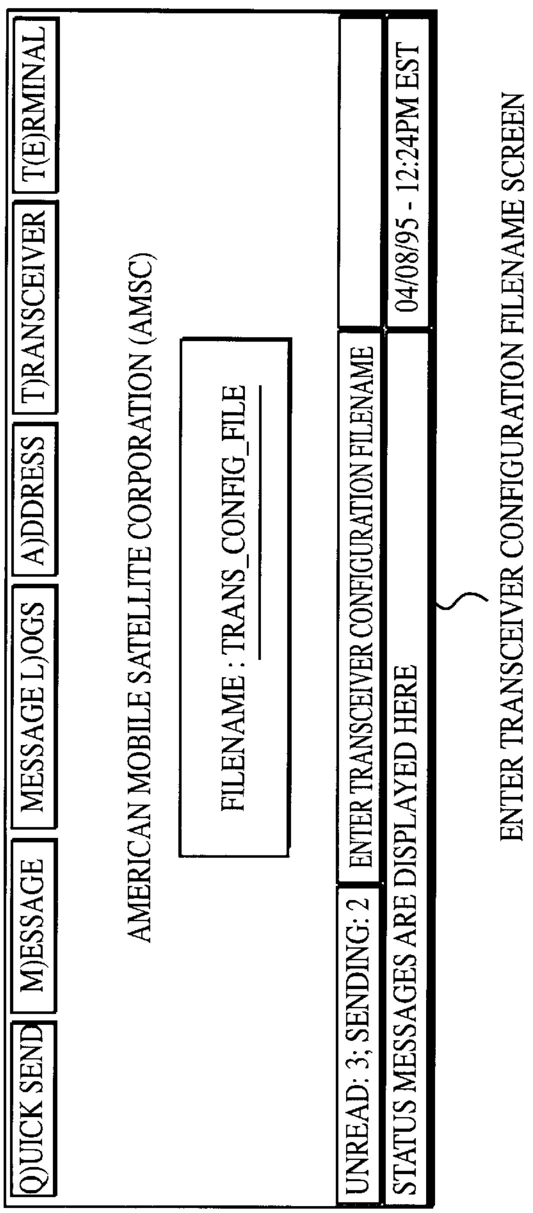
Figures 8, 9, 10, 11, 12, 13, 14, 15, 16, 17, 18, 19, 20, 21, 22, 23, 24, 25, 26, 27, 28, 29:
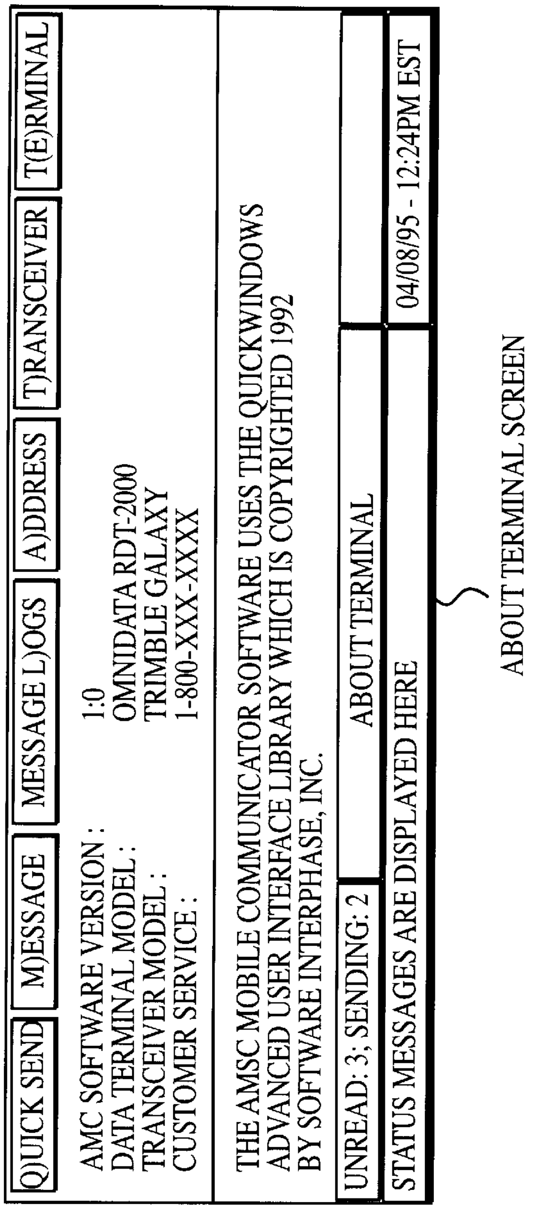
Figures 8, 9, 10, 11, 12, 13, 14, 15, 16, 17, 18, 19, 20, 21, 22, 23, 24, 25, 26, 27, 28, 29, 30:
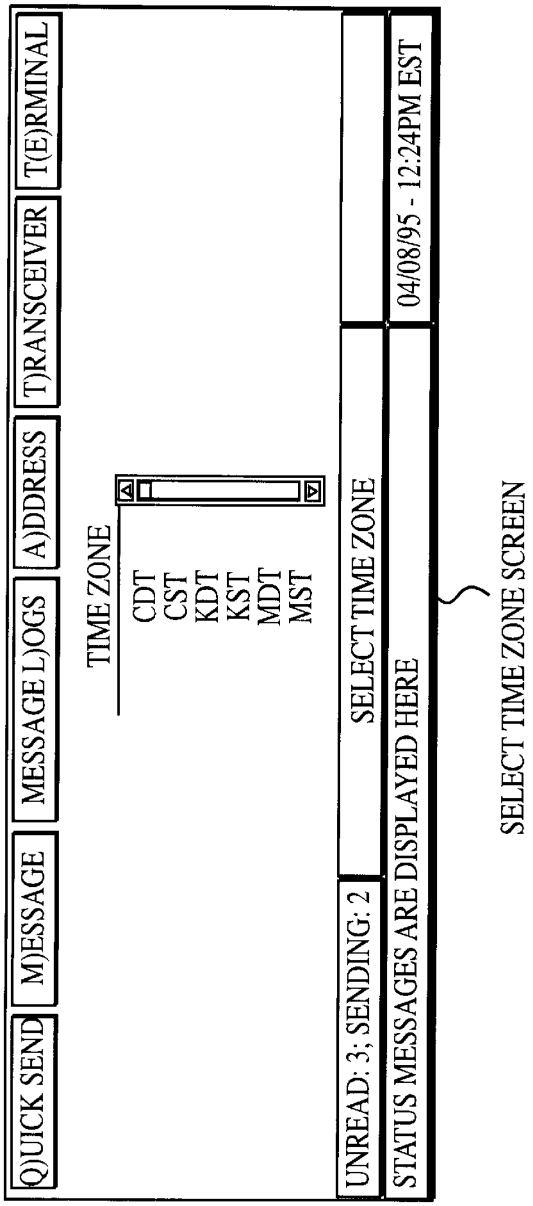
Figures 8, 9, 10, 11, 12, 13, 14, 15, 16, 17, 18, 19, 20, 21, 22, 23, 24, 25, 26, 27, 28, 29, 30, 31:
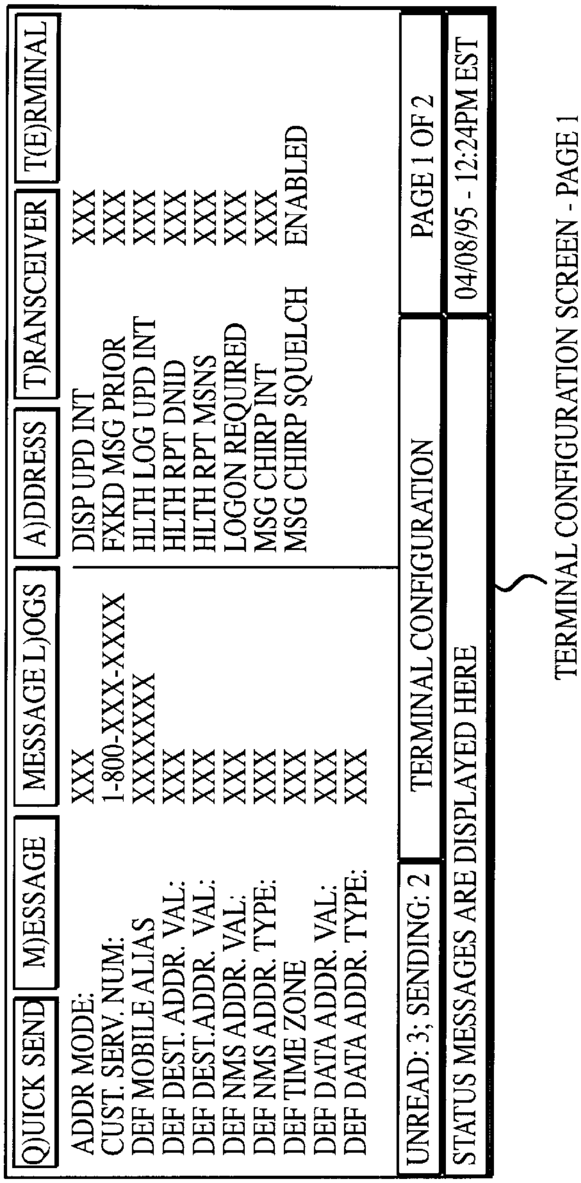
Figures 8, 9, 10, 11, 12, 13, 14, 15, 16, 17, 18, 19, 20, 21, 22, 23, 24, 25, 26, 27, 28, 29, 30, 31, 32:
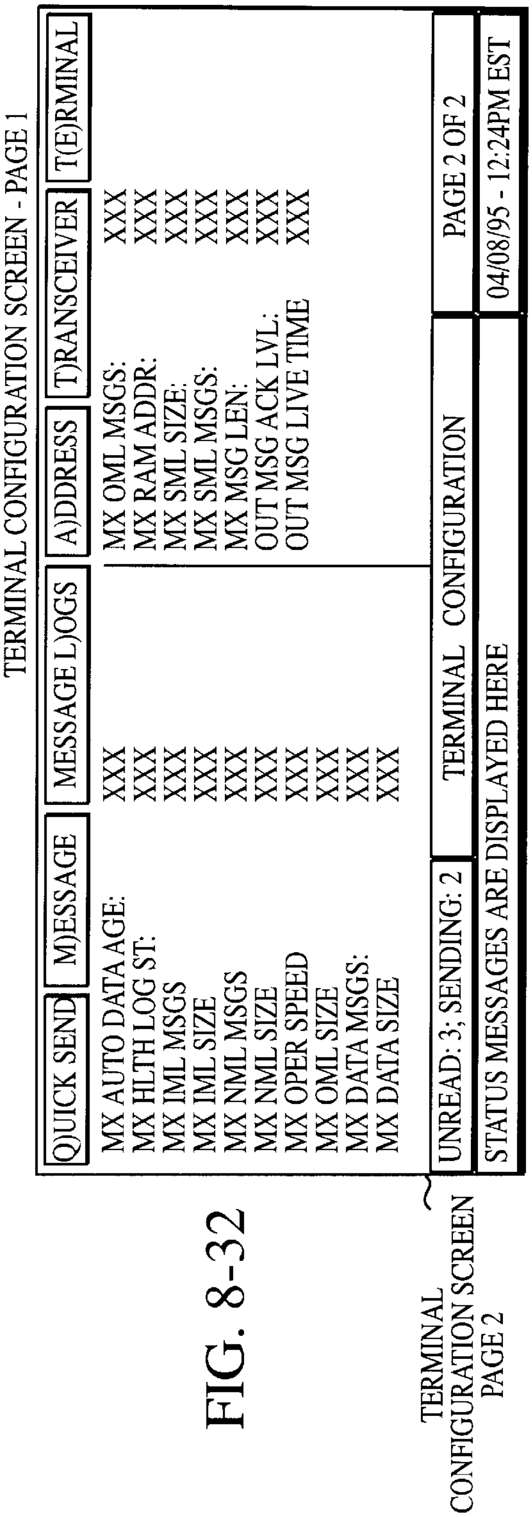
Figures 8, 9, 10, 11, 12, 13, 14, 15, 16, 17, 18, 19, 20, 21, 22, 23, 24, 25, 26, 27, 28, 29, 30, 31, 32, 33:
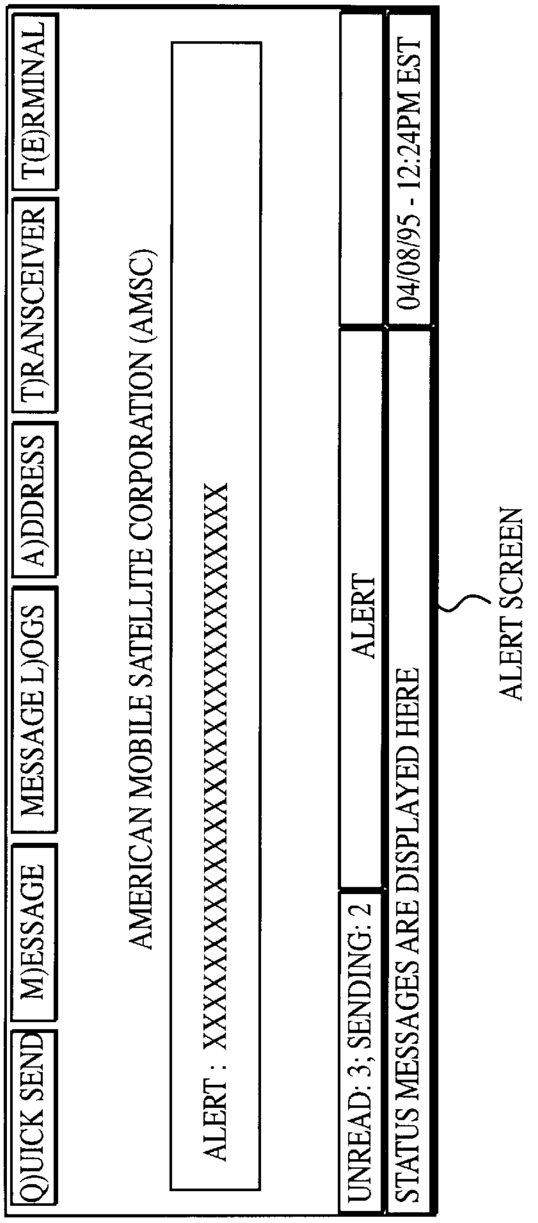
Figures 8, 9, 10, 11, 12, 13, 14, 15, 16, 17, 18, 19, 20, 21, 22, 23, 24, 25, 26, 27, 28, 29, 30, 31, 32, 33, 34:
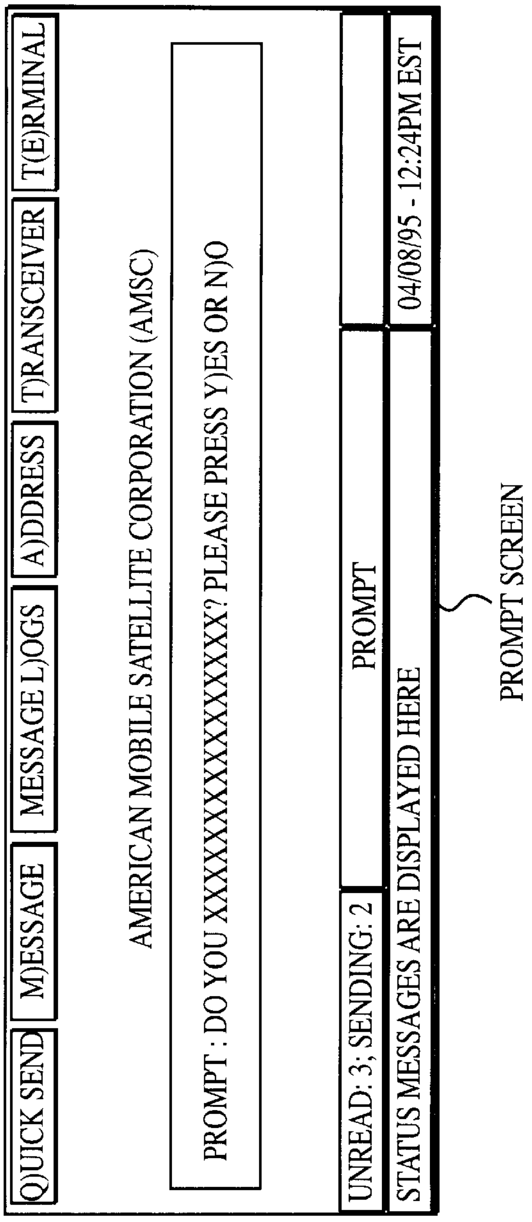

When the Enter Message screen is displayed, the software will display the contents of the Enter Message screen body similar to that shown in FIGS. 8-10, Enter Message Screen. (This requirement says 'similar' since most of the screen body is dependent upon the proforma that was selected by the user. See Section Message Proformas, for a description of message proformas.) The software will display the currently select default address in the TO field at the top of the screen body. The software will display the name of the selected message proforma in the MESSAGE TYPE field at the top of the screen body. The software will display the labels for each of the 'display' fields (i.e. all fields except automatic data variables and commands) that are defined within the associated on the field type (e.g., integer, float, date), or if the user is exiting a field that is required without entering valid data, then the software will display a message in the status area, beep the DTE's speaker and not allow the user to move the cursor to another field.

If the user moves the cursor to a 'list' field defined within the message proforma, the software will 'pop up' a list of valid values for that field. The software will allow the user to scroll through the list of valid values using the up and down arrow keys and the <PG UP> and <PG DN> keys. The software will allow the user to select the desired value from the list by pressing the <ENTER< key when the cursor is positioned over the value. Once the user presses <ENTER> over the desired value, the software will 'pop down' the list of valid values and display the selected value next to the list field's label. The software will allow the user to exit the list of valid values without selecting a value by pressing the <ESC> key.

If the user moves the cursor to a 'multi-line free-form text' field defined within the message proforma, the software will 'pop up' a sub-screen where the user will be allowed to enter the data for that field. The software will allow the user to move the cursor throughout this sub-screen by pressing the arrow <ENTER>, <PG UP>, <PG DN>, <TAB>, <HOME>, <END>, <END>, <DEL> and <BACKSPACE> keys. The software will allow the user to enter any printable characters into the field. Once the user enters all desired data into this field, the software will allow them to exist this bus-screen by pressing the <ESC> key.

When the Enter Message screen is displayed, the software will perform the following actions when the user selects the specified menu function:

| Menu Function | Software Action |
|---|---|
| Message - Send | validate all user entered information; if invalid, display a message in the status area and allow user to re-enter data; if valid, send the message over the network to the selected address; if the address being sent to is not in the address book, add it to the RAM address book; if the RAM address book is full, prompt the user to determine if they want to delete an existing address from the address book; if they do, display the Select Address screen to allow user to select address to be deleted; if they do not, send message, but do not add address to the RAM address book |
| Message - Clear | clear all user entered data from all editable fields within the currently displayed message proforma |
| Message - Print | print the message currently being entered |
| Address - Enter | display the Enter Address screen; change the TO field to the value entered by the user in that screen |
| Address - Select | display the Select Address screen; change the TO field to the value selected by the user in that screen |

When the Enter Message screen is displayed, the software will display an 'Invalid Selection' message in the status area of the second information line when the user selects any menu function not listed in the table.

Incoming Message Log Screen

When the Incoming Message Log screen is displayed, the software will display the contents of the Incoming Message Log screen body similar to that shown in FIGS. 8–11, Incoming Message Log Screen. (This requirement says 'similar' since the screen body is dependent upon the messages currently in the incoming message log.) The software will display the indicated header information for each message currently in the incoming message log. The software will display a "*" in the UNREAD column for each message that has not been read by the user. The software will use the same time zone being used for the current data/time in the bottom information line for all message DATE/TIME RECEIVED times. The software will display a "*" in the REPLY READ column for each message that requires a user reply (based upon the definition of the message proforma for the incoming message and whether or not the user has already replied to the message). The software will sort all unread messages to the top of the list. Within unread messages, the software will sort the messages in PRIORITY order followed by DATE/TIME RECEIVED within priority. Within read messages, the software will sort the messages based on the DATE/TIME RECEIVED.

The software will initially highlight the first message displayed in the log. The software will allow the user to scroll through all messages in the log using the up and down arrow keys. If the user presses the <ENTER> key with the cursor positioned over a given message, the software will display the View Message screen with that message. When the Incoming Message Log screen is displayed, the software will perform the following actions when the user selects the specified menu function:

| Menu Function | Software Action |
|---|---|
| Quick Send - {Proforma} | display the Enter Message screen with the selected user proforma |
| Message - Enter - {Any Proforma} | display the Enter Message screen with the selected user proforma |
| Message - Reply | display the Enter Message screen with both the proper message proforma as determined by the message proforma used for the highlighted incoming message and the proper reply address |
| Message - Save | if the currently highlighted message has previously been read by the user, move the message from the incoming message log to the saved message log; if the saved message log does not have space available for the highlighted message, display a message indicating that the user will delete messages from the saved message log before the save operation can be performed; if the currently highlighted message has not been read by the user, display an 'Invalid Selection' message in the status area |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Message Logs - Print | print the header information for all messages currently in the incoming message log sorted in the same way they are displayed on the screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |

-continued

| Menu Function | Software Action |
|---|---|
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminate - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Incoming Message Log screen is displayed, the software will display an 'Invalid Selection' message in the status area of the second information line when the user selects any menu function not listed in the table.

View Message Screen

When the View Message screen is displayed, the software will display the contents of the View Message screen body similar to the two screens shown in FIGS. 8–12, view Message Screen—Incoming Message, and 8–13, View Message Screen—Outgoing Message. (This requirement says 'similar' since most of the screen body is dependent upon the proforma that is used by the message being displayed. See Section Message Proformas, for a description of message proformas.) The software will display the message header information in the top two lines of the screen body, along with an indication of which log this message is being viewed from (Incoming, Outgoing or Saved; network messages cannot be viewed). Note that the user can display the Message Reference Numbers (MRNs) associated with this message by selecting the 'Message—View MRNs' menu function (see Section View MRNs Screen).

If the message proforma used for the message being displayed spans more than one page (the right-most area of the first information line will specify more than one total pages for this screen), then the software will allow the user to display the various pages by using the <PG UP> and <PG DN> keys. The software will prevent the user from modifying the contents of the View Message screen.

When the View Message screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - | display the Enter Message screen with the selected |

-continued

| Menu Function | Software Action |
|---|---|
| {Any Proforma} | user proforma |
| Message - Send | if the message being displayed is from the outgoing message log, re-send an exact copy of the message being displayed (automatic data variables should not be re-evaluated; a new message should be added to the outgoing message log); otherwise, display an 'Invalid Selection' message in the status area; if the address being sent to is not in the address book, add it to the RAM address book; if the RAM address book is full, prompt the user to determine if they want to delete an existing address from the address book using the Prompt screen; if they do, display the Select Address screen to allow user to select address to be deleted; if they do not, send message, but do not add address to the RAM address book |
| Message - Delete | if the message being displayed is from the saved message log, delete the message from that log; otherwise, display an 'Invalid Selection' message in the status area |
| Message - Edit | if the message being displayed is from the outgoing message log, display the Enter Message screen with a copy of the currently viewed message using its message proforma; otherwise, display an 'Invalid Selection' message in the status area |
| Message - Print | print the currently viewed message |
| Message - Reply | if the message being displayed is from the incoming or saved message log, display the Enter Message screen with both the appropriate message proforma (based on this message's message proforma definition) and the appropriate reply address; otherwise, display an 'Invalid Selection' message in the status area |
| Message - Save | if the message being displayed is from the incoming message log and if the message has previously been read by the user, move the message from the incoming message log to the saved message log; if the saved message log does not have space available for the message, display a message indicating that the user will delete messages from the saved message log before the save operation can be performed; if the currently highlighted message has not been read by the user, display an 'Invalid Selection' message in the status area |
| Message - View MRNs | display the View MRNs screen |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the View Message screen is displayed, the software will display an 'Invalid Selection' message in the status area of the second information line when the user selects any menu function not listed in the table.

View MRNs Screen

When the View MRNs screen is displayed, the software will display the contents of the View MRNs screen body as shown in FIGS. 8–14, View MRNs Screen. The software will display the Message Reference Numbers (MRNs) associated with the message that was displayed on the View Message screen when that screen was displayed. (The MRNs are determined from the Local—Middleware Status Messages described above). The software will display a 'P' preceding an MRN if a Positive Delivery Notification (PDN) has been received for that MRN. The software will display an 'N' preceding an MRN if a Negative Delivery Notification (NDN) has been received for that MRN. The software will display a '*' preceding an MRN if either a PDN nor an NDN has been received for that MRN. The software will initially position the cursor over the first MRN in the list. The software will allow the user to scroll through the list of MRNs using the up and down arrow keys. The software will prevent the user from modifying the contents of this screen. The software will allow the user to exit this screen and return to the View Message screen by pressing the <ESC> key.

When the View MRNs screen is displayed, the software will display an 'Invalid Selection' message in the status area of the second information line when the user selects any menu function.

Outgoing Message Log Screen

When the Outgoing Message Log screen is displayed, the software will display the contents of the Outgoing Message Log screen body similar to that shown in FIGS. 8–15, Outgoing Message Log Screen. (This requirement says 'similar' since the screen body is dependent upon the messages currently in the outgoing message log.) The software will display the indicated header information for each message currently in the outgoing message log. The software will use the same time zone being used for the current date/time in the bottom information line for all message DATE/TIME SENT times. The software will display the current delivery status of each outgoing message; if the delivery status indicates that delivery failed, the software will display the status and reason code (as reported by the middleware software) associated with the delivery status. The software will sort the messages in an order determined by the DATE/TIME SENT for the message.

The software will initially highlight the first message displayed in the log. The software will allow the user to scroll through all messages in the log using the up and down arrow keys. If the user presses the <ENTER> key with the cursor positioned over a given message, the software will display the View Message screen with that message. When the Outgoing Message Log screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message - Send | re-send an exact copy of the highlighted message (automatic data variables should not be re-evaluated; a new message should be added to the outgoing message log); if the address being sent to is not in the address book, add it to the RAM address book; if the RAM address book is full, prompt the user to determine if they want to delete an existing address from the address book using the Prompt screen; if they do, display the Select Address screen to allow user to select address to be deleted; if they do not, send message, but do not add address to the RAM address book |
| Message - Edit | display the Enter Message screen with a copy of the highlighted message using its message proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Message Logs - Print | print the header information for all messages currently in the outgoing message log sorted in the same way they are displayed on the screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Outgoing Message Log screen is displayed, the software will display an 'Invalid Selection' message in the status area of the second information line when the user selects any menu function not listed in the table.

Saved Message Log Screen

When the Saved Message Log screen is displayed, the software will display the contents of the Saved Message Log screen body similar to that shown in FIGS. 8–16, Saved Message Log Screen. (This requirement says 'similar' since the screen body is dependent upon the messages currently in the saved message log.) The software will display the indicated header information for each message currently in the saved message log. The software will use the same time zone being used for the current date/time in the bottom information line for all message DATE/TIME RECEIVED times. The software will display a "*" in the REPLY REQUIRED column for each message that requires a user reply (based upon the definition of the message proforma for the saved message and whether or not the user has already replied to the message). The software will sort the messages in an order determined by the DATE/TIME RECEIVED for the message.

The software will initially highlight the first message displayed in the log. The software will allow the user to scroll through all messages in the log using the up and down arrow keys. If the user presses the <ENTER> key with the cursor positioned over a given message, the software will display the View Message screen with that message.

When the Saved Message Log screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message - Delete | delete the highlighted message from the saved message log |
| Message - Reply | display the Enter Message screen with both the appropriate message proforma (based on this message's message proforma definition) and the appropriate reply address |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Message Logs - Print | print the header information for all messages currently in the saved message log sorted in the same way they are displayed on the screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Saved Message Log screen is displayed, the software will display an 'Invalid Selection' message in the status area of the second information line when the user selects any menu function not listed in the table.

Network Message Log Screen

When the Network Message Log screen is displayed, the software will display the contents of the Network Message Log screen body similar to that shown in FIGS. 8–17, Network Message Log Screen. (This requirement says 'similar' since the screen body is dependent upon the messages currently in the network message log.) The software will display the indicated header information for each message currently in the network message log. The software will use the same time zone being used for the current date/time in the bottom information line for all messages DATE/TIME SENT/RECEIVED times. The software will display the current delivery status of each outgoing network message; if the delivery status indicates that delivery failed, the software will display the error code associated with the delivery status. The software will sort the messages in an order determined by the DATE/TIME SENT/RECEIVED for the message.

The software will initially highlight the first message displayed in the log. The software will allow the user to scroll through all messages in the log using the up and down arrow keys. If the user presses the <ENTER> key with the cursor positioned over a given message, the software will display an 'Invalid Selection' message since network messages cannot be viewed on the screen.

When the Network Message Log screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message - Send | if the currently highlighted message was originally sent as an outgoing message, and if the AMC software is currently functioning in 'Admin' mode, resend an exact copy of the message (automatic data variables should not be re-evaluated; a new sent message should be added to the network message log); otherwise, display an 'Invalid Selection' message in the status area |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Network Message Log screen is displayed, the software will display an 'Invalid Selection' message in the status area of the second information line when the user selects any menu function not listed in the table.

Enter Address Screen

When the Enter Address screen is displayed, the software will display the contents of the enter Address screen body as shown in FIGS. 8–18, Enter Address Screen. The software will allow the user to enter an address in the ADDRESS field. When the user presses <ENTER>, the software will ensure that the entered address only contains alphanumeric characters. If it does, the software will return to the Enter Message screen and display the entered address in the TO field of that screen. If it does not, the software will display an 'Invalid Address' message in the status area, and allow the user to re-enter the address. The software will allow the user to exit this screen without entering an address by pressing the <ESC> key.

When the Enter Address screen is displayed, the software will display an 'Invalid Selection' message in the status area of the second information line when the user selects any menu function.

Select address screen

When the Select Address screen is displayed, the software will display the contents of the Select Address screen body as shown in FIGS. 8–19, Select Address Screen. The software will display the addresses in alphabetical order based on the address alia. The software will initially position the cursor over the first address in the list. The software will allow the user to scroll through the list of addresses using the up and down arrow keys. The software will allow the user to select an address by pressing <ENTER> when the cursor is positioned over the desired address. When the user selects an address, and if this screen was displayed while the user was entering a message in the Enter Message screen, the software will return to the Enter Message screen and display the selected address in the TO field of that screen. If this screen was displayed as the result of the user sending a message to an address alias that was not in the address book, the software trying to add the alias to the address book and the software determining that the address book was full, the software will delete the address selected by the user and return to the screen that was displayed when the user request the 'send message' menu function. The software will allow the user to exit this screen without selecting an address by pressing the <ESC> key.

When the Select Address screen is displayed, the software will display an 'Invalid Selection' message in the status area of the second information line when the user selects any menu function.

Select Default Address Screen

When the Select Default Address screen is displayed, the software will display the contents of the Select Default Address screen body as shown in FIGS. 8–20, Select Default Address Screen. The software will display the addresses in alphabetical order. The software will initially position the cursor over the first address in the list. The software will allow the user to scroll through the list of addresses using the up and down arrow keys. The software will allow the user to select an address by pressing <ENTER> when the cursor is positioned over the desired address. When the user selects an address, the software will save that address as the default address to be initially displayed when the user displays the Enter Message screen. The software will allow the user to exit this screen without selecting an address by pressing the <ESC> key.

When the Select Default Address screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with with the transceiver's currently configured data report parameters |
| Transceiver - Show Config - DNID/Mem# List | display the Transceiver List Configuration screen with the transceiver's currently configured DNID/ Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |

-continued

| Menu Function | Software Action |
|---|---|
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Select Default Address screen is displayed, the software will display an 'Invalid Selection' message in the status area of the second information line when the user selects any menu function not listed in the table.

Monitor Transceiver Status Screen

When the Monitor Transceiver Status screen is displayed, the software will display the contents of the Monitor Transceiver Status screen body similar to that shown in FIGS. 8–21, Monitor Transceiver Status Screen—Page 1, and FIGS. 8–22, Monitor Transceiver Status Screen—Page 2. (This requirement says 'similar' since most of the screen body is dependent upon the current status of the transceiver and DTE.) The software will display the most recently retrieved values of all of the listed transceiver and DTE values (including POSITION) when the screen is initially displayed. The software will query the transceiver and DTE for new values and display those new values on the screen at a rate no less than that specified by the Display_Update_Interval configuration parameter. The software will display the rate at which it is updating the screen in the SCREEN UPD. RATE field on the screen. If the user has elected to 'Show Events', the software will display all transceiver events (see 'Local—DCE Event Messages') received from the middleware software in the TRNCVR EVENT field on the screen in 'event_code:last 50 characters' format, where 'event_code' is the number contained in the first line of every event message and 'last 50 characters' represents the last 50 characters within the event message. If the 'last 50 characters' does not contain the entire event message, then the software will display '. . .' between the ':' and the 'last 50 characters'. If the user has elected to not 'Show Events', the software will display "Not Shown" in the TRNSCVR EVENT field.

The software will allow the user to move between the pages of this screen using the <PG UP> and <PG DN> keys. The software will prevent the user from modifying any of the information on this screen. The software will allow the user to halt the status query process and to exit this screen at any time by pressing the<ESC> key.

when the Monitor Transceiver Status screen is displayed, the software will perform the following actions when the user selects the specified menu function:

| Menu Function | Software Action |
| --- | --- |
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Show Events | if transceiver events are currently being shown on the Monitor Transceiver Status screen, stop showing them; if they are not currently being shown and if that screen is currently displayed, start showing them; display a 'check' next to the menu item when 'show events' has been selected |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |

-continued

| Menu Function | Software Action |
| --- | --- |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Monitor Transceiver Status screen is displayed, the software will display an 'Invalid Selection' message in the status area of the second information line when the user selects any menu function not listed in the table.

Transceiver Configuration Screen

When the Transceiver Configuration screen is displayed, the software will display the contents of the Transceiver Configuration screen body similar to that shown in FIGS. 8–23, Transceiver Configuration Screen. (This requirement says 'similar' since most of the screen body is dependent upon the current configuration of the transceiver.) The software will query the transceiver for each of its configuration parameters shown in FIGS. 8–23, and will display each of them as they are received from the transceiver. The software will prevent the user from modifying any of the information displayed on this screen. The software will allow the user to halt the parameter query process and to exit this screen at any time by pressing the <ESC> key.

When the Transceiver Configuration screen is displayed, the software will perform the following actions when the user selects the specified menu function (note that the software will halt the parameter query process when any menu function is selected that displays another screen):

| Menu Function | Software Action |
| --- | --- |
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - Data Reports | display the Transceiver List Configuration screen with the transceiver's currently configured data report parameters |

-continued

| Menu Function | Software Action |
|---|---|
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Transceiver Configuration screen is displayed, the software will display an 'Invalid Selection' message in the status area of the second information line when the user selects any menu function not listed in the table.

Transceiver List Configuration Screen

When the Transceiver List Configuration screen is displayed, the software will display the contents of the Transceiver List Configuration screen body similar to that shown in FIGS. 8–24, Transceiver List Configuration Screen. (This requirement says 'similar' since most of the screen body is dependent upon the current configuration of the transceiver.) The software will display the configuration parameter being queried at the top of the screen body where FIGS. 8–24 reads "PARAMETER NAME GOES HERE". The software will query the transceiver for the list of values associated with the configuration parameter whose name is shown, and will display each of the values as they are received from the transceiver. The software will prevent the user from modifying any of the information displayed on this screen. The software will allow the user to scroll through the list of displayed values using the up and down arrow keys. The software will allow the user to halt the parameter query process and to exit this screen at any time by pressing the <ESC> key.

When the Transceiver List Configuration screen is displayed, the software will perform the following actions when the user selects the specified menu function (note that the software will halt the parameter query process when any menu function is selected that displays another screen):

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |

-continued

| Menu Function | Software Action |
|---|---|
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Transceiver List Configuration screen is displayed, the software will display an 'Invalid Selection' message in the status area of the second information line when the user selects any menu function not listed in the table.

Enter Data Report Identifier Screen

When the Enter Data Report Identifier screen is displayed, the software will display the contents of the Enter Data Report Identifier screen body as shown in FIGS. 8–25, Enter Data Report Identifier Screen. The software will allow the user to enter the identifier for the data report to be sent in the DATA REPORT ID field. When the user presses <ENTER>, the software will ensure that the user entered a valid data report identifier. If they did, the software will command the transceiver to initiate the specified data report. If they did not, the software will display an 'Invalid Data Report Identifier' message in the status area, and allow the user to re-enter the data report identifier. The software will allow the user to exit this screen without entering a data report identifier by pressing the <ESC> key.

When the Enter Data Report Identifier screen is displayed, the software will display an 'Invalid Selection' message in the status area of the second information line when the user selects any menu function.

Login Transceiver Screen

When the Login Transceiver screen is displayed, the software will display the contents of the Login Transceiver screen body as shown in FIGS. 8–26, Login Transceiver Screen. The software will allow the user to enter the identifier for the TDM channel to be logged into in the TDM CHANNEL ID field. When the user presses <ENTER>, the software will ensure that the user entered a valid TDM channel identifier. If they did, the software will command the transceiver to log into the specified TDM channel. If they did not, the software will display an 'Invalid TDM Channel Identifier' message in the status area, and allow the user to re-enter the TDM channel identifier. The software will allow the user to exit this screen without entering a TDM channel identifier by pressing the <ESC> key.

When the Login Transceiver screen is displayed, the software will display an 'Invalid Selection' message in the status area of the second information line when the user selects any menu function.

PVT Results Screen

When the PVT Results screen is displayed, the software will display the contents of the PVT Results screen body similar to that shown in FIGS. 8–27, PVT Results Screen. (This requirement says 'similar' since most of the screen body is dependent upon the results of the PVT.) The software will query the transceiver for the results of its most recent PVT, and will display those results in the PVT RESULTS field. If the PVT results span more than one page, the software will allow the user to view the multiple pages using the <PG UP> and <PG DN> keys. The software will prevent the user from modifying any of the information displayed on the screen.

When the PVT Results screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |

-continued

| Menu Function | Software Action |
|---|---|
| Transceiver - Command - Manual Logout [Admin] | command the transceiver to Logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the PVT Results screen is displayed, the software will display an 'Invalid Selection' message in the status area of the second information line when the user selects any menu function not listed in the table.

Enter Transceiver Configuration Filename Screen

When the Enter Transceiver Configuration Filename screen is displayed, the software will display the contents of the Enter Transceiver Configuration Filename screen body as shown in FIGS. 8–28, Enter Transceiver Configuration Filename Screen. The software will allow the user to enter the drive, pathname and filename of the file that contains transceiver configuration parameters to be modified. When the user presses <ENTER>, the software will ensure that the entered filename exists. If it does, the software will read the file and command the transceiver to change each of the configuration parameters listed in the file to the values provided in the file. If it does not, the software will display an 'Invalid Filename' message in the status area, and allow the user to re-enter the filename. As the software is reading each of the configuration commands and sending them to the transceiver, it will display any errors encountered during the process in the status area. The software will allow the user to halt the configuration command process at any time by pressing the <ESC> key. The software will allow the user to exit this screen without entering a filename by pressing the <ESC> key.

When the Enter Transceiver Configuration Filename screen is displayed, the software will display an 'Invalid Selection' message in the status area of the second information line when the user selects any menu function.

About Terminal Screen

When the About Terminal screen is displayed, the software will display the contents of the About Terminal screen body as shown in FIGS. 8–29, About Terminal Screen. The software will display the customer service phone number as provided by the Cust_Serv_Num configuration parameter in the CUSTOMER SERVICE field. The software will prevent the user from modifying any of the information displayed on the screen.

When the About Terminal screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |

-continued

| Menu Function | Software Action |
|---|---|
| Terminal - Configure - Time Zone | display the Select Time Zone screen |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the About Terminal screen is displayed, the software will display an 'Invalid Selection' message in the status area of the second information line when the user selects any menu function not listed in the table.

Select Time Zone Screen

When the Select Time Zone screen is displayed, the software will display the contents of the Select Time Zone screen body as shown in FIGS. 8–30, Select Time Zone Screen. The software will initially position the cursor over the first time zone in the list. The software will allow the user to scroll through the list of time zones using the up and down arrow keys. The software will allow the user to select a time zone by pressing <ENTER> when the cursor is positioned over the desired time zone. When the user selects a time zone, the software will save that time zone as the one to use when displaying all dates and times on any of the DTE's screens. The software will allow the user to exit this screen without selecting a time zone by pressing the <ESC> key.

When the Select Time Zone screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter - {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/ Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |

-continued

| Menu Function | Software Action |
|---|---|
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key: after user selects a function key, display a message in the status area asking user to select a menu function; after the user selects a menu function, associate the selected function key with the selected menu function and store the association for future use |
| Terminal - Show Config | display the Terminal Configuration screen |
| Terminal - Logoff | exit the current window and display the Logon screen; note that this menu function should only be present in the MDF when the Logon_Required configuration parameter indicates that the user should log on to and out of the AMC software |

When the Select Time Zone screen is displayed, the software will display an 'Invalid Selection' message in the status area of the second information lien when the user selects any menu function not listed in the table.

Terminal Configuration Screen

When the Terminal Configuration screen is displayed, the software will display the contents of the Terminal Configuration screen body similar to that shown in FIGS. 8–31, Terminal Configuration Screen—Page 1, and 8–32, Terminal Configuration Screen—Page 2. (This requirement says 'similar' since most of the screen body is dependent upon the current configuration of the DTE.) The software will display each of the DTE configuration parameters shown in FIGS. 8–31 and 8–32 as read from the DTE Configuration File. The software will allow the user to view the multiple pages of this screen using the <PG UP> and <PG DN> keys. The software will prevent the user from modifying any of the information displayed on this screen.

When the Terminal Configuration screen is displayed, the software will perform the following actions when the user selects the specified menu function:

| Menu Function | Software Action |
|---|---|
| Quick Send - {Any Proforma} | display the Enter Message screen with the selected user proforma |
| Message - Enter {Any Proforma} | display the Enter Message screen with the selected user proforma |
| Message Logs - View Incoming | display the Incoming Message Log screen |
| Message Logs - View Outgoing | display the Outgoing Message Log screen |
| Message Logs - View Saved | display the Saved Message Log screen |
| Message Logs - View Network | display the Network Message Log screen |
| Address - Set Default | display the Select Default Address screen |
| Transceiver - Monitor | display the Monitor Transceiver Status screen |
| Transceiver - Show Config - General | display the Transceiver Configuration screen |
| Transceiver - Show Config - Data Reports | display the Transceiver List Configuration screen with the transceiver's currently configured data report parameters |
| Transceiver - Show Config - DNID/Mem# List | display the Transceiver List Configuration screen with the transceiver's currently configured DNID/Mem# parameters |
| Transceiver - Show Config - ENID List | display the Transceiver List Configuration screen with the transceiver's currently configured ENID parameters |
| Transceiver - Show Config - TDM List | display the Transceiver List Configuration screen with the transceiver's currently configured TDM parameters |
| Transceiver - Command - Data Report [Admin] | display the Enter Data Report screen |
| Transceiver - Command - Distress Alert [Admin] | command the transceiver to initiate a distress alert |
| Transceiver - Command - Forced Clear [Admin] | command the transceiver to initiate a forced clear |
| Transceiver - Command - Initiate PVT [Admin] | command the transceiver to initiate a PVT test |
| Transceiver - Command - Manual Login [Admin] | display the Login Transceiver screen |
| Transceiver - Command - Manual Logout [Admin] | command the transceiver to logout from the current TDM |
| Transceiver - Command - Query Pvt | display the PVT Results screen |
| Transceiver - Command - Spot Beam Roam | command the transceiver to initiate spot beam roaming |
| Transceiver - Configure [Admin] | display the Enter Transceiver Configuration Filename screen |
| Terminal - About | display the About Terminal screen |
| Terminal - Configure - Function Keys | display a message in the status area asking user to select a function key; after user selects a function key, display a message in the status area asking user to select a menu function; after the user selects a menu function, associate the selected function key with the selected menu function and store the association for future use |
| Terminal - Configure - Time Zone | display the Select Time Zone screen |

-continued

| Menu Function | Software Action |
|---|---|
| Terminal - Logoff | exit the current window and display the Logon screen; note that this menu function should only be present in the MDF when the Logon_Required configuration parameter indicates that the user should log on to and out of the AMC software |

When the Terminal Configuration screen is displayed, the software will display an 'Invalid Selection' message in the status area of the second information line when the user selects any menu function not listed in the table.

Alert Screen

When the Alert screen is displayed, the software will display the contents of the Alert screen body similar to that shown in FIGS. 8–33, Alert Screen. (This requirement says 'similar' since most of the screen body is dependent upon the alert being displayed.) When this screen is displayed, the software will also beep the speaker as described below. The software will display a specific alert and will continue to display the alert until the user presses the <ESC> key; the software will exit this screen when the user presses the <ESC> key.

When the Alert screen is displayed, the software will display an 'Invalid Selection' message in the status area of the second information line when the user selects any menu function.

Prompt Screen

When the Prompt screen is displayed, the software will display the contents of the Prompt screen body similar to that shown in FIGS. 8–34, Prompt Screen. (This requirement says 'similar' since most of the screen body is dependent upon the prompt being displayed.) When this screen is displayed, the software will also beep the speaker as described below. The software will display a specific prompt and will continue to display the prompt until the user presses the 'Y' or 'N' key; the software will exit this screen when the user presses one of these two keys. The software will display an 'Invalid Selection' message in the status area if the user presses any other key (not that the <EMG> and <SEND> keys described below are always valid keys).

When the Prompt screen is displayed, the software will display an 'Invalid Selection' message in the status area of the second information line when the user selects any menu function.

Message LED

Upon receipt of a user message (as opposed to a network message) from the middleware software by the application software, the software will blink the message LED continuously until the user views one 'unread' message in the incoming or saved message log. Once the user has viewed one unread message, the software will light the message LED until the user has viewed all unread messages. If the message LED is lit, and if the application software receives a new user message, the software will again blink the message LED continuously until the user views one unread message. The software will extinguish the message LED when there are no unread messages in the incoming or saved message logs.

Ready LED

The application software will light the ready LED whenever the middleware software reports that the DCE is available for message communications. The application software will extinguish the ready LED whenever the middleware software reports that the DCE is not available for message communications. The application software will blink the ready LED continuously for 30 seconds upon receipt of a distress alert acknowledgement event from the DCE. At the end of the 30 second period, the application software will either light or extinguish the ready LED based on the current status of the DCE as reported by the middleware software.

Speaker

The software will cause the DTE's speaker to warble (multi-frequency sound) whenever the application software receives a user message from the middleware software. If the Msg_Chirp_Int configuration parameter is set to a positive number, the software will continue to chirp (short, single-frequency sound) the speaker at the interval (in seconds) specified by the configuration parameter until the user has read all unread messages; the software will stop chirping the speaker once all unread messages have been read. If the Msg_Chirp_Squelch configuration parameter indicates that chirp squelching is enabled, and if the software is chirping the speaker due to unread messages, the software will allow the user to disable the periodic message chirps by pressing any key on the DTE's keyboard. (Note that the initial warble and the periodic chirps will resume when the software receives another user message.)

In addition to these message related speaker sounds, the software will beep the speaker any time the software displays the Alert screen or the Prompt screen. The software will beep the speaker any time the 'Invalid Selection' message is displayed in the status area. The software will also beep the speaker any time the user enters invalid data in a field within the Enter Message screen.

Distress Switch and Emergency/Send Keys

The software will monitor keyboard input for an indication that the user has either activated the distress switch or pressed the <EMG> key followed by the <SEND> key. Upon determining that either of these events has occurred, the software send an 'emergency' message to the middleware. The middleware software will immediately command the DCE to send a distress alert. The software will respond to a distress alert acknowledgement from the LES.

Alarm Device

The software will activate the DTE's alarm device each time a user message is received at the DET.

CONFIGURATION FILES AND ADDRESS BOOK

This portion describes the requirements of the static configuration files used by the AMC software and the meaning of each of the configuration parameters required within these files. It describes the Flash-ROM address list and the RAM address list that together form the AMC's address book. It also describes the message proforma and field list proforma definition files.

Static configuration Files

DTE Configuration File(s)

These files (the parameters listed below may be divided among several files for configuration management and automatic generation purposes) will contain configuration parameters read by the application software upon initialization in order to configure the state of the AMC. The parameters to be included within these files are as follows:

Addr_mode
  indicates whether the AMC is to function in single primary destination address mode or multiple primary destination address mode; i.e., whether the Flash-ROM and RAM address lists only contain destination address aliases or whether they contain destination address aliases and physical addresses for each address alias.
  valid values: S, M Cust_Serv_Num
  this is the phone number of a satellite network customer service center
  valid values: (999)999-9999

Default_Data_Addr_Type
  Indicates whether the default data address is a DNID, Network, SAC or Mobile Id.

Default_Data_Addr_Value
  Indicates the default data address value. Valid values:
    if Default_Data_Addr_Type is 'D': 0-65535
    if Default_Data_Addr_Type is 'N': valid X.121 address
    if Default_Data_Addr_Type is 'S': 2–6 character alphanumeric string
    if Default_Data_Addr_Type is 'M': 1-999999999

Default_Mobile_Alias
  this is the address alias of this AMC in cases where the user is not required to logon/logoff
  valid values: 1–8 character alphanumeric string (e.g. AB1DE2G3)

Default_Dest_Addr_Type
  if this AMC should always send messages to a default destination address (based on 'Addr_Mode'), this indicates whether that address is a 'DNID', 'Network', SAC or Mobile Id
  valid values: D, N, S, M Default_Dest_Addr_Value
  if this AMC should always send messages to a default destination address (based on 'Addr_Mode'), this indicates the value of that address
  valid values:
    if Default_Dest_Addr_Type is 'D': 0-65535
    if Default_Dest_Addr_Type is 'N': valid X.121 address
    if Default_Dest_Addr_Type is 'S': 6 character alphanumeric string
    if Default_Dest_Addr_Type is 'M': 1-999999999

Default_Nms_Addr_Type
  this indicates whether the default network management station's address is a 'Mailbox' address or whether it is an 'Network' address
  valid values: D, N, S, M Default_Nms_Addr_Value
  this indicates the value of the default network management station's address
  valid values:
    if Default_Nms_Addr_Type is 'D': 0-65535
    if Default_Nms_Addr_Type is 'N': valid X.121 address
    if Default_Nms_Addr_Type is 'S': 6 character alphanumeric string
    if Default_Nms_Addr_Type is 'M': 1-999999999

Default_Time_Zone
  indicates the default time zone that should be used when displaying all times on this AMC
  valid values: AST, ADT, CST, CDT, EST, EDT, HST, HDT, MST, MDT, PST, PTD Display_Update_Interval
  indicates the number of seconds that should elapse between updates of the DCE information displayed on the DTE's monitor and the current date and time displayed on the DTE's monitor
  valid values: 1-65535

Fixed_Fmt_Msg_Priority this indicates the priority at which the software will send all fixed-format messages over the network (note that proforma messages are sent at the priority indicated within their message proforma)
valid values: 5, 7, 9

Health__Log__Update__Interval
indicates the number of seconds that should elapse between updates of the DTE and DCE health information in the AMC health log
valid values: 1-65535

Health__Report__DNID
indicates the DNID to which the periodic health reports are to be sent
valid values: 0-65535

Health__Report__Mem__Num
indicates the member number to which the periodic health reports are to be sent
valid values: 0–255

Logon__Required
indicates whether or not the application software should require the user to log on before using the AMC and to log off when finished using the AMC
valid values: Y, N Max__Auto__Data__Age
indicates the maximum allowable age for DCE health information that is to be included in automatic data variables within message proformas; i.e., the software will query the DCE for its health information at least every n seconds, where n is specified by this parameter
valid values: 1-65535

Max__Data__Msg__Log__Size
indicates the maximum size (in Kbytes) of the data message log Max__Data__Msgs__In__Log
indicates the maximum number of messages that can be placed in the data message log Max__Health__Log__Size
indicates the maximum size (in Kbytes) of the AMC health log
valid values: 1-65535

Max__Incoming __Msg__Log__Size
indicates the maximum size (in Kbytes) of the incoming message log
valid values: 1-65535

Max__Incoming __Msgs__In__Log
indicates the maximum number of messages that can be placed into the incoming message log
valid values: 1-65535

Max__Network__Msg__Log__Size
indicates the maximum size (in Kbytes) of the network message log
valid values: 1-65535

Max__Network__Msgs__In__Log
indicates the maximum number of messages that can be placed into the network message log
valid values: 1-65535

Max__Operating__Speed
indicates the speed (as determined from the DCE) at which the application software will deactivate the DTE's LCD; a negative number indicates that the application software should never deactivate the DTE's LCD; zero is an invalid number
valid values: –1, 1–100

Max__Outgoing__Msg__Log__Size
indicates the maximum size (in Kbytes) of the outgoing message log
valid values: 1-65535

Max__Outgoing__Msgs__In__Log
indicates the maximum number of messages that can be placed into the outgoing message log
valid values: 1-65535

Max__RAM__Addresses
indictes the maximum number of addresses that can be placed into the RAM address list
valid values: 1-65535

Max__Saved__Msg__Log__Size
indicates the maximum size (in K bytes) of the saved message log
valid values: 1-65535

Max__Saved__Msgs__In__Log
indicates the maximum number of messages that can be placed into the saved message log
valid values: 1-65535

Max__Transmitted__Msg__Len
indicates the maximum size of any message that can be given to (or received from) the middleware for transmission over the network
valid values: 1-2147483648 (32767 for EMS)

Msg__Chirp__Int
specifies the interval (in seconds) at which the software should sound the DTE's speaker (i.e. 'chirp') when an incoming message exists that has not been read by the user; a negative number indicates that the speaker should never 'chirp' for this reason; zero is an invalid value; note that this parameter has no affect on the sound made by the speaker when a message initially arrives
valid values: 1, 1-255

Msg__Chirp__Squelch
indicates whether or not the user is allowed to squelch the 'new message' chirps by pressing a key on the DTE'keyboard
valid values: Y,N Outgoing__Msg__Ack__Level
indicates the message acknowledgement level that the application software should request of the middleware software when giving it messages for transmission over the network
valid values: Dev, Serv, Tout, Appl Outgoing__Msg__Time__To__Live
indicates the 'time-to-live' value (in minutes) that the application software should request of the middleware software when giving it a message for transmission over the network; the middleware will use this value to 'expire' the message if it can't transmit it after the given amount of time
valid values: 1-65535

Menu Definition File

This file will contain information read by the application software upon initialization in order to configure the AMC's user interface menus. The file will contain:

A list of menu panes.

For each menu pane defined within the file, the file contains:

The number of menu items in that pane

A list of menu items in that pane.

For each menu item defined within the file, the file contains:

The alias to be displayed on the screen for that menu item

The action to be performed when that menu item is selected; actions may be:

Display another menu pane (if this menu item is for a 'cascading' menu item)

Enter a message using the given proforma identifier

Perform a software function (e.g. display a screen, select an address, configure DCE)

DCE Configuration File

This file will contain information read by admin application software in order to configure the DCE. For each DCE configuration parameter to be set, the file will contain:

An alias for the configuration parameter

The new value for the configuration parameter.

The configuration file may be used to set any of the DCE configuration parameters listed below. Note that this file is only read by the admin software when the admin user requests that the DCE be configured; it is not meant to always contain the current configuration of the DCE.

AMC Address Book

Flash-ROM Address List

This file will contain the addresses that form the 'Flash-ROM' portion of the AMC address book. The contents of this file are dependant upon the Addr_Mode configuration parameter. If that configuration parameter indicates that all messages sent from the AMC should be sent to the address specified by the Default_Dest_Addr_Value configuration parameter, then this file will simply contain a list of 1–8 alphanumeric character address aliases. If the Addr_Mode configuration parameter indicates that the default address should not always be used, then this file will contain a list of addresses, where each address will contain the following information:

Address alias (1–8 alphanumeric characters)

Address type (DNID, Network, SAC or Mobile Id)

Address value (1–14 alphanumeric characters).

RAM Address List

The file will contain the addresses that form the 'RAM' portion of the AMC address book. The contents of this file will dynamically change based on replies to user messages and user interface actions, as described in the Address Book, and User Interface Sections. This file will contain a list of addresses, where each address will contain the following information:

Address alias (1–8 alphanumeric characters)

Address type (DNID, Network, SAC or Mobile Id)

Address value (1–14 alphanumeric characters).

Proforma Definition Files

Message Proforma Definition Files

These files will contain the definitions of the message proformas to be used by messages transmitted to and from the AMC. Each file will contain the definition of one message proforma object. The files will contain values for all of the attributes of a message proforma object as described in Section Message Proforma.

Field List Proforma Definition Files

These files will contain the definitions of the field list proformas referenced within message proformas used by messages transmitted to and from the AMC. Each file will contain the definition of one field list proforma object. The files will contain values for all of the attributes of a field list proforma object as described in Section Field List Proforma.

PERIODIC HEALTH LOG AND HEALTH REPORT CONTENTS

This portion specifies the data that the software will periodically place into the AMC health log, as well as the data software will periodically transmit over the network in a health report. (Note that the software also places additional data into the health log such as DCE events described below and indications of severe software, network and middleware errors.)

Health Log Data

As required by the Health Log, the software will periodically place the following data into the AMC health log:

UTC date/time that entry is being logged (from DTE)

DCE Bulletin board error rate (BBER)

DCE Signal Strength

GPS-derived lat/lon

GPS-derived course over ground (COG)

GPS-derived speed over ground (SOG)

DCE "Logged-in" state

DCE "Locked" state

DCE activity

DCE currently tuned TDM ID

DCE currently tuned TDM channel frequency

Number of unread messages in the incoming messages log

Number of outgoing messages queued by the middleware

Percentage of DTE RAM disk used

Percentage of DTE conventional RAM used.

Periodic Health Report Data

Upon request as required in Section Network, the software will periodically send the following health report data over the network:

DCE Bulletin board error rate (BBER)

DCE Signal Strength

GPS-derived lat/lon

GPS-derived course over ground (COG)

GPS-derived speed over ground (SOG)

DCE "Logged-in" state

DCE "Locked" state

DCE activity

Number of unread messages in the incoming messages log

Number of outgoing messages queued by the middleware

Percentage of DTE RAM disk used

Percentage of DTE conventional RAM used.

MESSAGE LIST AND CONTENTS

This portion described the 'application' contents of all messages transmitted between the application software and the middleware software, including user and network messages to be sent and received via the satellite network, and local messages to be sent to and received from the middleware and the DCE. Note that this section only addresses the required contents of messages at the 'application' level; it does not address the actual message contents transmitted over the network after the middleware software adds necessary control and routing information, nor does it address the actual data formats for each field within the messages.)

User and Network Messages

The application portion of all user and network messages will contain:

Message class (proforma [0] vs fixed-format [1])

Reply address present flag (indicates whether or not the 'Reply' fields are present)

Reply alias

Reply address type (DNID, 'Network', Special Access Code, Mobile Id)

Reply physical address.

The contents of the remainder of the application portion of messages depends on whether the 'message class' is 'proforma' or 'fixed-format'. The remainder of the application portion for all user and network proforma messages will contain:

Message proforma identifier

Proforma version (major/minor version number)

Field values as indicated by the messages proforma.

The remainder of the application portion for all fixed-format network messages will contain (note that all user messages are proforma messages):

Message identifier

Message contents in a fixed format based on the messages identifier.

The following lists all fixed-format network messages along with their required contents:

File
  Message identifier: 1
  Message contents:—the exact binary contents of the file being transmitted (including cr/lf, etc.)

DCE Config Changed
  Message identifier: 2
  Message contents:—the serial number of the DCE Proforma List
  Message identifier: 3
  Message contents:—a list of message and field list proforma identifiers and associated version numbers PVT Results
  Message identifier: 4
  Message contents:—the exact contents of the PVT results Invalid Alias
  Message identifier: 5
  Message contents:—the alias that is invalid Command
  Message identifier: 6
  Message contents:—a list of commands, and associated status displays and command data, to be executed by the application software Local Messages The application portion of all local, middleware-related fixed-format messages will contain data. The application portion of all local, DCE-related fixed-format messages will contain commands and command responses from the Trimble transceiver. Note that all local messages are fixed-format messages.

DCE COMMAND, CONFIGURATION AND EVENT MESSAGES

This section lists the DCE Command Messages and DCE Configuration Messages that the software will send to the DCE as required; it also lists the DCE Event Messages that the software will recognize and place into the AMC health log.

DCE Command Messages

The software will be able to send the following command messages to the DCE for the format and values of associated parameters):

initiate PVT
log in to TDM [Admin]
log out of TDM [Admin]
send distress alert
send data report
initiate spot beam roam
force clear [Admin]
query login mode
query mobile number
query EGC only (out of service) flag
query diagnostics DCE feedback flag
query signalling DCE feedback flag
query DCE alarms flag
query DTE alarms flag
query DNID/member number/LES Id list
query ENID list
query generate data reports power up/down flag
query data report generation intervals
query burst retry count
query burst uncertain retry count
query power down timer
query message type routing
query transmit packet limit
query MT mode
query roaming parameters
query serial #, Inmarsat #, model #, firmware revision #,
query date/time
query current frame #
query currently tuned TDM frequency
query BBER
query INF information
query PVT results
query LES status.

DCE Configuration Messages

The software will be able to send the following configuration messages to the DCE for the format and values of associated parameters):

set login mode [Admin]
set mobile number [Admin]
set EGC only (out of service) flag [Admin]
enable diagnostics DCE feedback [Admin]
disable diagnostics DCE feedback [Admin]
enable signalling DCE feedback [Admin]
disable signalling DCE feedback [Admin]
enable DCE alarms [Admin]
disable DCE alarms [Admin]
enable DTE alarms [Admin]
disable DTE alarms [Admin]
set/clear DNID/member number/LES Id list [Admin]
set/clear ENID number
set generate data reports on power up/down flag [Admin]
set data report generation intervals [Admin]
set burst retry count [Admin]
set burst uncertain retry count [Admin]
set power down timer [Admin]
set message type routing [Admin]
set transmit packet limit [Admin]
set MT mode [Admin]
set roaming parameters [Admin]

DCE Event Messages

As required by Section DCE, the software will be able to recognize DCE event messages and will place them into the AMC Health Log. The software will place all DCE event messages into the log.

As required by Section DCE, the software will be able to recognize the following DCE event message as a distress acknowledgement:

"Protocol Indication: 1036"

"Distress Alert Transmitted and Acknowledged"

MESSAGE PROFORMA AUTO. DATA VARIABLES & COMMANDS

This portion lists all automatic data variables and commands that are valid within message proformas. As required by Section Message Proforma, the software will automatically include data in messages that use message proforma containing the following automatic data variables:

DCE-B-RETRY—currently configured value for DCE burst retry count

DCE-BBER—DCE's current BBER value

DCE-BEARING—current bearing the AMC as reported by the DCE

DCE-BU-RETRY_U—currently configured value for DCE burst uncertain retry count

DCE-CURR-FREQ—TDM freq. DCE is currently tuned to

DCE-DCE-ALMS_C—currently configured value for DCE's DCE alarms flag

DCE-DNID—current list of DNID/member number/LES Id values configured in DCE

DCE-DR-PWR—currently configured value for DCE data reports upon power up/down flag; valid values are 0–1, representing 'off' and 'on'

DCE-DR-INTS—currently configured value for DCE data report generation intervals

DCE-DTE-ALMS_T—currently configured value for DCE's DTE alarms flag

DCE-EGCO-FLAG—currently configured value for DCE EGC only (out of service) flag; valid values are 0–1, representing 'out of service' and 'in service'

DCE-ENID—current list of ENIDs configured in DCE

DCE-FRAME #—current DCE frame number

DCE-ID—DCE's serial #, Inmarsat #, model #, firmware revision #,

DCE-INF—DCE's current INF data

DCE-LES-STATUS—current LED status reported by DCE

DCE-LOGIN-MODE—currently configured DCE login mode; valid values are 'A' and 'M', representing automatic and manual DCE-MOB #—currently configured DCE mobile number DCE-MSG-ROUT—currently configured values for DCE's message type routing parameters DCE-MT-MODE—currently configured value for DCE MT mode parameter DCE-POS—DCE's current lat/lon position DCE-POS-TIME—UTC 24 hour time of the DCE's current position DCE-PWR-TIMER—currently configured value for DCE's power down timer DCE-ROAM—currently configured value for DCE roaming parameters DCE-SPEED—current speed of the AMC as reported by the DCE DCE-TIME-C—DCE's current UTC 24 hours date/time DCE-TRN-PKT-LIM—currently configured value of DCE transmit packet limit DIR-DTE-BOOT—current directory listing of the DTE's Boot-ROM disk DIR-DTE-FLASH—current directory listing of the DTE's Flash-ROM disk DIR-DTE-RAM—current directory listing of the DTE's RAM disk DIR-ADDR-SIZE-A—current size of each of the DTE's two address lists DIR-MLOG-NUM—current number of messages in each of the DTE's incoming, outgoing, saved and network message logs DTE-MLOG-SIZE-L—current size of each of the DTE's incoming, outgoing, saved and network message logs in bytes DIR-PCT-DISK—a percentage of DTE's RAM disk that is currently used DIR-PCT-MEM—percentage of DTE's conventional memory that is currently used DIR-TIME-T—DTE's current 24 hour UTC day/time FEED-DCE-DIAG—currently configured value for DCE diagnostics feedback flag; valid values are 0–1, representing 'off' and 'on'

FEED-DCE-SIG—currently configured value for DCE signalling feedback flag; valid values are 0–1, representing 'off' and 'on'

VERS-AMC-SW—version number (major and minor numbers) of the AMC application software being used to transmit the message that uses this proforma VERS-PERFORMA—version number (major and minor numbers) of the proforma that includes this automatic data variable As required by Section Message Proforma, the software will support the following commands within message proformas. The software will use the indicated command data when executing these commands:

ADD-ADDR-A
- Action:—add the given address alias and physical address to the DTE's RAM address list; if the alias already exists in the address list, replace it; if the AMC is configured for single primary destination mode, only the address alias to the RAM address list
- Data:—alias, physical address DEL-ADDR-D
- Action:—delete the address object identified by the given address alias from the DTE's RAM address list
- Data:—alias DISABLE-AMC-MSG-D
- Action:—disable the AMC's ability to send messages over the network
- Data:—none DISABLE-HLTH-RPT-D
- Action:—disable the AMC's feature that sends periodic data reports
- Data:—none ENABLE-AMC-MSG-E
- Actions:—enable the AMC's ability to send messages over the network
- Data:—none

ENABLE-HLTH-RPT-E

Action:—enable the AMC's feature that sends periodic health reports reporting the DCE's current health Data:—the number of seconds between health reports

INIT-PVT

Action:—initiate a DCE PVT test and return the results using the 'PVT Results' fixed-format message Data:—none

SEND-FILE

Action:—send the file whose name is specified in the 'Data' field using the 'File' fixed format message (note that this can be used for the DTE's RAM and Flash-ROM address lists, the DTE's health log, the DTE's configuration files, etc.)

Data:—the name of the file to be transmitted; this will be a valid DOS filename with drive, path and file

SEND-ALL-PROFORMA-VERS

Action:—send a list of all identifiers and version numbers for all message and field list proforma installed on the AMC using the 'Proforma List' fixed-format message Data:—none

SEND-PROFORMA

Action:—send the file that contains the specified message or field list proforma's definition using the 'File' fixed-format message Data:—the identifier for the proforma to be sent

DEFINITIONS

AMC Adaptive Mobile Communicator all of the hardware and software installed in each mobile unit as part of the MMS service; includes DTE and DCE CGA Color Graphics Adapter the type of graphics adapter and monitor included within the OMNIDATA DTE; it is implemented as a full screen LCD with 80 characters×25 lines in text mode and 640×200 pixels in graphics mode DCE Data Communications Equipment the transceiver and GPS receiver installed in each mobile unit DML Data Message Log the log into which all data messages are placed upon receipt at the AMC or transmission form the AMC DNID Data Network Identifier the 'Mailbox' within the Land Station to which AMC messages can be directed DTE Data Terminal Equipment the keyboard/screen operated by the AMC user of the MMS EMS Enterprise Messaging Services the middleware product integrated with the AMC application software that provides all lower-level network transport services ENID Enhanced Group Call (EGC) Network Identifier an identifier to which messages can be broadcast from the LES; all DCEs that have previously been configured with this ENID will receive the message GPS Global Positioning System the satellite system used by the DCE to determine the location of the DCE IML Incoming Message Log the log into which all user messages are placed upon the arrival at the AMC LCD Liquid Crystal Display the type of monitor included on the OMNIDATA; used for all displays of text and graphics information to the AMC user LED Light Emitting Diode the visual indicators on the OMNIDATA used to provide state information to the user LES Land Earth Station the ground station that dispatches messages between the satellite network and terrestrial networks according to the above-described enhanced satellite communications protocol.

MDF Menu Definition File the DTE configuration file that specifies the organization of the functions within the DTE's menus MMS Mobile Messaging Service the service that is supported by the AMC MRN Message Reference Number the unique number returned to the AMC by the Land Earth Station (LES) when the LES receives a message packet transmitted from the AMC using normal messaging services (note that there may be list of MRNs/PDNs/NDNs returned to the AMC for each message since the middleware software segments messages and transmits them as multiple satellite messages)

MSAT Mobile Satellite the satellite that supports the MMS.

NDN Negative Delivery Notification a message acknowledgement indicating that the LES was not able to deliver a message to its destination, preferably transmitted according to the enhanced satellite communications protocol.

NML Network Message Log the log into which all network messages are placed upon the receipt at the AMC or transmission for the AMC OML Outgoing Message Log the log into which all user messages are placed upon transmission from the AMC PCMCIA Personal Computer Memory Card International Association a standard that specifies the type of one of the peripherals connected to the DTE PDN Positive Delivery Notification a message acknowledgment in the enhanced satellite communications protocol indicating that the LES was able to send a message to its destination PVT Performance Verification Test a test executed within the DCE to determine whether or not it is functioning properly RAM Random Access Memory memory that can read and updated by the software ROM Read Only Memory memory that can only be read by the software SAC Special Access Code an address type within the LES to which AMC messages can be addressed SML Saved Memory Log the log into which users can place incoming messages that they want to save; these messages will only be deleted from the AMC at the request of the user SRAM Static RAM a type of 'card' that can be inserted into the DTE's PC-MCIA slot and used as a read-write disk UTC Universal Time Coordinate the Universal Coordinated Time system used for maintaining all times internal to the AMC and for sending all messages to and from the AMC

X.121 the protocol for addresses used within an X.25 packet network; messages sent from the AMC can be directed to one of these addresses

TERMS

Data Message

Data messages are those messages that are exchanged between the AMC software and a workstation at the dispatcher's site. These messages are not initiated by AMC users and do not require the AMC user's involvement. Conceptually, they are somewhat similar to network messages, but they are used for exchanging 'customer data' between the AMC and the dispatcher's site. They are used by the dispatcher to download the DTE configuration data that AMSC allows the dispatcher to change (e.g., proformas, address books, DTE parameters) and they are used by the AMC to automatically send customer data to the dispatcher site (e.g., engine monitoring data, bar code reader data). Their format may be either fixed or based on a proforma definition file. If based on a proforma file, the file may contain commands or automatic data variables, but not both and not display variables; replies, if required, must be automatic (not manual) and the reply proforma must also be a data proforma. The AMC software (not the user) may initiate these messages as the result of some triggering event (e.g., engine monitor reports engine data, data is received from bar code reader.)

Fixed-Format Message a message whose format and contents are predetermined and are built into the software; all messages are either fixed-format messages or proforma messages.

Local Message a message that is communicated between the DTE and the DCE to configure the DCE, command the DCE to perform an action, query the DCE for information, return the results of a DCE command to the DTE or report DCE event to the DTE; these messages are not transmitted over the network.

Middleware the software integrated with the AMC application software that provides all lower-level network transport services Network Message messages that are exchanged between the AMC software and a network management station, located for example at a dispatcher site. These messages are used to control and report the state of the mobile network service (i.e., the DTE and the DCE). They are not initiated by AMC users and do not require the AMC user's involvement. Conceptually, they are used for troubleshooting the DTE and DCE and for changing those configuration parameters within the DTE and DCE that the satellite communications system want to control, as opposed to allowing the dispatcher to control them. Their format may be either fixed or based on a proforma definition file. If based on a proforma definition file, the file may contain commands or automatic data variables, but not both and not display variables; replies, if required, must be automatic (not manual) and the reply proforma must also be a network proforma. The AMC software (not the user) may initiate these messages as the result of some triggering event (e.g., periodic health report timer expires, incoming network message contains a command that requires an outgoing network message to be sent).

Proforma Message a message whose format and contents are determined by a message proforma; the exact format and content of these messages are not built into the software; all messages are either fixed-format messages or proforma messages User Message messages that an MMS mobile user and an MMS terrestrial user exchange with one another. They may include data automatically included in the message by the software (automatic data variables), but they are only sent at the request of a user. They may not command the AMC unit to perform some action (i.e., they may not include commands in their proforma definition files). Their format is always based on a proforma definition file.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a mobile satellite system including a satellite communication switching office having a satellite for providing communication of a satellite message with a mobile communication system via a satellite, a central controller communicating with the mobile communication system via the satellite communication switching office, a communication method comprising:

storing a plurality of message display forms in the mobile communication system, each message display form having a predetermined display format and a form identifier;

generating at the central controller a user message comprising message data;

outputting from the central controller a satellite message carrying the message data and the form identifier of a selected on of the message display forms to the satellite communication switching office;

transmitting the satellite message to the mobile communication system via the satellite; and displaying the satellite message received by the mobile communication system using a selected one of the stored message display forms corresponding to the form identifier in the transmitted satellite message, wherein the storing step comprises:

generating a data message having the form identifier and the corresponding display format of at least one of the message display forms;

transmitting the data message as a second satellite message from the satellite communication switching office to the mobile communication system via the satellite; and storing the received data message at the mobile communication system, wherein the mobile communication system comprises a satellite transceiver, a communication layer software, and an application layer software having a network controller portion and a message form controller, the step of storing the received data message comprising:

receiving at the transceiver transmissions carrying the second satellite message from the satellite;

outputting from the satellite transceiver to the communication layer software the second satellite message as data packets;

assembling the second satellite message from the output data packets in the communication layer software;

outputting the second satellite message from the communication layer software to the network controller portion;

obtaining the form identifier and the corresponding display format from the transmitted data message; and storing the form identifier and the corresponding display format in the message form controller.

2. The method of claim 1, wherein the application layer software further comprises a message log, the displaying step comprising:

receiving transmissions carrying the satellite message from the satellite and outputting the satellite message as data packets from the transceiver;

assembling the satellite message from the output data packets in the communication layer software; and outputting the satellite message from the communication layer software to the network controller portion;

storing the message data and the form identifier in the message log; and displaying a notification of the user message stored in the message log.

3. The method of claim 2, wherein the application layer software further comprises a display form controller, the displaying step further comprising:

accessing the message data and the form identifier stored in the message log in response to a user selection input;

retrieving the message display form corresponding to the accessed form identifier from the message form controller;

combining in the display form controller the retrieved message display for with the accessed message data to form a combined display data; and outputting the combined display data for display.

4. In a mobile satellite system including a satellite communication switching office having a satellite antenna for providing communication of a satellite message with a mobile communication system via a satellite, a central controller communicating with the mobile communication system via the satellite communication switching office, a communication method comprising:

storing a plurality of message display forms in the mobile communication system, each message display form having a predetermined display format and a form identifier;

generating at the central controller a user message comprising message data;

outputting from the central controller a satellite message carrying the message data and the form identifier of a selected one of the message display forms to the satellite communication switching office;

transmitting the satellite message to the mobile communication system via the satellite; and displaying the satellite message received by the mobile communication system using a selected one of the stored message display forms corresponding to the form identifier in the transmitted satellite message, wherein the mobile communication system comprises a satellite transceiver, a communication layer software, an application layer software, and a display, the displaying step comprising:

receiving transmission carrying the satellite message from the satellite and outputting the satellite message as data packets;

assembling the satellite message from the output data packets in the communication layer software; and combining the selected one of the stored message display forms with the message data in the application layer software to form a combined display data; and outputting the combined display data to the display.

5. The method of claim 4, wherein the mobile communication system further comprises a paging device, the method further comprising outputting a paging signal from the paging device upon reception of the satellite message by the mobile communication system.

6. The method of claim 4, wherein the application layer software comprises a network controller, an event handler, a message log, and a user interface controller, the combining step comprising:

outputting a network event signal from the network controller to the event handler indicating receipt of the satellite message carrying the message data of the user message;

reading the message data from the network controller by the event handler in response to the network event signal;

outputting the message data from the event handler to the message log and at least a portion of message data to the user interface controller; and generating a notification in the user interface controller for display in response to the received message data from the event handler.

7. The method of claim 6, wherein the event handler comprises a polling timer controller and a central event queue, the reading and outputting steps by the event handler each comprising;

counting a specified interval in the polling timer controller;

outputting a timer event signal from the polling timer controller after the specified interval; and processing a next event from the central event queue in response to the timer event signal.

8. The method of claim 7, wherein the specified interval in the polling timer controller is determined in accordance with a processing capacity of the communication layer software.

9. In a mobile satellite system including a satellite communication switching office having a satellite antenna for providing communication of a satellite message with a mobile communication system via a satellite, a central controller communication with the mobile communication system via the satellite communication switching office, a communication method comprising:

storing a plurality of message display forms in the mobile communication system, each message display form having a predetermined display format and a form identifier;

generating at the central controller a user message comprising message data;

outputting from the central controller a satellite message carrying the message data and the form identifier of a selected one of the message display forms to the satellite communication switching office;

transmitting the satellite message to the mobile communication system via the satellite; and displaying the satellite message received by the mobile communication system using a selected one of the stored message display forms corresponding to the form identifier in the transmitted satellite message, wherein the mobile communication system comprises a satellite transceiver, a communication layer software, and an application layer software having a network controller portion, an event handler, and a network form controller, and a configuration manager, the method further comprising:

transmitting from the satellite communication switching office a second satellite message carrying a data message;

receiving from the satellite transmissions carrying the second satellite message and outputting the satellite message as data packets from the transceiver;

assembling the satellite message from the output data packets in the communication layer software;

outputting the second satellite message from the communication layer software to the network controller portion;

if the received data message includes one of the message display forms, outputting the one message display form from the network controller portion to the network form controller;

if the received data message includes configuration data, outputting a network event signal from the network controller to the event handler indicating receipt of the satellite message;

causing the event handler to retrieve the configuration data after a predetermined interval in response to the network event signal; and supplying the configuration data from the event handler to the configuration handler.

10. The method of claim 9, wherein the application layer software further comprises a data communications equipment (DCE) controller, the method further comprising:

outputting a DCE control signals from the DCE controller to the transceiver;

setting the transceiver to a time slot of the satellite transmission in response to the DCE control signals;

receiving from the transceiver data packets carrying a device message;

assembling the device message from the received data packets in the communication layer software;

sending the device message from the network controller portion to the DCE controller, the device message carrying transceiver status information; and outputting the transceiver status information from the DCE controller for display by the mobile communication system.

11. In a mobile satellite system including a satellite communication switching office having a satellite antenna for providing communication of satellite messages with a mobile communication system via a satellite, a central controller communicating with the mobile communication system via the satellite communication switching office, the mobile communication comprising:

a satellite transceiver communicating data packets carrying a first satellite message to the satellite in response to transceiver control signals;

a graphic user interface providing a display and accepting key inputs from a user; and a software system comprising:

(1) a middleware layer sending the transceiver control signals and packets carrying the satellite message to the transceiver, (2) a network form controller storing a plurality of message forms each having a form identifier and a form definition specifying a predetermined format, (3) an address list storing a list of station identifiable by the satellite communication switching office for respective satellite stations having communication capabilities with the satellite communication switching office, (4) a user interface controller retrieving a selected one of the form definitions and at least one station address in response to the key inputs, the user interface controller outputting a user message including the at least one station address, user inputs from the graphic user interface and the form identifier corresponding to the selected form definition, (5) a network controller subsystem outputting the satellite message carrying the user message to the middleware layer; and (6) an event handler controlling operations of the network controller and the user interface controller in response to network event and user event signals from the network controller and the user interface controller, respectively.

12. The mobile communication system of claim 11, wherein the event handler comprises:

a polling timer controlling outputting timer event signals at time intervals corresponding to the processing capacity of the middleware layer; and an event queue that stores each software event generated by the software system, the event handler processing each software event in the event queue in response to the corresponding timer event signal.

13. The mobile communication system of claim 12, wherein the user interface controller comprises:

an input monitor outputting keyboard data and data switch event signals in response to the user inputs;

a display form controller generating a form display data in response to the selected form definitions, the form display data including the keyboard data;

an interface controller receiving transceiver status information for the event handler and passing the one station address to the display form controller for display in the form display data; and a graphics library generating the graphic user interface in response to the form display data, the transceiver status information and the keyboard data.

14. The mobile communication system of claim 13, wherein the user interface controller further comprises:

a menu definition file storing menu display data and menu functions; and a menu controller outputting a selected one of the menu display to the graphics library in response to the keyboard data.

15. The mobile communication system of claim 11, further comprising:

a PCMCIA slot for receiving configuration data; and a random access memory storing the address list and the configuration data from the PCMCIA slot.

* * * * *